(12) United States Patent
Park et al.

(10) Patent No.: US 12,308,900 B2
(45) Date of Patent: May 20, 2025

(54) STATE INFORMATION FOR NETWORK COOPERATIVE COMMUNICATION

(71) Applicant: Samsung Electronics Co., Ltd., Suwon-si (KR)

(72) Inventors: Jinhyun Park, Suwon-si (KR); Hoondong Noh, Suwon-si (KR); Heecheol Yang, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/659,622

(22) Filed: Apr. 18, 2022

(65) Prior Publication Data

US 2022/0255588 A1    Aug. 11, 2022

Related U.S. Application Data

(63) Continuation of application No. 16/936,255, filed on Jul. 22, 2020, now abandoned.

(30) Foreign Application Priority Data

Jul. 22, 2019    (KR) .......................... 10-2019-0088584

(51) Int. Cl.
*H04B 7/02* (2018.01)
*H04B 7/024* (2017.01)
(Continued)

(52) U.S. Cl.
CPC ........... *H04B 7/024* (2013.01); *H04B 7/0626* (2013.01); *H04L 1/0026* (2013.01);
(Continued)

(58) Field of Classification Search
None
See application file for complete search history.

(56) References Cited

U.S. PATENT DOCUMENTS

2018/0042028 A1*  2/2018 Nam .................... H04L 5/0035
2019/0081678 A1*  3/2019 Park .................... H04W 72/56
(Continued)

FOREIGN PATENT DOCUMENTS

CN        109565862 A     4/2019
KR    10-2019-0028351 A   3/2019
(Continued)

OTHER PUBLICATIONS

International Search Report of the International Searching Authority in connection with International Application No. PCT/KR2020/009654 dated Oct. 13, 2020, 4 pages.
(Continued)

*Primary Examiner* — Peter Chen
*Assistant Examiner* — Jeff Banthrongsack

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure relates to a method for processing a control signal in a wireless communication system, and relates to a control signal processing method including: receiving a first control signal transmitted from the base station; processing the received first control signal; and
(Continued)

transmitting a second control signal generated based on the processing to the base station.

16 Claims, 17 Drawing Sheets

(51) Int. Cl.
    *H04B 7/06*     (2006.01)
    *H04L 1/00*     (2006.01)
    *H04L 5/00*     (2006.01)
    *H04W 8/24*     (2009.01)
    *H04W 80/02*     (2009.01)

(52) U.S. Cl.
    CPC .......... *H04L 5/0051* (2013.01); *H04L 5/0092* (2013.01); *H04W 8/24* (2013.01); *H04W 80/02* (2013.01)

(56) References Cited

U.S. PATENT DOCUMENTS

| | | |
|---|---|---|
| 2019/0089442 A1 | 3/2019 | Akoum et al. |
| 2019/0158155 A1 | 5/2019 | Park et al. |
| 2021/0120510 A1 | 4/2021 | Kwak et al. |

FOREIGN PATENT DOCUMENTS

| | | |
|---|---|---|
| KR | 10-2020-0066937 A | 6/2020 |
| WO | 2019031879 A1 | 2/2019 |

OTHER PUBLICATIONS

CATT, "Consideration on multi-TRP/panel transmission," R1-1902019, 3GPP TSG RAN WG1 Meeting #96, Athens, Greece, Feb. 25-Mar. 1, 2019, 11 pages.

Ericsson, "On CSI feedback enhancements supporting non-coherent JT," R1-1708995, 3GPP TSG-RAN WG1 Meeting #89, Hangzhou, China, May 15-19, 2017, 3 pages.

Samsung, "On CSI processing and reporting latency," R1-1806713, 3GPP TSG RAN WG1 Meeting #93, Busan, Korea, May 21-25, 2018, 4 pages.

Huawei et al., "CSI measurement enhancement for multi-TRP/panel transmission", 3GPP TSG RAN WG1 Meeting #96bis, Apr. 8-12, 2019, R1-1903982, 6 pages.

"3rd Generation Partnership Project; Technical Specification Group Radio Access Network; NR; Physical layer procedures for data (Release 15)", 3GPP TS 38.214 V15.6.0 (Jun. 2019), 105 pages.

Huawei et al., "CSI acquisition details for NCJT", 3GPP TSG RAN WG1 NR Ad Hoc Meeting, Jun. 27-30, 2017, R1-1710451, 5 pages.

Supplementary European Search Report dated Jul. 14, 2022 in connection with European Patent Application No. 20 84 3704, 10 pages.

Office Action issued Nov. 27, 2023, in connection with Chinese Patent Application No. 202080053234.6, 20 pages.

Communication pursuant to Article 94(3) EPC dated Jun. 25, 2024, in connection with European Patent Application No. 20843704.6, 5 pages.

\* cited by examiner

Case A) Single CSI-RS per resource set (14-01)

Case B) Multiple CSI-RSs per resource set (14-51)

STATE INFORMATION FOR NETWORK COOPERATIVE COMMUNICATION

CROSS-REFERENCE TO RELATED APPLICATIONS

This application is a continuation of application Ser. No. 16/936,255, filed Jul. 22, 2020, which is based on and claims priority under 35 U.S.C. 119 to Korean Patent Application No. 10-2019-0088584, filed Jul. 22, 2019, in the Korean Intellectual Property Office, the disclosures of which are herein incorporated by reference in their entirety.

BACKGROUND

1. Field

The disclosure relates to a wireless communication system and, more particularly, to a method for a terminal to measure and report channel state information between base stations and terminals to achieve higher reliability and throughput.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

The disclosure may provide a method for measuring reporting channel state information between a plurality of transmission nodes and terminals for network coordination in a wireless communication system.

In accordance with an aspect of the disclosure, there is provided a method by a terminal in a wireless communication system, the method comprising: transmitting, to a base station, a terminal capability report including information on whether to support non-coherent joint transmission (NC-JT) channel state information (CSI) report; receiving, from the base station, a NC-JT CSI report request, based on the information included in the terminal capability report; determining whether to report NC-JT CSI, based on the NC-JT report request; and transmitting, to the base station, the NC-JT CSI report, based on the determination.

In an exemplary embodiment, further comprising: measuring the NC-JT CSI; determining whether the number of channel state information-reference signals (CSI-RS) for reporting the NC-JT CSI is greater than a threshold value; and determining, to the base station, a number of CPUs for the NC-JT CSI report, based on the determination.

In an exemplary embodiment, wherein the determining whether to report NC-JT CSI comprises determining whether to report the NC-JT CSI based on a CSI report including at least one of an instruction through an upper layer, an instruction through a media access control (MAC)-control element (CE), and an instruction through L1 signaling.

In an exemplary embodiment, wherein the determining whether to report NC-JT CSI comprises determining whether to report the NC-JT CSI based on at least one of the number of CSI-RS for the NC-JT CSI report, the periodicity of the NC-JT CSI report, and the number of resource sets or resource settings related to the CSI report setting for the NC-JT CSI report.

In an exemplary embodiment, further comprising performing the NC-JT transmission, based on the NC-JT CSI report, wherein the performing the NC-JT transmission is determined based on a resource allocation for each TRP (Tx/Rx point).

In accordance with another aspect of the disclosure, there is provided a method by a base station in a wireless communication system, the method comprising: receiving, from a terminal, a terminal capability report including information on whether to support non-coherent joint transmission (NC-JT) channel state information (CSI) report; transmitting, to the terminal, a NC-JT CSI report request, based on the information included in the terminal capability report; and receiving, from the terminal, the NC-JT CSI report, based on the NC-JT CSI report request, wherein whether to report the NC-JT CSI is determined by the terminal, based on the NC-JT report request.

In accordance with another aspect of the disclosure, there is provided a terminal comprising: a transceiver capable of transmitting and receiving at least one signal; and a controller coupled with the transceiver, wherein the controller is configured to: transmit, to a base station, a terminal capability report including information on whether to support non-coherent joint transmission (NC-JT) channel state information (CSI) report; receive, from the base station, a NC-JT CSI report request, based on the information included in the terminal capability report; determine whether to report NC-JT CSI, based on the NC-JT report request; and transmit, to the base station, the NC-JT CSI report, based on the determination.

In accordance with another aspect of the disclosure, there is provided a base station comprising: a transceiver capable of transmitting and receiving at least one signal; and a controller coupled with the transceiver, wherein the controller is configured to: receive, from a terminal, a terminal capability report including information on whether to support non-coherent joint transmission (NC-JT) channel state information (CSI) report; transmit, to the terminal, a NC-JT CSI report request, based on the information included in the terminal capability report; and receive, from the terminal, the NC-JT CSI report, based on the NC-JT CSI report request, wherein whether to report the NC-JT CSI is determined by the terminal, based on the NC-JT report request.

According to the disclosure, when the network coordination is used in the wireless communication system, it is possible to more accurately determine the calculation time and calculation amount required to measure and report the channel state information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
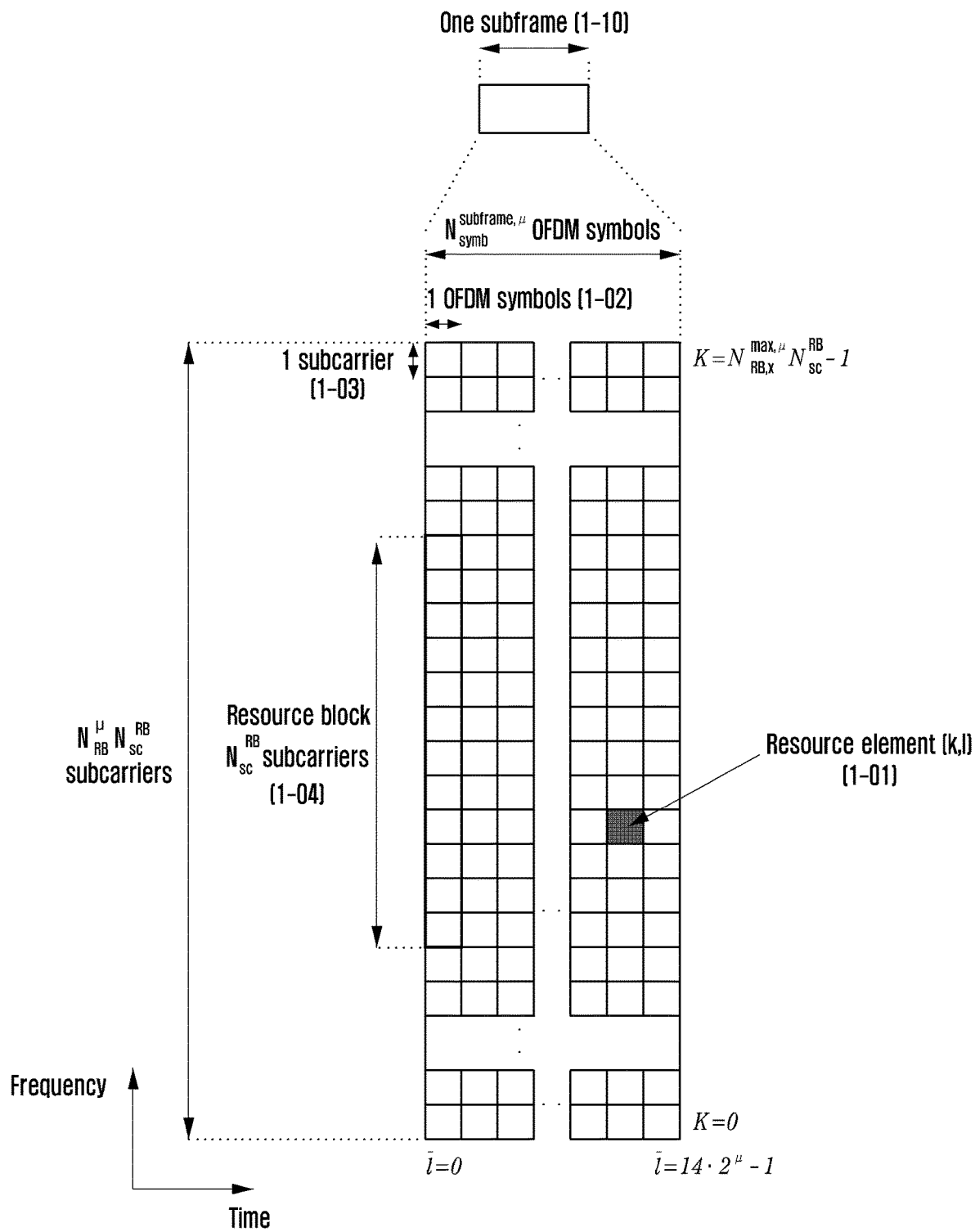
FIG. 1 illustrates a view of a basic structure of time-frequency domain of a mobile communication system according to an embodiment.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, the base station is a subject that performs resource allocation of a terminal, and may be at least one of a gNode B (gNB), an eNode B (eNB), a Node B, a base station (BS), a radio access unit, a base station controller, or a node on a network. The terminal may include a user equipment (UE), a mobile station (MS), a cellular phone, a smart phone, a computer, or a multimedia system capable of performing communication functions. Of course, it is not limited to the above example. Hereinafter, the disclosure describes a technique for a terminal to receive broadcast information from a base station in a wireless communication system. The disclosure relates to a communication technique and a system for integrating a 5th generation (5G) communication system with an Internet of Things (IoT) technology to support a higher data transfer rate after a 4th generation (4G) system. The disclosure may be applied to intelligent services (e.g., smart home, smart building, smart city, smart car or connected car, health care, digital education, retail, security and safety related services, etc.), based on 5G communication technology and IoT-related technologies.

Terms referring to broadcast information, terms referring to control information, terms related to communication coverage, terms referring to a state change (e.g., an event), terms referring to network entities, terms referring to messages, terms referring to the component of the device, etc. used in the following description are exemplified for convenience of explanation. Therefore, the disclosure is not limited to the terms described below, and other terms having equivalent technical meanings may be used.

Hereinafter, for convenience of description, some terms and names defined in 3GPP LTE (3rd generation partnership project long term evolution) standard may be used. However, the disclosure is not limited by the terms and names, and may be applied to systems conforming to other standards.

The wireless communication system has evolved into a broadband wireless communication system that provides high-speed and high-quality packet data services using communication standards, such as high-speed packet access (HSPA) of 3GPP, long-term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and IEEE 802.16e, etc., rather than providing initial voice-based services.

As a representative example of a broadband wireless communication system, in an LTE system, an orthogonal frequency division multiplexing (OFDM) scheme is adopted in downlink (DL), and a single carrier frequency division multiple access (SC-OFDM) scheme is adopted in uplink (UL). The uplink refers to a radio link through which a terminal (user equipment (UE) or mobile station (MS)) transmits data or control signals to a base station (eNode B, or base station (BS)), and the downlink refers to a radio link through which a base station transmits data or control signals to a terminal. In such a multiple access method, data or control information of each user is usually divided by assigning and operating so that time-frequency resources to which data or control information to be carried for each user do not overlap, that is, orthogonality is established.

As a future communication system after LTE, that is, a 5G communication system should be able to freely reflect various requirements of users and service providers, so service satisfying various requirements should be supported. Services considered for 5G communication systems include enhanced mobile broadband (eMBB), massive machine type communication (mMTC), and ultra-reliability low latency communication (URLLC), and so on.

According to some embodiments, the eMBB aims to provide a more improved data transmission rate than the existing LTE, LTE-A or LTE-Pro. For example, in a 5G communication system, the eMBB should be able to provide a maximum data rate of 20 Gbps in the downlink and a maximum data rate of 10 Gbps in the uplink from the perspective of one base station. At the same time, the actual perceived data rate of the increased terminal should be provided. In order to satisfy this requirement, it is required to improve transmission/reception technology including a more advanced multi input multi output (MIMO) transmission technology. Also, it is possible to satisfy the data transmission speed required by the 5G communication system by using a wider bandwidth than 20 MHz in the 3-6 GHz or 6 GHz or higher frequency band, instead of the 2 GHz band used by the current LTE.

At the same time, mMTC is being considered to support application services such as the Internet of Things (IoT) in 5G communication systems. In order to efficiently provide the Internet of Things, mMTC may be required to support access to a large-scale terminal within a cell, improve the coverage of the terminal, improve battery time, and reduce the cost of the terminal. The Internet of Things should be able to support a large number of terminals (e.g., 1,000,000 terminals/km2) in a cell, as it is attached to various sensors and various devices to provide communication functions. In addition, because of the nature of the service, the terminal supporting mMTC is likely to be located in a shaded area that cannot be covered by a cell, such as the basement of a building, and thus may require wider coverage than other services provided by a 5G communication system. Since the terminal supporting mMTC should be configured with a low-cost terminal, and it is difficult to frequently replace the battery of the terminal, a very long battery life time may be required.

Finally, URLLC, which is a cellular-based wireless communication service used for a specific purpose (mission-critical), is a service that is used for remote control of robots or mechanical devices, industrial automation, unmanned aerial vehicles, remote health control, emergency notifications, etc., and should provide communication providing ultra-low latency and ultra-high reliability. For example, a service supporting URLLC should satisfy an air interface latency of less than 0.5 milliseconds and at the same time has a requirement of a packet error rate of 10-5 or less. Therefore, for a service supporting URLLC, a 5G system needs to provide a smaller transmit time interval (TTI) than other services, and at the same time, a design requirement is required to allocate a wide resource in a frequency band. However, the above-described mMTC, URLLC, and eMBB are only examples of different service types, and the service types to which the disclosure is applied are not limited to the above-described examples.

The services considered in the above-mentioned 5G communication system should be provided by being fused with each other on the basis of one framework. That is, for efficient resource management and control, it is preferable that each service is integrated and controlled and transmitted as one system rather than being operated independently.

In addition, hereinafter, embodiments will be described as examples of an LTE, LTE-A, LTE Pro, or NR system, but the embodiments may be applied to other communication systems having similar technical backgrounds or channel types. In addition, the embodiments may be applied to other communication systems through some modifications within a range not significantly departing from the scope of the disclosure as judged by a person having skilled technical knowledge.

The disclosure relates to a method and an apparatus for reporting channel state information to increase power saving efficiency of a terminal in a wireless communication system.

According to the disclosure, when the terminal operates in the power saving mode in the wireless communication system, the power saving effect may be further improved by optimizing the channel state information reporting method accordingly.

Hereinafter, the frame structure of the 5G system will be described in more detail with reference to the drawings.

Referring to FIG. 1, the horizontal axis represents a time domain, and the vertical axis represents a frequency domain. The basic unit in the time and frequency domains is resource element (RE) 1-01 and may be defined as 1 orthogonal frequency division multiplexing (OFDM) symbol 1-02 in the time axis and 1 subcarrier 1-03 in the frequency axis. In the frequency domain, N_sc^RB (e.g., 12) consecutive REs may constitute one resource block (RB) 1-04. In an embodiment, a plurality of OFDM symbols may constitute one subframe 1-10.

Figure 2:
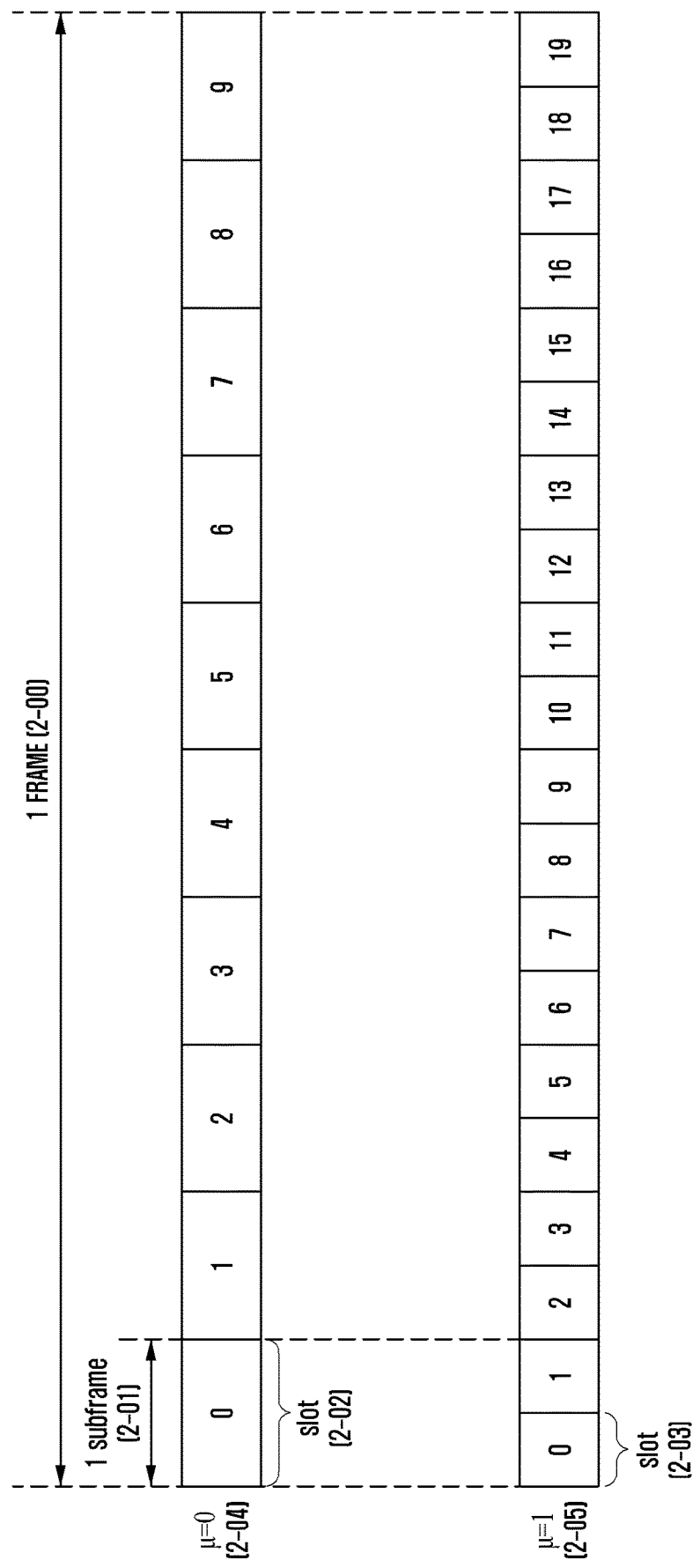
FIG. 2 illustrates a view for explaining a frame, subframe and slot structure of a mobile communication system according to an embodiment.

FIG. 2 illustrates a view for explaining a frame, subframe and slot structure of a next generation mobile communication system according to an embodiment.

Referring to FIG. 2, one frame 2-00 may be composed of one or more subframes 2-01, and one subframe may be composed of one or more slots 2-02. As an example, one frame 2-00 may be defined as 10 ms. One subframe 2-01 may be defined as 1 ms, and in this case, one frame 2-00 may consist of a total of 10 subframes 2-01. One slot 2-02, 2-03 may be defined by 14 OFDM symbols (i.e., the number of symbols per slot ($N_{symb}^{slot}$=14). One subframe 2-01 may be composed of one or a plurality of slots 2-02, 2-03, the number of slots 2-02, 2-03 per subframe 2-01 may be different depending on the configuration value μ 2-04, 2-05 for the subcarrier spacing. In the example of FIG. 2, the case where the subcarrier spacing is configured is μ=0 (2-04) and μ=1 (2-05). When μ=0 (2-04), one subframe 2-01 may consist of one slot 2-02, and when μ=1 (2-05), one subframe 2-01 may be composed of two slots 2-03. That is, the number of slots per subframe ($N_{slot}^{subframe,\mu}$) may vary according to the configuration value μ for the subcarrier spacing, and thus the number of slots ($N_{slot}^{frame,\mu}$) per frame may vary. The $N_{slot}^{subframe,\mu}$ and $N_{slot}^{frame,\mu}$ according to each subcarrier spacing configuration μ and may be defined as in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may be configured with up to 250 or more RBs. Therefore, when the terminal always receives the entire serving cell bandwidth (LTE), such as LTE, the power consumption of the terminal may be extreme, and in order to solve this, the base station may configure up one or more bandwidth parts (BWP) to the terminal to support the terminal to change the reception area in the cell. In the NR, the base station may configure the 'initial BWP', which is the bandwidth of CORESET #0 (or common search space, CSS) to the terminal through the master information block (MIB). Then, the base station may configure the initial BWP (first BWP) of the terminal through radio resource control (RRC) signaling, and may notify the terminal of at least a piece of BWP configuration information that may be indicated through downlink control information (DCI) in the future. Thereafter, the base station may indicate which band the terminal will use by notifying the BWP ID through DCI. If the terminal cannot receive DCI from the currently allocated BWP for a specific time or more, the terminal may return to 'default BWP' and try to receive DCI.

Figure 3:
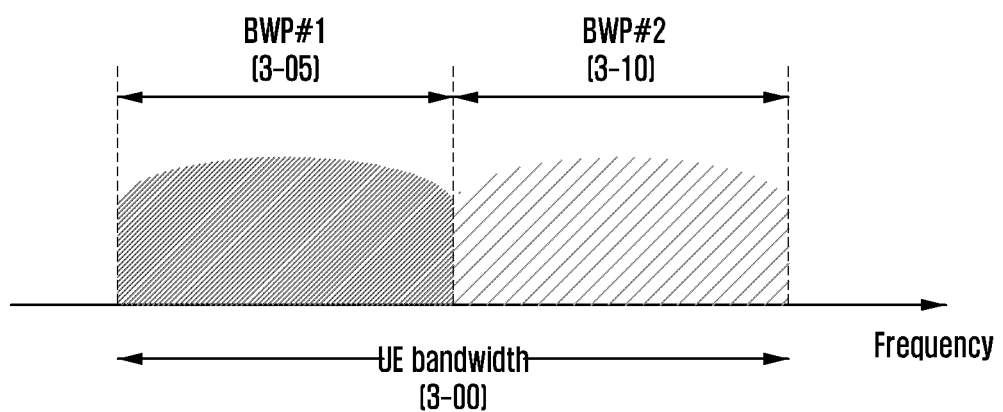
FIG. 3 illustrates a view of an example of a configuration of a bandwidth part (BWP) in a wireless communication system according to an embodiment.

FIG. 3 illustrates a view of an example of a configuration of a bandwidth part (BWP) in a wireless communication system according to an embodiment.

Referring to FIG. 3, FIG. 3 illustrates an example in which the terminal bandwidth (3-00) is configured to two bandwidth portions, namely, the bandwidth portion #1 (3-05) and the bandwidth portion #2 (3-10). The base station may configure one or a plurality of bandwidth portions to the terminal, and may configure information as shown in [Table 2] below for each bandwidth portion.

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

Of course, the disclosure is not limited to the above-described example, and various parameters related to the bandwidth part may be configured to the terminal in addition to the above-described configuration information. The above-described information may be transmitted to the terminal by the base station through higher layer signaling, for example, RRC signaling. At least one bandwidth portion among the configured one or multiple bandwidth portions may be activated. Whether to activate the configured bandwidth part may be transmitted semi-statically through RRC signaling from the base station to the terminal, or may be dynamically transmitted through a MAC control element (CE) or DCI.

According to an embodiment, a terminal before a radio resource control (RRC) connection may receive an initial bandwidth part (initial BWP) for initial access from a base station through a master information block (MIB). More specifically, in order to receive the system information (remaining system information; may correspond to RMSI or system information block (SIB) 1) required for initial access through the MIB in the initial access step, the terminal may receive configuration information for the control area (control resource set, CORSET) and the search space through which the PDCCH may be transmitted. The control area and the search space configured by the MIB may be regarded as identifier (ID) 0, respectively.

The base station may notify the terminal of configuration information such as frequency allocation information, time allocation information, and numerology for the control area #0 through the MIB. In addition, the base station may notify the terminal of the configuration information for the monitoring period and occasion for the control area #0 through the MIB, that is, the configuration information for the search space #0. The terminal may regard the frequency domain configured as the control area #0 obtained from the MIB as an initial bandwidth part for initial access. At this time, the identifier (ID) of the initial bandwidth part may be regarded as 0.

The bandwidth parts supported by the above-described next-generation mobile communication system (5G or NR system) may be used for various purposes.

For example, when the bandwidth supported by the terminal is smaller than the system bandwidth, the bandwidth supported by the terminal may be supported through configuring the bandwidth portion. For example, in Table 2, the frequency location (configuration information 2) of the bandwidth portion is configured to the terminal, so that the terminal may transmit and receive data at a specific frequency location within the system bandwidth.

As another example, for the purpose of supporting different numerology, the base station may configure a plurality of bandwidth portions to the terminal. For example, in order to support data transmission and reception using a subcarrier spacing of 15 kHz and a subcarrier spacing of 30 kHz to arbitrary terminals, two bandwidth portions may be configured to use subcarrier spacings of 15 kHz and 30 kHz, respectively. Different bandwidth parts may be frequency division multiplexing (FDM), and when data is to be transmitted/received at a specific subcarrier spacing, a bandwidth part configured at a corresponding subcarrier spacing may be activated.

As another example, for the purpose of reducing power consumption of the terminal, the base station may configure a bandwidth portion having different sizes of bandwidth to the terminal. For example, if the terminal supports a very large bandwidth, for example, a bandwidth of 100 MHz, and always transmits/receives data with the corresponding bandwidth, it may cause very large power consumption. In particular, it is very inefficient in terms of power consumption for the terminal to perform monitoring of an unnecessary downlink control channel for a large bandwidth of 100 MHz in a situation where there is no traffic. Therefore, for the purpose of reducing power consumption of the terminal, the base station may configure a bandwidth portion of a relatively small bandwidth to the terminal, for example, a bandwidth portion of 20 MHz. In a situation where there is no traffic, the terminal may perform a monitoring operation in the 20 MHz bandwidth portion, and when data occurs, may transmit/receive data using the 100 MHz bandwidth portion according to the instructions of the base station.

In the method of configuring the above-described bandwidth part, terminals before the RRC connection may receive the configuration information for the initial bandwidth part through the master information block (MIB) in the initial access step. More specifically, the terminal may receive, from the MIB of the physical broadcast channel (PBCH), a control area (control resource set (CORESET)) for a downlink control channel through which a downlink control information (DCI) scheduling a system information block (SIB) may be transmitted. The bandwidth of the control area configured as the MIB may be regarded as an initial bandwidth part, and the terminal may receive a PDSCH through which SIB is transmitted through the configured initial bandwidth part. The initial bandwidth part may be used for other system information (OSI), paging, and random access, in addition to the purpose of receiving the SIB.

Hereinafter, a synchronization signal (SS)/PBCH block of a next generation mobile communication system (5G or NR system) will be described.

The SS/PBCH block may mean a physical layer channel block composed of a primary SS (PSS), a secondary SS (SSS), and a PBCH. More specifically, the SS/PBCH block may be defined as follows.

PSS: A signal that is a reference for downlink time/frequency synchronization, and may provide some information of a cell ID.

SSS: It is a reference for downlink time/frequency synchronization, and may provide remaining cell ID information not provided by the PSS. Additionally, it may serve as a reference signal for demodulation of the PBCH.

PBCH: It is possible to provide essential system information necessary for transmitting/receiving data channels and control channels of the terminal. The essential system information may include search space related control information indicating radio resource mapping information of a control channel, scheduling control information for a separate data channel transmitting system information, and the like.

SS/PBCH block: The SS/PBCH block may consist of a combination of PSS, SSS and PBCH. One or more SS/PBCH blocks may be transmitted within 5 ms, and each SS/PBCH block transmitted may be distinguished by an index.

The terminal may detect PSS and SSS in the initial access stage and decode PBCH. The terminal may acquire MIB from the PBCH, and may receive control area #0 through the MIB. The terminal may perform monitoring for the control area #0, assuming that the selected SS/PBCH block and the demodulation reference signal (DMRS) transmitted from the control area #0 are quasi co location (QCL). The terminal may receive system information as downlink control information transmitted from the control area #0. The terminal may obtain random access channel (RACH) related configuration information necessary for initial access from the received system information. The terminal may transmit a physical RACH (PRACH) to the base station in consideration of the selected SS/PBCH index, and the base station receiving the PRACH may acquire information on the SS/PBCH block index selected by the terminal. It may be seen that the base station selects a certain block from each SS/PBCH block, and monitors the control area #0 corresponding to (or associated with) the SS/PBCH block selected by the terminal.

Hereinafter, downlink control information (hereinafter referred to as DCI) in a next-generation mobile communication system (5G or NR system) will be described in detail.

In a next-generation mobile communication system (5G or NR system), scheduling information for uplink data (or physical uplink shared channel (PUSCH)) or scheduling information for downlink data (or physical downlink shared channel (PDSCH)) may be transmitted from a base station to a terminal through DCI. The terminal may monitor the DCI format for fallback and the DCI format for non-fallback for PUSCH or PDSCH. The fallback DCI format may be composed of a predetermined fixed field between the base station and the terminal, and the DCI format for non-fallback may include a configurable field.

DCI may be transmitted through a physical downlink control channel (PDCCH) through a channel coding and modulation process. Cyclic redundancy check (CRC) may be attached to the DCI message payload, and the CRC may be scrambled with a radio network temporary identifier (RNTI) corresponding to the identity of the terminal. Different RNTIs may be used for scrambling the CRC attached to the payload of the DCI message, depending on the purpose of the DCI message, for example, terminal-specific (UE-specific) data transmission, power control command or random access response. That is, the RNTI is not explicitly transmitted, but may be included in the CRC calculation process and transmitted. When the DCI message transmitted on the PDCCH is received, the terminal may identify the CRC using the allocated RNTI. If the CRC identification result is correct, the terminal may know that the corresponding message has been transmitted to the terminal.

For example, DCI scheduling a PDSCH for system information (SI) may be scrambled with SI-RNTI. The DCI scheduling the PDSCH for the random access response (RAR) message may be scrambled with RA-RNTI. The DCI scheduling the PDSCH for the paging message may be scrambled with P-RNTI. DCI notifying the slot format indicator (SFI) may be scrambled with SFI-RNTI. DCI notifying transmit power control (TPC) may be scrambled with TPC-RNTI. The DCI for scheduling the terminal-specific PDSCH or PUSCH may be scrambled with cell RNTI (C-RNTI).

DCI format 0_0 may be used as a fallback DCI scheduling PUSCH, and at this time, CRC may be scrambled with C-RNTI. In one embodiment, DCI format 0_0 in which CRC is scrambled with C-RNTI may include information as shown in [Table 3] below.

TABLE 3

| | |
|---|---|
| Identifier for DCI formats | - [1] bit |
| Frequency domain resource assignment $\lceil \log_2(N_{RB}^{UL, BWP}(N_{RB}^{UL, BWP} + 1)/2) \rceil$ ] bits | - |
| Time domain resource assignment | - X bits |
| Frequency hopping flag | - 1 bit, |
| Modulation and coding scheme | - 5 bits |
| New data indicator | - 1 bit |
| Redundancy version | - 2 bits |
| HARQ process number | - 4 bits |
| TPC command for scheduled PUSCH (transmit power control) | - [2] bits |
| UL/SUL indicator | - 0 or 1 bit |

DCI format 0_1 may be used as a non-fallback DCI scheduling PUSCH, and the CRC may be scrambled with C-RNTI. In an embodiment, DCI format 0_1 in which CRC is scrambled with C-RNTI may include information as shown in [Table 4] below.

TABLE 4

Carrier indicator—0 or 3 bits
UL/SUL indicator—0 or 1 bit
Identifier for DCI formats—[1] bits
Bandwidth part indicator—0, 1 or 2 bits
Frequency domain resource assignment
    For resource allocation type 0 $\lceil N_{RB}^{UL,BWP}/P \rceil$ bits
    For resource allocation type 1 $\lceil \log_2(N_{RB}^{UL,BWP}(N_{RB}^{UL,BWP} + 1)/2) \rceil$ bits
Time domain resource assignment—1, 2, 3, or 4 bits
VRB-to-PRB mapping (virtual resource block)-to-(physical resource block))—0 or 1 bit, only for resource allocation type 1.
    0 bit if only resource allocation type 0 is configured;
    1 bit otherwise.
Frequency hopping flag—0 or 1 bit, only for resource allocation type 1.
    0 bit if only resource allocation type 0 is configured;
    1 bit otherwise.
Modulation and coding scheme—5 bits
New data indicator—1 bit
Redundancy version—2 bits
HARQ process number—4 bits
1st downlink assignment index—1 or 2 bits
    1 bit for semi-static HARQ-ACK codebook
    2 bits for dynamic HARQ-ACK codebook with single HARQ-ACK codebook
2nd downlink assignment index—0 or 2 bits
    2 bits for dynamic HARQ-ACK codebook with two HARQ-ACK sub-codebooks
    0 bit otherwise.
TPC command for scheduled PUSCH—2 bits SRS resource indicator—$\left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non-codebook based PUSCH transmission $\lceil \log_2(N_{SRS}) \rceil$ bits for codebook based PUSCH transmission
Precoding information and number of layers—up to 6 bits
Antenna ports—up to 5 bits
SRS request—2 bits
CSI request—0, 1, 2, 3, 4, 5, or 6 bits
CBG transmission information—0, 2, 4, 6, or 8 bits
PTRS-DMRS association—0 or 2 bits.
beta_offset indicator—0 or 2 bits
DMRS sequence initialization—0 or 1 bit DCI format 1_0 may be used as a fallback DCI for scheduling the PDSCH, and the CRC may be scrambled with C-RNTI. In an embodiment, DCI format 1_0 in which the CRC is scrambled with C-RNTI may include information as shown in [Table 5] below.

TABLE 5

Identifier for DCI formats - [1] bit
Frequency domain resource assignment -$[\lceil \log_2(N_{RB}^{DL,\ BWP}(N_{RB}^{DL,\ BWP} + 1)/2) \rceil]$ bits
Time domain resource assignment - X bits
VRB-to-PRB mapping - 1 bit,
Modulation and coding scheme - 5 bits
New date indicator -1 bit
Redundancy version - 2 bits
HARQ process number - 4 bits
Downlink assignment index - 2 bits
TPC command for scheduled PUCCH - [2] bits
PUCCH resource indicator
  - 3 bits
PDSCH-to-HARQ feedback timing indicator
-[3] bits DCI format 1_1 may be used as a non-fallback DCI for scheduling a PDSCH, where CRC may be scrambled with C-RNTI. In an embodiment, DCI format 1_1 in which CRC is scrambled by C-RNTI may include information as shown in [Table 6] below.

TABLE 6

Figure 4:
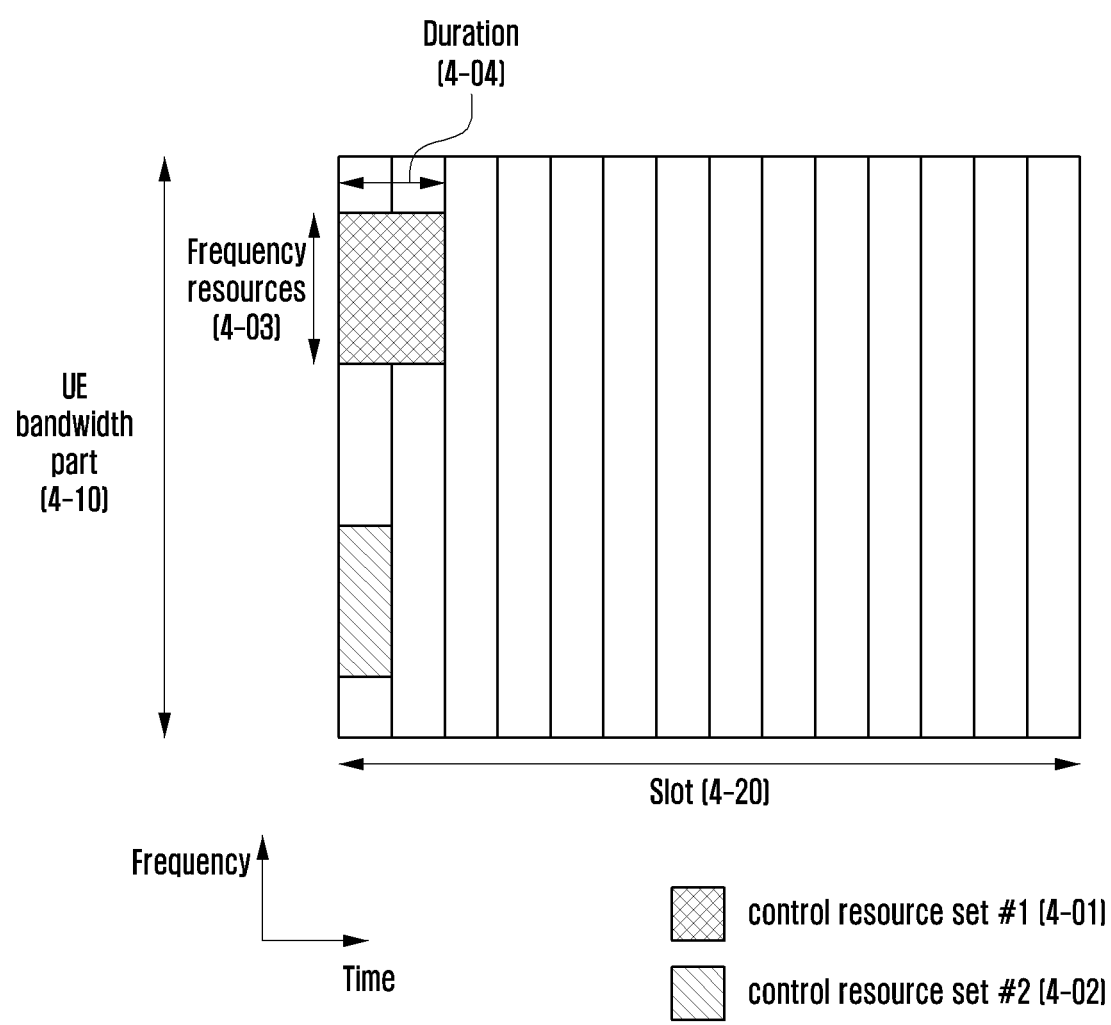
FIG. 4 illustrates a view of an example of configuring a control area of a downlink control channel in a wireless communication system according to an embodiment.

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,\ BWP}/P \rceil$ bits
    For resource allocate type 1, $\lceil \log_2(N_{RB}^{DL,\ BWP}(N_{RB}^{DL,\ BWP} + 1)/2) \rceil$ bits
Time domain resource assignment -1, 2, 3, or 4 bits
VRB-to-PRB mapping - 0 or 1 bit, only for resource allocation type 1,
    0 bit if only resource allocate type 0 is configured;
    1 bit otherwise.
PRB bundling size indicator                                    - 0 or 1 bit
Rate matching indicator                                        - 0, 1, or 2 bits
ZP CSI-RS trigger                                              - 0, 1, or 2 bits
For transport block 1
  Modulation and coding scheme - 5 bits
  New data indicator - 1 bit
  Redundancy version - 2 bits
For transport block 2
  Modulate and coding scheme - 5 bits
  New data indicator - 1 bit
  Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication                          - 0 or 3 bits
SRS request - 2 bits
CBG transmission information - 0, 2, 4, 6, or 8 bits
CBG flushing out information                                   - 0 or 1 bit
DMRS sequence initialization - 1 bit FIG. 4 illustrates a view of an example of configuring a control area of a downlink control channel in a next generation mobile communication system according to an embodiment. That is, FIG. 4 illustrates a view of an embodiment of a control area (control resource set (CORESET)) in which a downlink control channel is transmitted in a 5G wireless communication system according to an embodiment.

Referring to FIG. 4, FIG. 4 illustrates an embodiment in which two control areas (control area #1 4-01 and control area #2 4-02) are configured in one slot 4-20 within the bandwidth part of the terminal (UE bandwidth part) 4-10 and on the frequency axis, within one slot 4-20 on the time axis. The control areas 4-01 and 4-02 may be configured as a specific frequency resource 4-03 within the entire terminal bandwidth part 4-10 on the frequency axis. The control areas 4-01 and 4-02 may be configured as one or a plurality of OFDM symbols on the time axis, which may be defined as a control resource set duration (4-04). Referring to FIG. 4, control area #1 (4-01) may be configured as a control resource set duration of 2 symbols, and control area #2 (4-02) may be configured as a control resource set duration of 1 symbol.

The control area in the above-described next-generation mobile communication system (5G or NR system) may be configured by the base station performing higher layer signaling (e.g., system information, master information block (MIB), radio resource control (RRC) signaling) to the terminal. Configuring a control area to a terminal means providing information such as a control area identifier, a frequency location of the control area, and a symbol length of the control area. For example, the configuration for the control area may include information as shown in [Table 7] below.

TABLE 7

```
ControlResourceSet ::=                  SEQUENCE {
-- Corresponds to L1 parameter 'CORESET-ID'
    controlResourceSetId                ControlResourceSetId,
    frequencyDomainResources            BIT STRING (SIZE (45)),
    duration                            INTEGER (1..maxCoReSetDuration),
    cce-REG-MappingType                 CHOICE {
        interleaved                     SEQUENCE {
            reg-BundleSize              ENUMERATED {n2, n3, n6},
            precoderGranularity         ENUMERATED   {sameAsREG-
bundle, allContiguousRBs},
            interleaverSize             ENUMERATED {n2, n3, n6}
            shiftIndex
            INTEGER(0..maxNrofPhysicalResourceBlocks-1)
        },
        nonInterleaved                  NULL
    },
    tci-StatesPDCCH                     SEQUENCE(SIZE   (1..maxNrofTCI-
        StatesPDCCH)) OF TCI-StateId        OPTIONAL,
    tci-PresentInDCI                    ENUMERATED {enabled}
}
```

In Table 7, tci-StatesPDCCH (hereinafter referred to as "TCI state") configuration information may include information of one or more synchronization signal (SS)/physical broadcast channel (PBCH) index or channel state information reference signal (CSI-RS) index in quasi co located (QCL) relationship with demodulation reference signal (DMRS) transmitted in the corresponding control area. In addition, the tci-StatesPDCCH configuration information may include information on what the QCL relationship is. For example, the configuration of the TCI state may include information as shown in [Table 8] below.

TABLE 8

```
TCI-State ::=       SEQUENCE {
    tci-StateId         TCI-StateId,
    qcl-Type1           QCL-Info,
    qcl-Type2           QCL-Info                        OPTIONAL,
    ...
}

QCL-Info ::=        SEQUENCE {
    cell                ServCellIndex                   OPTIONAL,
    bwp-Id              BWP-Id                          OPTIONAL,
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}
```

Referring to the TCI state configuration, the cell index of the reference RS and/or the BWP index and the QCL type may be configured together with the index of the reference RS in the QCL relationship, that is, the SS/PBCH block index or the CSI-RS index. The QCL type indicates channel characteristics that are assumed to be shared between the reference RS and the control area DMRS, and the examples of possible QCL types are as follows.

QCL typeA: Doppler shift, Doppler spread, average delay, delay spread.
QCL typeB: Doppler shift, Doppler spread.
QCL typeC: Doppler shift, average delay.
QCL typeD: Spatial Rx parameter.

The TCI state may be similarly configured for the control area DMRS as well as other target RSs, such as PDSCH DMRS and CSI-RS, but detailed description is omitted so as not to obscure the subject matter of the description.

Figure 5:
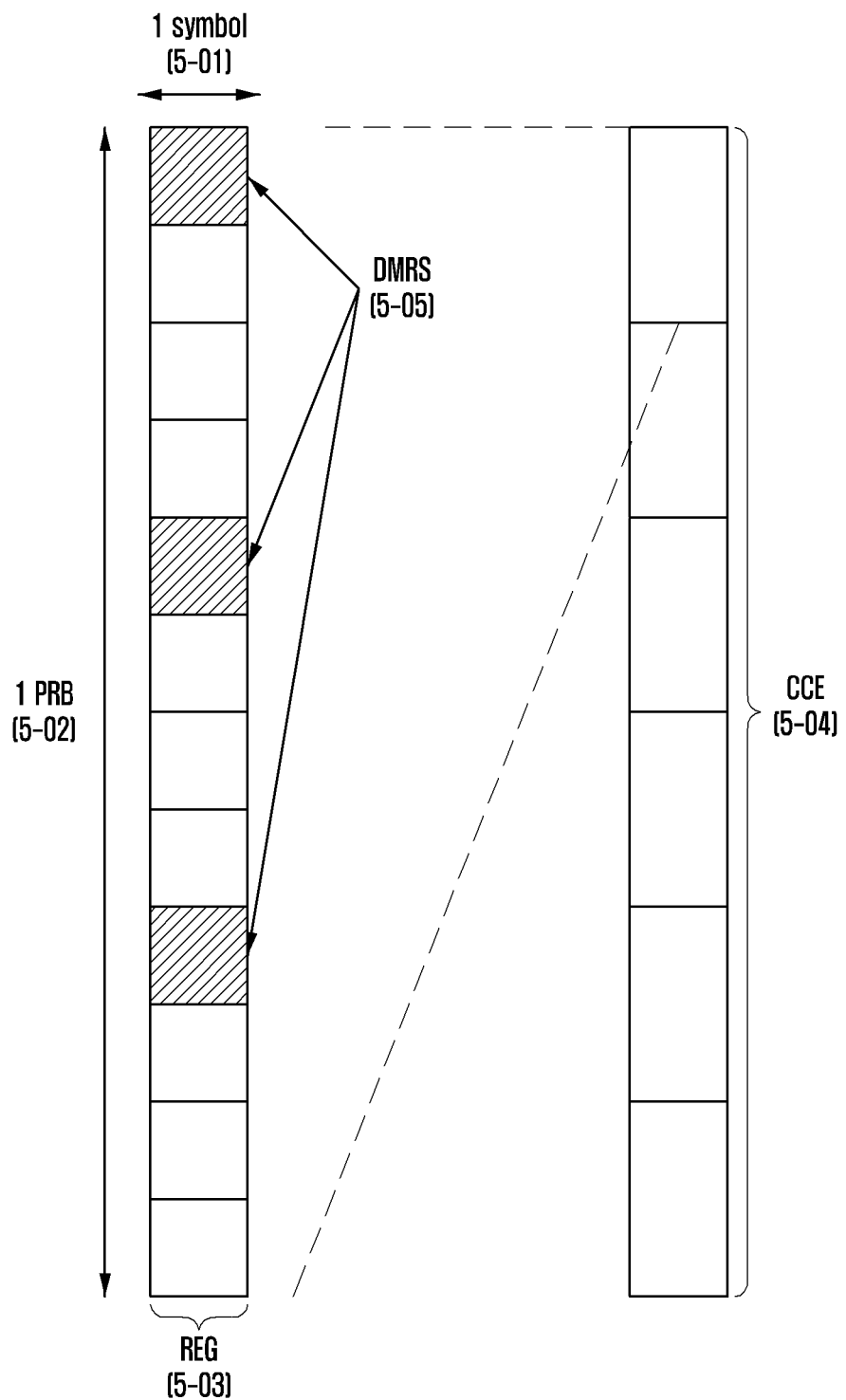
FIG. 5 illustrates a view for explaining the structure of a downlink control channel of a mobile communication system according to an embodiment.

FIG. 5 illustrates a view for explaining the structure of a downlink control channel of a next generation mobile communication system according to an embodiment. That is, FIG. 5 illustrates a view of an example of a basic unit of time and frequency resources configuring a downlink control channel that may be used in 5G according to an embodiment.

Referring to FIG. 5, a basic unit of time and frequency resources constituting a control channel may be defined as a resource element group (REG) 5-03. REG 5-03 may be defined as 1 OFDM symbol 5-01 on the time axis, 1 physical resource block (PRB) 5-02 on the frequency axis, that is, 12 subcarriers. The base station may configure a downlink control channel allocation unit by connecting REGs 5-03.

As illustrated in FIG. 5, when a basic unit to which a downlink control channel is allocated in 5G is called a control channel element (CCE) 5-04, 1 CCE 5-04 may consist of a plurality of REGs 5-03. For example, the REG 5-03 shown in FIG. 5 may be composed of 12 REs, if 1 CCE 5-04 is composed of 6 REGs 5-03, 1 CCE 5-04 may consist of 72 REs. When a downlink control area is configured, the corresponding area may be composed of a plurality of CCEs 5-04, and a specific downlink control channel may be transmitted by being mapped to one or a plurality of CCEs 5-04 according to the aggregation level (AL) in the control area. The CCEs 5-04 in the control area are divided into numbers, and the numbers of the CCEs 5-04 may be assigned according to a logical mapping method.

The basic unit of the downlink control channel shown in FIG. 5, that is, REG 5-03, may include both DCI mapped REs to which DCI is mapped and an area to which the reference signal DMRS 5-05, which is a reference signal for decoding, is mapped. As shown in FIG. 5, three DMRSs 5-05 may be transmitted in 1 REG 5-03. The number of CCEs required to transmit the PDCCH may be 1, 2, 4, 8, or 16 depending on the aggregation level (AL), and the number of different CCEs may be used to implement link adaptation of a downlink control channel. For example, when AL=L, one downlink control channel may be transmitted through L CCEs.

The terminal should detect a signal without knowing the information on the downlink control channel, and a search space indicating a set of CCEs for blind decoding may be defined. The search space is a set of downlink control channel candidates composed of CCEs that the terminal should attempt decoding on a given aggregation level. Since there are various aggregation levels that make a bundle of 1, 2, 4, 8, and 16 CCEs, the terminal may have a plurality of search spaces. The search space set may be defined as a set of search spaces at all configured aggregation levels.

The search space may be classified into a common search space and a terminal-specific search space. According to an embodiment, a certain group of terminals or all terminals may examine a common search space of the PDCCH in order to receive control information common to cells such as dynamic scheduling or paging messages for system information.

For example, the terminal may receive PDSCH scheduling allocation information for transmission of the SIB including the operator information of the cell by examining the common search space of the PDCCH. In the case of the common search space, since a certain group of terminals or all terminals should receive the PDCCH, the common search space may be defined as a set of predetermined CCEs. Meanwhile, the terminal may receive scheduling allocation information for the terminal-specific PDSCH or PUSCH by examining the terminal-specific search space of the PDCCH. The terminal-specific search space may be terminal-specifically defined as a function of the identity of the terminal and various system parameters.

In 5G, parameters for the search space for the PDCCH may be configured from the base station to the terminal by higher layer signaling (e.g., SIB, MIB, RRC signaling). For example, the base station may configure the number of PDCCH candidate groups at each aggregation level L, the monitoring period for the search space, the monitoring occasion in symbol units in the slot for the search space, the search space type (common search space or terminal-specific search space), the combination of the DCI format and RNTI to be monitored in the search space, a control area index to monitor the search space, etc., to the terminal. For example, the above-described configuration may include information such as [Table 9] below.

TABLE 9

```
SearchSpace ::=                          SEQUENCE {
    -- Identity of the search space. SearchSpaceID = 0 identifies the
      SearchSpace configured via PBCH (MIB) or ServingCellConfigCommon.
    searchSpaceId                        SearchSpaceId,
    controlResourceSetId                 ControlResourceSetId,
    monitorinqSlotPeriodicityAndOffset       CHOICE {
        sl1                              NULL,
        sl2                              INTEGER (0..1),
        sl4                              INTEGER (0..3),
        sl5                           INTEGER (0..4),
        sl8                              INTEGER (0..7),
        sl10                             INTEGER (0..9),
        sl16                             INTEGER (0..15),
        sl20                             INTEGER (0..19)
    }
    duration                             INTEGER (2..2559)
    monitoringSymbolsWithinSlot              BIT STRING (SIZE (14))
    nrofCandidates                       SEQUENCE {
        aggregationLevel1                ENUMERATED {n0, n1, n2, n3, n4,
        n5, n6, n8},
        aggregationLevel2                ENUMERATED {n0, n1, n2, n3, n4,
        n5, n6, n8},
        aggregationLevel4                ENUMERATED {n0, n1, n2, n3, n4,
        n5, n6, n8},
        aggregationLevel8                ENUMERATED {n0, n1, n2, n3, n4,
        n5, n6, n8},
        aggregationLevel16                   ENUMERATED {n0, n1, n2, n3,
        n4, n5, n6, n8}
    },
    searchSpaceType                      CHOICE {
        -- Configures this search space as common search space (CSS) and
        DCI formats to monitor.
        common                           SEQUENCE {
        }
        ue-Specific                      SEQUENCE {
            -- Indicates whether the UE monitors in this USS for DCI
        formats 0-0 and 1-0 or for formats 0-1 and 1-1.
            formats                      ENUMERATED {formats0-0-And-
        1-0, formats0-1-And-1-1},
            ...
        }
}
```

Based on the configuration information, the base station may configure one or a plurality of search space sets to the terminal. According to one embodiment, the base station may configure the search space set 1 and the search space set 2, configure the terminal to monitor the DCI format A scrambled with X-RNTI in the search space set 1 in the common search space, and configure the terminal to monitor the DCI format B scrambled with Y-RNTI in the search space set 2 in the terminal-specific search space.

According to the configuration information, one or a plurality of sets of search spaces may exist in a common search space or a terminal-specific search space. For example, search space set #1 and search space set #2 may be configured as a common search space, and search space set #3 and search space set #4 may be configured as a terminal-specific search space.

In the common search space, the combination of the following DCI format and RNTI may be monitored. Of course, it is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI
DCI format 2_0 with CRC scrambled by SFI-RNTI
DCI format 2_1 with CRC scrambled by INT-RNTI
DCI format 2_2 with CRC scrambled by TPC-PUSCH-RNTI, TPC-PUCCH-RNTI
DCI format 2_3 with CRC scrambled by TPC-SRS-RNTI In the terminal-specific search space, the combination of the following DCI format and RNTI may be monitored. Of course, it is not limited to the following examples.

DCI format 0_0/1_0 with CRC scrambled by C-RNTI, CS-RNTI, TC-RNTI
DCI format 1_0/1_1 with CRC scrambled by C-RNTI, CS-RNTI, TC-RNTI The specified RNTIs may follow the definitions and uses below.

C-RNTI (Cell RNTI): Terminal-specific PDSCH scheduling purpose.

TC-RNTI (Temporary Cell RNTI): Terminal-specific PDSCH scheduling purpose.

CS-RNTI (Configured Scheduling RNTI): Semi-statically configured terminal-specific PDSCH scheduling purpose.

RA-RNTI (Random Access RNTI): PDSCH scheduling in random access stage.

P-RNTI (Paging RNTI): PDSCH scheduling for paging transmission.

SI-RNTI (System Information RNTI): For PDSCH scheduling where system information is transmitted.

INT-RNTI (Interruption RNTI): Used to inform whether or not the PDSCH is puncturing.

TPC-PUSCH-RNTI (Transmit Power Control for PUSCH RNTI): Purpose of indicating power control command for PUSCH.

TPC-PUCCH-RNTI (Transmit Power Control for PUCCH RNTI): Purpose of indicating power control command for PUCCH.

TPC-SRS-RNTI (Transmit Power Control for SRS RNTI): Purpose of indicating power control command for SRS.

In an embodiment, the DCI formats described above may be defined as in [Table 10] below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment, in 5G, a plurality of search space sets may be configured with different parameters (e.g., parameters in [Table 9]). Therefore, the set of search space sets monitored by the terminal at each point in time may be different. For example, if the search space set #1 is configured to the X-slot period, the search space set #2 is configured to the Y-slot period, and X and Y are different, the terminal may monitor both the search space set #1 and the search space set #2 in a specific slot, and monitor one of the search space set #1 and the search space set #2 in a specific slot.

When a plurality of search space sets are configured for the terminal, the following conditions may be considered in order to determine the set of search spaces that the terminal should monitor.

[Condition 1: Limit the Maximum Number of PDCCH Candidates]

The number of PDCCH candidates that may be monitored per slot may not exceed W. $M^\mu$ may be defined as the maximum number of PDCCH candidate groups per slot in a cell configured to a subcarrier spacing of 15.2 μkHz, and may be defined as shown in [Table 11] below.

TABLE 11

| μ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limit the Maximum Number of CCEs]

The number of CCEs constituting the entire search space per slot (here, the entire search space may mean the entire set of CCEs corresponding to a union area of a plurality of search space sets) may not exceed $C^\mu$. $C^\mu$ may be defined as the maximum number of CCEs per slot in a cell configured to a subcarrier spacing of 15.2 μkHz, and may be defined as shown in [Table 12] below.

TABLE 12

| μ | Maximum number of CCEs per slot and per serving cell ($C^\mu$) |
| --- | --- |
| 0 | 56 |
| 1 | 56 |
| 2 | 48 |
| 3 | 32 |

For the convenience of description, a situation that satisfies both of the conditions 1 and 2 at a specific point in time may be exemplarily defined as "condition A". Therefore, not satisfying the condition A may mean not satisfying at least one of the conditions 1 and 2 described above.

Depending on the settings of the search space sets of the base station, a condition A may not be satisfied at a specific time. If the condition A is not satisfied at a specific time, the terminal may select and monitor only a subset of the set of search spaces configured to satisfy the condition A at the time, and the base station may transmit the PDCCH to the selected search space set.

According to an embodiment, the following method may be followed as a method of selecting some search spaces from a set of all set search spaces.

[Method 1]

If the condition A for the PDCCH is not satisfied at a specific time (slot), the terminal (or the base station) may preferentially select a set of search spaces in which the search space type is configured as a common search space from among the set of search spaces existing at a corresponding time point over the set of search spaces configured as a terminal-specific search space.

When all of the set of search spaces configured as a common search space are selected (that is, when condition A is satisfied even after selecting all search spaces set as a common search space), the terminal (or the base station) may select a set of search spaces configured as a terminal-specific search space. At this time, when there are a plurality of search space sets configured as terminal-specific search spaces, a search space set having a low search space set index may have a higher priority. In consideration of priority, the terminal or the base station may select the terminal-specific search space sets within a range in which condition A is satisfied.

In the following, time and frequency resource allocation methods for data transmission in NR are described.

Figure 6:
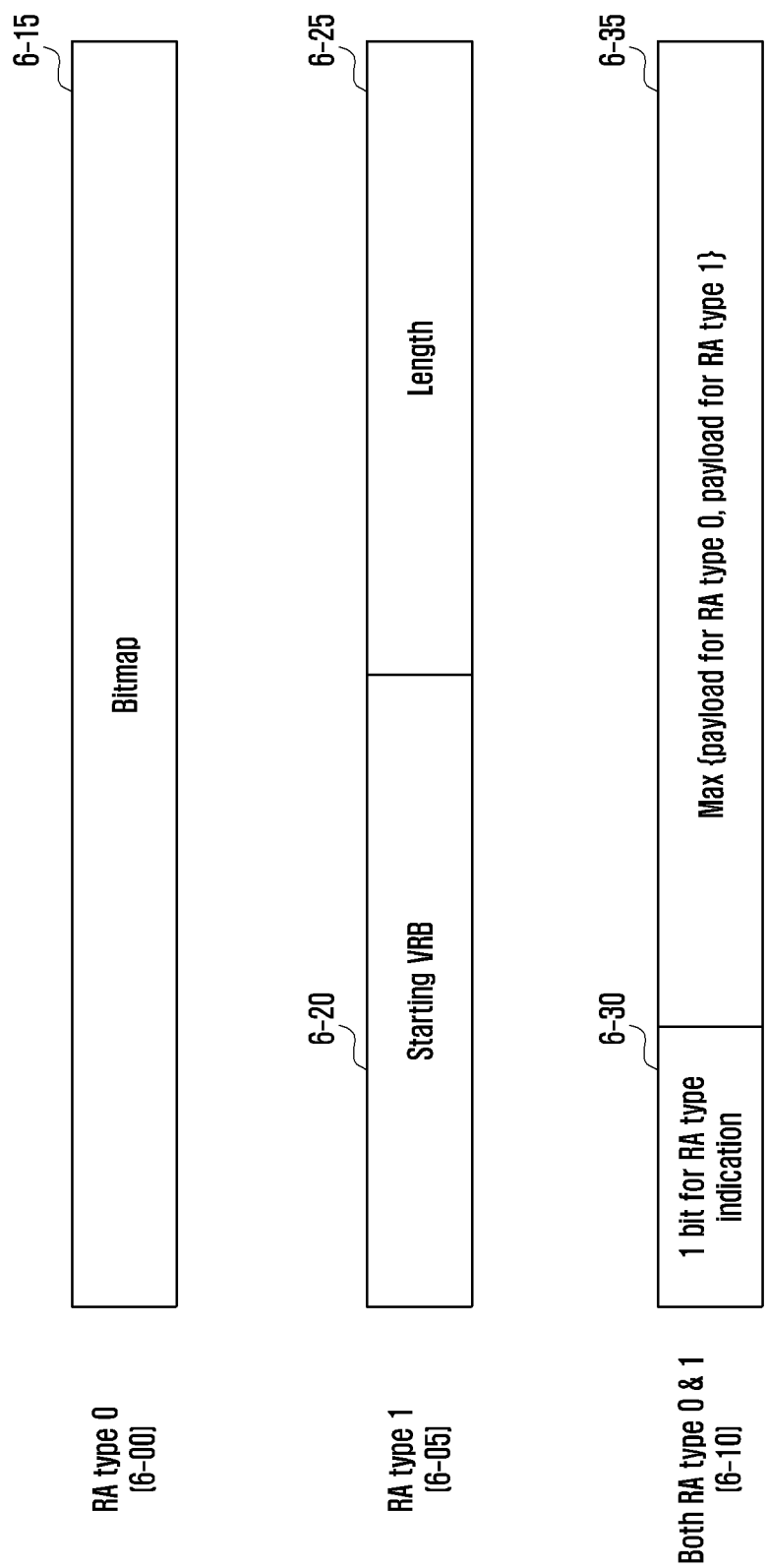
FIG. 6 illustrates a view of an example of PDSCH frequency axis resource allocation in a wireless communication system according to an embodiment.

In NR, the following detailed frequency domain resource allocation (FD-RA) may be provided in addition to frequency axis resource candidate allocation through BWP indication. FIG. 6 illustrates a view of an example of PDSCH frequency axis resource allocation in a wireless communication system according to an embodiment.

FIG. 6 illustrates a view of three frequency axis resource allocation methods of type 0 (6-00), type 1 (6-05), and dynamic switch (6-10) configurable through an upper layer in NR.

Referring to FIG. 6, if the terminal is configured to use only resource type 0 through upper layer signaling (6-00), some downlink control information (DCI) for allocating PDSCH to the corresponding terminal has a bitmap composed of NRBG bits. The conditions for this will be explained again later. At this time, NRBG refers to the number of resource block groups (RBG) determined as shown in [Table 13] according to the BWP size allocated by the BWP indicator and the upper layer parameter RBG-Size. Data is transmitted to the RBG indicated by 1.

TABLE 13

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

If the terminal is configured to use only resource type 1 through upper layer signaling 6-05, some DCIs allocating PDSCH to the corresponding terminal have frequency axis resource allocation information composed of $\lceil \log_2(N_{RB}^{DL,BWP}(B_{RB}^{DL,BWP}+1)/2) \rceil$ bits. The conditions for this will be explained again later. Through this, the base station may configure a starting VRB 6-20 and a length 6-25 of frequency axis resources that are continuously allocated therefrom.

If the terminal is configured to use both resource type 0 and resource type 1 through upper layer signaling (6-10), some DCIs allocating PDSCH to the corresponding terminal have frequency axis resource allocation information composed of bits of a larger value 6-35 among payload 6-15 for configuring resource type 0 and payload 6-20, 6-25 for configuring resource type 1. The conditions for this will be explained again later. At this time, one bit may be added to the first part (MSB) of the frequency axis resource allocation information in DCI, and when the corresponding bit is 0, it may be indicated that resource type 0 is used, and when the corresponding bit is 1, it may be indicated that resource type 1 is used.

In the following, a time domain resource allocation method for a data channel in a next generation mobile communication system (5G or NR system) is described.

The base station may configure a table of time domain resource allocation information for a downlink data channel (physical downlink shared channel (PDSCH)) and an uplink data channel (PUSCH) to the terminal as higher layer signaling (e.g., RRC signaling). A table consisting of a maximum of maxNrofDL-Allocations=16 entries may be configured for PDSCH, and a table consisting of a maximum of maxNrofUL-Allocations=16 entries may be configured for PUSCH. In an embodiment, in the time domain resource allocation information, PDCCH-to-PDSCH slot timing (corresponds to a time spacing in slot units between the time when the PDCCH is received and the time when the PDSCH scheduled by the received PDCCH is transmitted, denoted K0), PDCCH-to-PUSCH slot timing (corresponds to the time interval in slot units between the time when the PDCCH is received and the time when the received PDCCH schedules the PUSCH is transmitted, denoted by K2), information about the location and length of a start symbol for which PDSCH or PUSCH is scheduled in the slot, a mapping type of PDSCH or PUSCH, and the like may be included. For example, information such as [Table 14] or [Table 15] below may be notified from the base station to the terminal.

TABLE 14

| PDSCH-TimeDomainResourceAllocationList information element | | |
| --- | --- | --- |
| PDSCH-TimeDomainResourceAllocationList | ::= SEQUENCE | {SIZE(1..maxNrofFL-Allocations)} OF PDSCH-TimeDomainResourceAllocation |
| PDSCH-TimeDomainResourceAllocation ::= | SEQUENCE { | INTEGER(0..32) |
| k0 | | |

TABLE 14-continued

PDSCH-TimeDomainResourceAllocationList information element

```
OPTIONAL. -- Need S
   mappingType              ENUMERATED {typeA, typeB},
   startSymbolAndLength     INTEGER (0..127)
}
```

TABLE 15

PUSCH-TimeDomainResourceAllocation information element

```
PUSCH-TimeDomainResourceAllocationList  ::=  SEQUENCE     {SIZE(1..maxNrofUL-Allocations)}  OF
PUSCH-TimeDomainResourceAllocation
PUSCH-TimeDomainResourceAllocation ::=       SEQUENCE {
   k2                                        INTEGER(0..32)        OPTIONAL,   -- Need S
   mappingType                               ENUMERATED {typeA, typeB},
   startSymbolAndLength                      INTEGER (0..127)
}
```

The base station may notify the terminal of one of the entries in the table for the time domain resource allocation information described above through L1 signaling (e.g., DCI) (e.g., indicated by the 'time domain resource allocation' field in DCI). The terminal may acquire time domain resource allocation information for PDSCH or PUSCH based on the DCI received from the base station.

Figure 7:
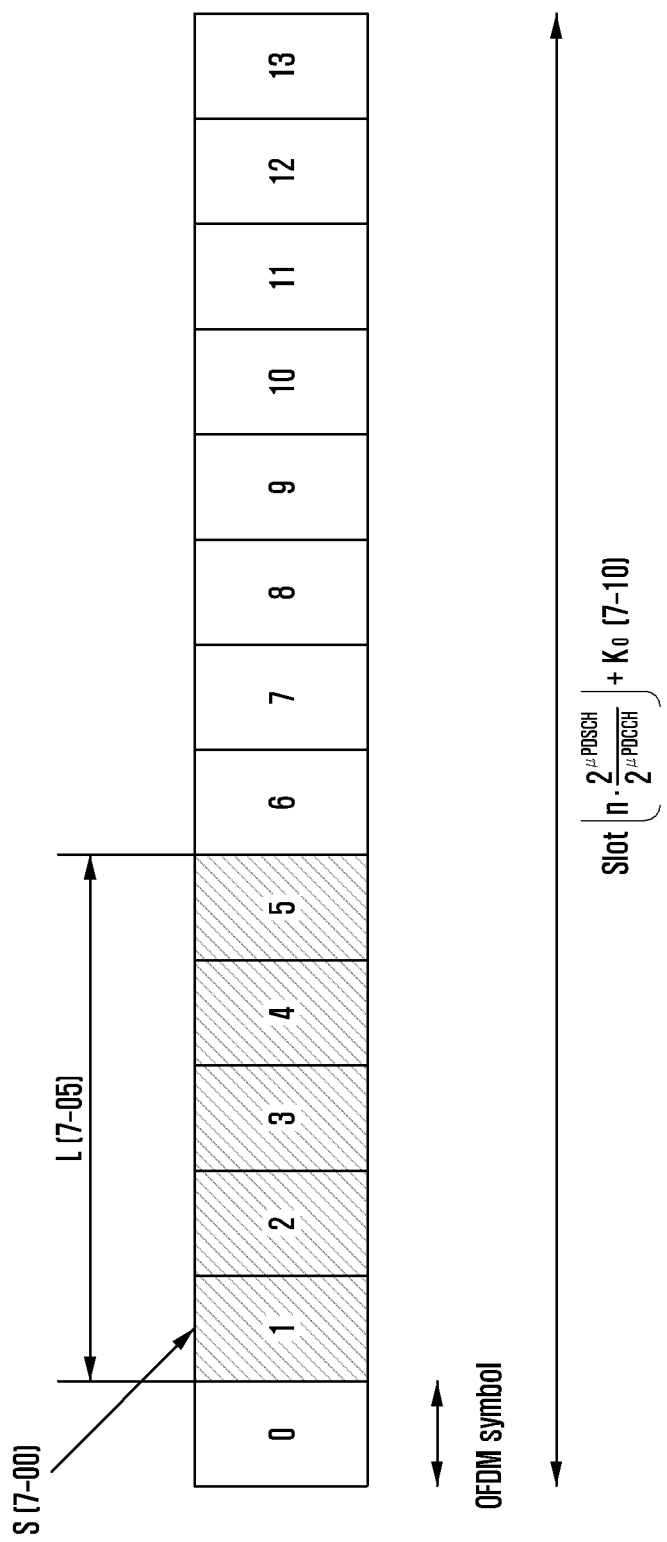
FIG. 7 illustrates a view of an example of physical downlink shared channel (PDSCH) time axis resource allocation in a wireless communication system according to an embodiment.

FIG. 7 illustrates a view of an example of time-domain resource allocation of NR.

Referring to FIG. 7, the base station may indicate subcarrier spacings (SCS) ($\mu_{PDSCH}$, $\mu_{PDCCH}$) of a data channel and a control channel configured using an upper layer, scheduling offset (K0) value, and the time axis position of the PDSCH resource according to the OFDM symbol start position (7-00) and length (7-05) in one slot dynamically indicated through DCI.

Figure 8:
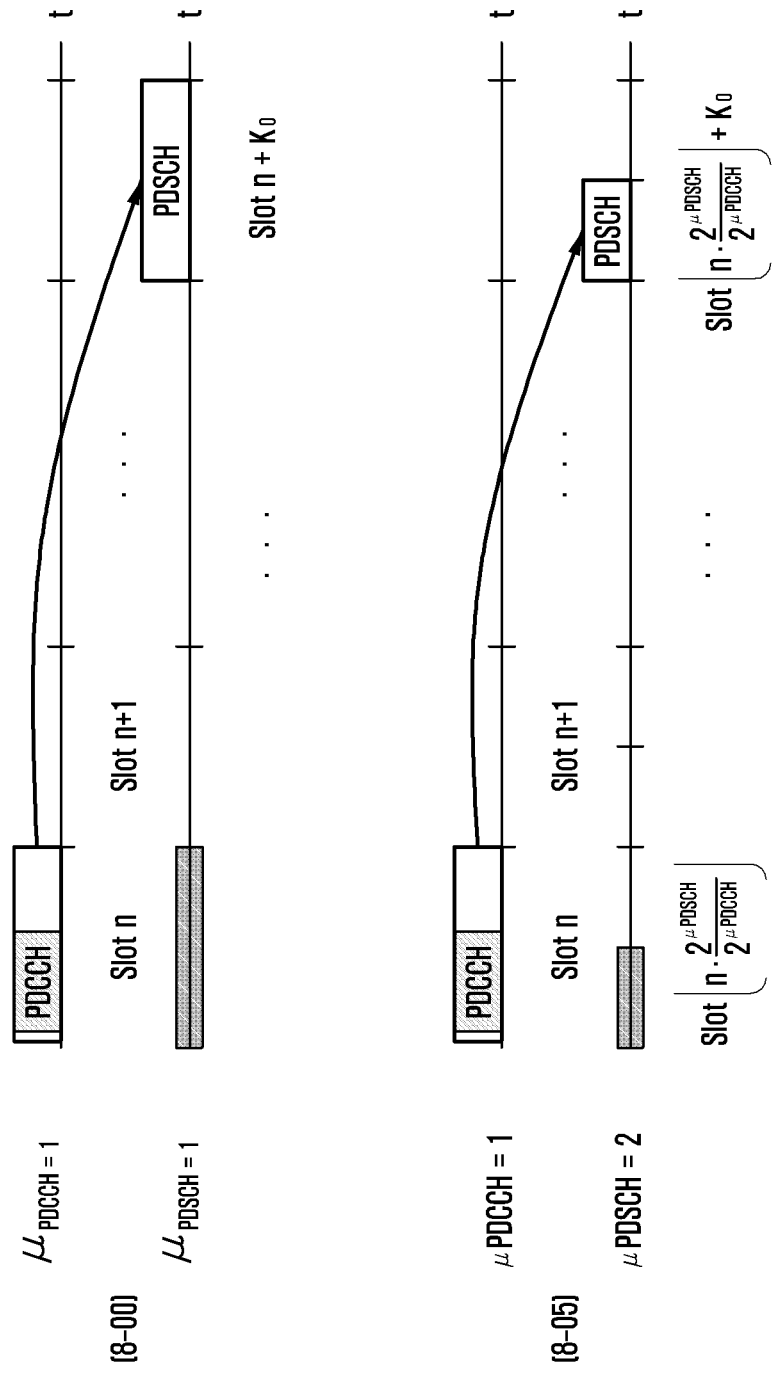
FIG. 8 illustrates a view of an example of time axis resource allocation according to a subcarrier spacing of a data channel and a control channel in a wireless communication system according to an embodiment.

FIG. 8 illustrates a view of an example of time axis resource allocation according to subcarrier spacings of a data channel and a control channel in a wireless communication system according to an embodiment.

Referring to FIG. 8, it may be seen that when the subcarrier spacings of the data channel and the control channel are the same (8-00, $\mu_{PDSCH}=\mu_{PDCCH}$) the slot number for data and control is the same, so that a scheduling offset occurs to the base station and the terminal according to a predetermined slot offset K0. On the other hand, it may be seen that when the subcarrier spacings of the data channel and the control channel are different (8-05, $\mu_{PDSCH}\neq\mu_{PDCCH}$) the slot numbers for data and control are different, so that a scheduling offset occurs to the base station and the terminal, based on the subcarrier spacing of the PDCCH, according to a predetermined slot offset $K_0$.

In LTE and NR, the terminal has a procedure of reporting the capability supported by the terminal to the corresponding base station while connected to the serving base station. In the following description, this is referred to as terminal capability (reporting). The base station may transmit a terminal capability enquiry message requesting capability reporting to a terminal in a connected state. In the message, the base station may include a request for terminal capability for each RAT type. The request for each RAT type may include requested frequency band information. In addition, the terminal capability enquiry message may request a plurality of RAT types from one RRC message container, or a terminal capability enquiry message including a request for each RAT type may be delivered to the terminal multiple times. That is, the terminal capability enquiry is repeated a plurality of times, and the terminal may report the number of times by configuring the corresponding terminal capability information message. In the next-generation mobile communication system, terminal capability requests for MR-DC including NR, LTE, and E-UTRA new radio dual connectivity (EN-DC) may be made. For reference, the terminal capability enquiry message is generally sent initially after the terminal connects, but may be requested under any conditions when the base station is needed.

In the step, the terminal receiving the terminal capability report request from the base station may configure the terminal capability according to the RAT type and band information requested from the base station. In the NR system, a method of configuring terminal capability in the terminal is summarized below.

1. If the terminal is provided with a list of LTE and/or NR bands at the terminal capability request from the base station, the terminal may configure a band combination (BC) for EN-DC and NR stand-alone (SA). That is, a candidate list of BC for EN-DC and NR SA may be configured based on bands requested by the FreqBandList to the base station. Also, the priority of the bands has priority in the order described in FreqBandList.

2. If the base station requests the terminal capability report by configuring the "eutra-nr-only" flag or the "eutra" flag, the terminal may completely remove the NR SA BCs from the configured BC candidate list. This operation may occur only when the LTE base station (eNB) requests "eutra" capability.

3. Thereafter, the terminal may remove fallback BCs from the candidate list of BCs configured in the above step. Here, fallback BC corresponds to a case in which a band corresponding to at least one SCell is removed from a super set BC, and may be omitted because the super set BC may already cover the fallback BC. This step is also applied to multi-RAT dual connectivity (MR-DC), that is, LTE bands may also be applied. The remaining BC after this stage is the final "candidate BC list".

4. The terminal may select BCs to report by selecting BCs corresponding to the requested RAT type in the final "candidate BC list". In this step, the terminal may configure the supportedBandCombinationList in a predetermined order.

That is, the terminal may configure BC and terminal capabilities to report in a predetermined order of rat-Type. (nr->eutra-nr->eutra). In addition, the featureSetCombination for the configured supportedBandCombinationList may be configured, and the list of "candidate feature set combinations" may be constructed from the candidate BC list where the list for fallback BC (which includes the same or lower level capability) is removed. The "candidate feature set combination" includes both feature set combinations for NR and EUTRA-NR BC, and may be obtained from feature set combinations of UE-NR-Capabilities and UE-MRDC-Capabilities containers.

5. Also, if the requested rat type is eutra-nr and affects it, featureSetCombinations may be included in both containers, UE-MRDC-Capabilities and UE-NR-Capabilities. However, the feature set of NR may include only UE-NR-Capabilities.

After the terminal capability is configured, the terminal may transmit a terminal capability information message including terminal capability to the base station. The base station may then perform appropriate scheduling and transmission/reception management for the corresponding terminal based on the terminal capability received from the terminal.

In the NR, a base station may have a CSI framework for instructing terminal to measure and report channel state information (CSI). The CSI framework of the NR may consist of at least two elements: resource setting and report setting, and the report setting may have a connection relationship with each other by referring to at least one ID of the resource setting.

According to an embodiment, the resource setting may include information related to a reference signal (RS) for the terminal to measure channel state information. The base station may configure at least one resource setting to the terminal. As an example, the base station and the terminal may exchange signaling information as shown in [Table 16] in order to transmit information regarding resource settings.

TABLE 16

```
-- ASN1START
-- TAG-CSI-RESOURCECONFIG-START
CSI-ResourceConfig ::=            SEQUENCE {
    csi-ResourceConfigId              CSI-ResourceConfigId,
    csi-RS-ResourceSetList            CHOICE {
        nzp-CSI-RS-SSB                    SEQUENCE {
            nzp-CSI-RS-ResourceSetList        SEQUENCE (SIZE (1..maxNrofNZP-CSI-RS-ResourceSetsPerConfig)}
OF NZP-CSI-RS-ResourceSetId
OPTIONAL, -- Need R
            csi-SSB-ResourceSetList           SEQUENCE (SIZE (1..maxNrofCSI-SSB-ResourceSetsPerConfig)) OF
CSI-SSB-ResourceSetId
OPTIONAL Need R
    },
        csi-IM-ResourceSetList            SEQUENCE {SIZE (1..maxNrofCSI-IM-ResourceSetsPerConfig)) OF
CSI-IM-ResourceSetId
    },
    bwp-Id                            BWP-Id,
    resourceType                      ENUMERATED ( aperiodic, semiPersistent, periodic ),
    ...
}
-- TAG-CSI-RESOURCECONFIG-STOP
-- ASN1STOP
```

In Table 16, signaling information CSI-ResourceConfig includes information about each resource setting. According to the signaling information, each resource setting may include a resource setting index (csi-ResourceConfigId) or a BWP index (bwp-ID), a time axis transmission configuration of a resource (resourceType), or a resource set list (csi-RS-ResourceSetList) including at least one resource set (resource set). The time axis transmission configuration of the resource may be configured to aperiodic transmission, semi-persistent transmission, or periodic transmission. The resource set list may be a set including a resource set for channel measurement or a set including a resource set for interference measurement. When the resource set list is a set including a resource set for channel measurement, each resource set may include at least one resource, which may be an index of a CSI reference signal (CSI-RS) resource or a synchronous/broadcast channel block (SS/PBCH block (SSB)). When the resource set list is a set including a resource set for interference measurement, each resource set may include at least one interference measurement resource (CSI interference measurement (CSI-IM)).

As an example, when the resource set includes CSI-RS, the base station and the terminal may exchange signaling information as shown in [Table 17] in order to transmit information about the resource set.

TABLE 17

```
-- ASN1START
-- TAG-NZP-CSI-RS-RESOURCESET-START
NZP-CSI-RS-ResourceSet ::=  SEQUENCE {
    nzp-CSI-ResourceSetId       NZP-CSI-RS-ResourceSetId
    nzp-CSI-RS-Resources        SEQUENCE (SIZE (1..maxNrofNZP-CSI-RS-ResourcesPerSet)) OF
NZP-CSI-RS-ResourceId,
    repetition                  ENUMERATED ( on, off )
OPTIONAL, -- Need R
    aperiodicTriggeringOffset   INTEGER (0..6)
OPTIONAL, -- Need S
    trs-Info                    ENUMERATED (true)
OPTIONAL, -- Need R
    ...
}
-- TAG-NZP-CSI-RS-RESOURCESET-STOP
-- ASN1STOP
```

In Table 17, signaling information NZP-CSI-RS-ResourceSet includes information about each resource set. According to the signaling information, each resource set may include information about at least a resource set index (nzp-CSI-ResourceSetId) or an index set (nzp-CSI-RS-Resources) of the included CSI-RS, and may include a part of information (repetition) about the spatial domain transmission filter of the included CSI-RS resource or whether to use the tracking of the included CSI-RS resource (trs-Info).

CSI-RS may be the most representative reference signal included in the resource set. The base station and the terminal may send and receive signaling information as shown in [Table 18] in order to transmit information about the CSI-RS resource.

TABLE 18

```
-- ASN1START
-- TAG-NZP-CSI-RS-RESOURCE-START
NZP-CSI-RS-Resource ::=       SEQUENCE {
    nzp-CSI-RS-ResourceId           NZP-CSI-RS-ResourceId,
    resourceMapping                 CSI-RS-ResourceMapping,
    powerControlOffset              INTEGER (-8..15),
    powerControlOffsetSS            ENUMERATED{db-3, db0, db3, db6}    OPTIONAL, --
Need R
    scramblingID                    ScramblingId,
    periodicityAndOffset            CSI-ResourcePeriodicityAndOffset   OPTIONAL, --
-- Cond PeriodicOrSemiPersistant
    qcl-InfoPeriodicCSI-RS          TCI-StateId                        OPTIONAL, -- Cond
Periodic
    ...
}
-- TAG-NZP-CSI-RS-RESOURCE-STOP
-- ASN1STOP
```

In [Table 18], signaling information NZP-CSI-RS-Resource includes information on each CSI-RS. The information included in the signaling information NZP-CSI-RS-Resource may have the following meaning.

nzp-CSI-RS-ResourceId: CSI-RS resource index resourceMapping: resource mapping information of CSI-RS resource powerControlOffset: Ratio between PDSCH EPRE (Energy Per RE) and CSI-RS EPRE powerControlOffsetSS: Ratio between SS/PBCH block EPRE and CSI-RS EPRE scramblingID: scrambling index of CSI-RS sequence periodicityAndOffset: Transmission period and slot offset of CSI-RS resource qcl-InfoPeriodicCSI-RS: TCI-state information when the corresponding CSI-RS is a periodic CSI-RS The resourceMapping included in the signaling information NZP-CSI-RS-Resource represents resource mapping information of CSI-RS resource, and may include frequency resource element (RE) mapping, number of ports, symbol mapping, CDM type, frequency resource density, frequency band mapping information. The number of ports, the frequency resource density, the CDM type, and the time-frequency axis RE mapping that may be configured through this may have a value determined in one of the rows of [Table 19].

TABLE 19

| Row | Ports X | Density p | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1),$ $(k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

[Table 19] represents the frequency resource density, CDM type, frequency axis and time axis start position $(\bar{k}, \bar{l})$ of CSI-RS component RE pattern, the frequency axis RE number (k') and the time axis RE number (l') of the CSI-RS component RE pattern which may be configured according to the number of CSI-RS ports (X). The aforementioned CSI-RS component RE pattern may be a basic unit constituting a CSI-RS resource. Through Y=1+max(k') REs in the frequency axis and Z=1+max(l') REs in the time axis, the CSI-RS component RE pattern may be composed of YZ REs. When the number of CSI-RS ports is 1 port, the CSI-RS RE location may be designated without limitation of a subcarrier in the physical resource block (PRB), and the CSI-RS RE location may be designated by a 12-bit bitmap. When the number of CSI-RS ports is {2, 4, 8, 12, 16, 24, 32} port and Y=2, the CSI-RS RE position may be designated for every two subcarriers in the PRB, and a CSI-RS RE location may be designated by a 6-bit bitmap. When the number of CSI-RS ports is 4 ports and Y=4, the CSI-RS RE position may be designated for every four subcarriers in the PRB, and the CSI-RS RE position may be designated by a 3-bit bitmap. Similarly, the time axis RE position may be designated by a bitmap of 14 bits in total. At this time, according to the Z value in [Table 19], it is possible to change the length of the bitmap as in the frequency location designation. However, since the principle is similar to the above description, redundant description will be omitted below.

According to an embodiment, the report setting may have a connection relationship with each other by referring to at least one ID of a resource setting, and the resource setting(s) having a connection relationship with the report setting provides configuration information including information about the reference signal for measuring channel information. When resource setting(s) having a connection relationship with a report setting is used for measuring channel information, the measured channel information may be used for reporting channel information according to a reporting method set in a report setting having a connection relationship.

According to an embodiment, the report setting may include configuration information related to the CSI reporting method. As an example, the base station and the terminal may exchange signaling information as shown in [Table 20] in order to transmit information regarding report setting.

TABLE 20

```
-- ASN1START
-- TAG-CSI-REPORTCONFIG-START
CSI-ReportConfig ::=              SEQUENCE {
    reportConfigId                    CSI-ReportConfigId,
    carrier                           ServCellIndex            OPTIONAL,    -- Need S
    resourcesForChannelMeasurement    CSI-ResourceConfigId,
    csi-IM-ResourcesForInterference   CSI-ResourceConfigId     OPTIONAL,    -- Need R
    nsp-CSI-RS-ResourcesForInterference  CSI-ResourceConfigId  OPTIONAL,    -- Need R
```

TABLE 20-continued

```
reportConfigType                          CHOICE (
  periodic                                  SEQUENCE (
    reportSlotConfig                            CSI-ReportPeriodicityAndOffset,
    pucch-CSI-ResourceList                      SEQUENCE (SIZE (1..maxNrofBWPs)) OF
PUCCH-CSI-Resource
  },
  semiPersistentOnPUCCH                       SEQUENCE {
    reportSlotConfig                            CSI-ResportPeriodicityAndOffset,
    pucch-CSI-ResourceList                      SEQUENCE (SIZE (1..maxNrofBWPs)) OF
PUCCH-CSI-Resource
  },
  semiPersistentOnPUSCH                       SEQUENCE {
    reportSlotConfig                            ENUMERATED (sl5, sl10, sl20, sl40, sl80, sl160, sl320},
    reportSlotOffsetList                        SEQUENCE (SIZE (1..maxNrofUL-Allocations)) OF
INTEGER (0..32),
    p0alpha                                     F0-PUSCH-AlphaSetId
  },
  aperiodic                                 SEQUENCE {
    reportSlotOffsetList                        SEQUENCE (SIZE (1..maxNrofUL-Allocations)) OF
INTEGER (0..32)
    }
  },
  reportQuantity                          CHOICE {
    none                                    NULL
    cri-RI-PMI-CQI                            NULL,
    cri-RI-i1                               NULL,
    cri-RI-i1-CQI                             SEQUENCE {
      pdsch-BundleSizeForCSI                      ENUMERATED {n2, n4}
OPTIONAL,    --Need R
    },
    cri-RI-CQI                              NULL,
    cri-RSRP                                NULL,
    ssb-Index-RSRP                            NULL,
    cri-RI-LI-PMI-CQI                         NULL
  },
  reportFreqConfiguration                 SEQUENCE {
    cqi-FormatIndicator                       ENUMERATED { widebandCQI, subbandCQI }
OPTIONAL,   -- Need R
    pmi-FormatIndicator                       ENUMERATED { widebandPMI, subbandPMI }
OPTIONAL,   -- Need P
    csi-ReportingBand                         CHOICE {
      subbands3                                 BIT STRINGSIZE(3)),
      subbands4                                 BIT STRINGSIZE(4)),
      subbands5                                 BIT STRINGSIZE(5)),
      subbands6                                 BIT STRINGSIZE(6)),
      subbands7                                 BIT STRINGSIZE(7)),
      subbands8                                 BIT STRINGSIZE(8)),
      subbands9                                 BIT STRINGSIZE(9)),
      subbands10                                BIT STRINGSIZE(10)),
      subbands11                                BIT STRINGSIZE(11)),
      subbands12                                BIT STRINGSIZE(12)),
      subbands13                                BIT STRINGSIZE(13)),
      subbands14                                BIT STRINGSIZE(14)),
      subbands15                                BIT STRINGSIZE(15)),
      subbands16                                BIT STRINGSIZE(16)),
      subbands17                                BIT STRINGSIZE(17)),
      subbands18                                BIT STRINGSIZE(18)),
      ...,
      subbands19-v1530                          BIT STRINGSIZE(19)),
    } OPTIONAL    -- Need S
  }
OPTIONAL,  -- Need R
  timeRestrictionForChannelMeasurements         ENUMERATED {configured, notConfigured},
  timeRestrictionForInterferenceMeasurements    ENUMERATED {configured, notConfigured},
  codebookConfig                                CodebookConfig
OPTIONAL,   -- Need R
  dummy                                       ENUMERATED (n1, n2)
OPTIONAL,   -- Need R
  groupBasedBeamReporting                   CHOICE {
    enabled                                   NULL,
    disabled                                  SEQUENCE {
      nrofReportedRS                              ENUMERATED {n1, n2, n3, n4}
OPTIONAL    -- Need S
    }
  },
  cqi-Table                               ENUMERATED (table1, table2, table3, spare1)
OPTIONAL,  -- Need R
  subbandSize                             ENUMERATED (value1, value2),
  non-PMI-PortIndication                    SEQUENCE (SIZE (1..maxNrofNZP-CSI-RS-ResourcesPerConfig) ) OF
PortIndexForRanks OPTIONAL,    -- Need R
```

TABLE 20-continued

```
...,
[[
semiPersistentOnPUSCH-v1530          SEQUENCE {
    reportSlotConfig-v1530                ENUMERATED {sl4, sl8, sl16}
}
OPTIONAL   -- Need P
]]
}
```

In [Table 20], the signaling information CSI-ReportConfig includes information on each report setting. The information included in the signaling information CSI-ReportConfig may have the following meaning.

reportConfigId: report setting index may be indicated.

carrier: may indicate the serving cell index.

resourcesForChannelMeasurement: A resource setting index for channel measurement that is related to report setting may be indicated.

csi-IM-ResourcesForInterference: A resource setting index with CSI-IM resources for interference measurement that is related to report settings may be indicated.

nzp-CSI-RS-ResourcesForInterference: may indicate a resource setting index with CSI-RS resources for interference measurement that is related to report settings.

reportConfigType: Indicates the time axis transmission setting and transmission channel of channel reporting, and may have aperiodic transmission or semi-persistent physical uplink control channel (PUCCH) transmission or semi-periodic PUSCH transmission or periodic transmission configuration.

reportQuantity: Indicates the type of channel information to be reported, and may have a kind of channel information when channel report is not transmitted ("none") and a kind of channel information when channel report is transmitted ("cri-RI-PMI-CQI", "cri-RI-i1", "cri-RI-i1-CQI", "cri-RI-CQI", "cri-RSRP", "ssb-Index-RSRP", "cri-RI-LI-PMI-CQI"). Here, elements included in the type of channel information mean channel quality indicator (CQI), precoding metric indicator (PMI), CSI-RS resource indicator (CRI), SS/PBCH block resource indicator (SSBRI), layer indicator (LI), rank Indicator (RI), and/or L1-reference signal received power (RSRP).

reportFreqConfiguration: Indicates whether the channel information to be reported includes only information on the entire band or information on each sub-band, and may have configuration information for the sub-band including the channel information when information on each sub-band is included.

timeRestrictionForChannelMeasurements: Among reference signals referenced by reported channel information, it may indicate whether the time axis is restricted for the reference signal for channel measurement.

timeRestrictionForInterferenceMeasurements: Among reference signals referenced by channel information to be reported, it may indicate whether the time axis is restricted for the reference signal for interference measurement.

codebookConfig: may indicate codebook information referred to by channel information to be reported.

groupBasedBeamReporting: may indicate whether or not to beam-group the channel report.

cqi-Table: may indicate a CQI table index referenced by channel information to be reported.

subbandSize: may indicate an index indicating the subband size of the channel information.

non-PMI-PortIndication: may indicate port mapping information that is referred to, when reporting non-PMI channel information.

When the base station instructs to report channel information through higher layer signaling or L1 signaling, the terminal may perform channel information reporting by referring to the setting information included in the indicated report setting.

The base station may instruct the terminal to report channel state information (CSI) through radio resource control (RRC) signaling or higher layer signaling including medium access control (MAC) control element (CE) signaling, or L1 signaling (e.g., common DCI, group-common DCI, terminal-specific DCI).

For example, the base station may instruct a terminal to report an aperiodic channel information (CSI report) through higher layer signaling or DCI using DCI format 0_1. The base station may configure a number of CSI report trigger states including parameters for aperiodic CSI report of the terminal or parameters for CSI report through higher layer signaling. The parameter for the CSI report or the CSI report trigger state is a PDCCH including a DCI and a physical uplink control channel (PUCCH) including a CSI report, or a set including a slot spacing or a possible slot spacing between PUSCH, a reference signal ID, the type of channel information to be included, and the like. When the base station instructs some of the plurality of CSI report trigger states to the terminal through DCI, the terminal reports channel information according to the CSI report setting of the report setting configured in the indicated CSI report trigger state. The time axis resource allocation of the PUCCH or PUSCH including the CSI report of the terminal may be indicated through a slot spacing with the PDCCH indicated through DCI, a start symbol and symbol length indication in a slot for the time axis resource allocation of the PUSCH, or a part or all of the PUCCH resource indication. For example, the location of the slot through which the PUSCH including the CSI report of the terminal is transmitted may be indicated through the slot spacing with the PDCCH indicated through DCI, and the start symbol and symbol length in the slot may be indicated through the time domain resource assignment field of the aforementioned DCI.

For example, the base station may indicate a semi-persistent CSI report to the terminal through higher layer signaling or DCI using DCI format 0_1. The base station may activate or deactivate the semi-persistent CSI report through DCI scrambled with SP-CSI-RNTI or higher layer signaling including MAC CE signaling. When the semi-persistent CSI report is activated, the terminal may periodically report channel information according to a configured slot spacing. When the semi-persistent CSI report is deactivated, the terminal may stop reporting the periodic channel information that was activated. The base station configures a number of CSI report trigger states including parameters for a semi-persistent CSI report or a parameter for a semi-persistent CSI report through higher layer signaling. The parameters for the CSI report, or the CSI report trigger status, may include a slot spacing between a PDCCH including a DCI indicating a CSI report and a PUCCH or PUSCH including a CSI report or a set including a possible slot spacing, a slot spacing between a slot in which the higher layer signaling indicating the CSI report is activated and a PUCCH or PUSCH including the CSI report, a slot spacing period of the CSI report, a type of channel information included, and the like. When the base station activates some of the multiple CSI report trigger states or some of the multiple report settings to the terminal through higher layer signaling or DCI, the terminal may report the channel information according to the report setting included in the indicated CSI report trigger state or the CSI report setting configured in the activated report setting. The time axis resource allocation of the PUCCH or PUSCH including the CSI report of the terminal may be indicated through part or all of the slot spacing period of the CSI report, the slot spacing with the slot where the upper layer signaling is activated, or the slot spacing with the PDCCH indicated through DCI, the start symbol and symbol length indication in the slot for resource allocation in the time axis of the PUSCH, the PUCCH resource indication. For example, the position of the slot through which the PUSCH including the CSI report of the terminal is transmitted may be indicated through the slot spacing with the PDCCH indicated through DCI, and the start symbol and the symbol length in the slot may be indicated through the time domain resource assignment field of the aforementioned DCI format 0_1. For example, the location of the slot in which the PUCCH including the CSI report of the terminal is transmitted may be indicated through the slot spacing period of the CSI report configured through higher layer signaling, a slot spacing between the slot in which the higher layer signaling is activated and the PUCCH including the CSI report, and the start symbol and symbol length in a slot may be indicated through the start symbol and symbol length to which PUCCH resources configured through higher layer signaling are allocated.

For example, the base station may indicate a periodic CSI report to the terminal through the higher layer signaling. The base station may activate or deactivate periodic CSI report through higher layer signaling including RRC signaling. When the periodic CSI report is activated, the terminal may periodically report channel information according to the configured slot spacing. When the periodic CSI report is deactivated, the terminal may stop reporting periodic channel information that has been activated. The base station may configure a report setting including parameters for periodic CSI report of the terminal through higher layer signaling. Parameters for the CSI report may include a slot spacing between a PUCCH or a PUSCH including a CSI report and a slot in which the higher layer signaling indicates the CSI report is activated, a slot spacing period of the CSI report, a reference signal ID for measuring the channel state, the type of channel information, and the like. The time axis resource allocation of the PUCCH or PUSCH including the CSI report of the terminal may be indicated through a part or all of the slot spacing period of the CSI report, the slot spacing with the slot where the upper layer signaling is activated, or the slot spacing with the PDCCH indicated through DCI, the start symbol and symbol length indication in the slot for resource allocation in the time axis of the PUSCH, and the PUCCH resource indication. For example, the location of the slot in which the PUCCH including the CSI report of the terminal is transmitted may be indicated through the slot spacing period of the CSI report configured through higher layer signaling, a slot spacing between the slot in which the higher layer signaling is activated and the PUCCH including the CSI report, and the start symbol and symbol length in a slot may be indicated through the start symbol and symbol length to which PUCCH resources configured through higher layer signaling are allocated.

When the base station instructs the terminal to perform aperiodic CSI report or semi-persistent CSI report through DCI, the terminal may determine whether to perform a valid channel report through the indicated CSI report in consideration of the channel calculation time required for the CSI report. For the aperiodic CSI report or semi-persistent CSI report indicated through DCI, the terminal may perform a valid CSI report from the uplink symbol after the Z symbol after the last symbol included in the PDCCH including the DCI indicating the CSI report, and the above-described Z symbol may be changed according to the numerology of the downlink bandwidth part corresponding to the PDCCH including the DCI indicating the CSI report, the numerology of the uplink bandwidth part corresponding to the PUSCH transmitting the CSI report, and the type or characteristics (report quantity, frequency band granularity, number of reference signals, codebook type, etc.) of the channel information reported in the CSI report. In other words, in order to determine which CSI report is a valid CSI report (if the CSI report is a valid CSI report), uplink transmission of the corresponding CSI report should not be performed before the Zref symbol including timing advance. At this time, the Zref symbol is an uplink symbol that starts a cyclic prefix (CP) after a time $T_{proc,CSI}=(Z)(2048+144)\cdot\kappa 2^{-\mu}\cdot T_C$ from the moment the last symbol of the triggering PDCCH ends. Here, the detailed value of Z follows the description below, $T_c=1/(\Delta f_{max}\cdot N_f)$, $\Delta f_{max}=480\cdot 10^3$ Hz, $N_f=4096$, $\kappa=64$, and $\mu$ is numerology. At this time, $\mu$ may be promised to use the one that causes the largest value $T_{proc,CSI}$ among ($\mu_{PDCCH}$, $\mu_{CSI-RS}$, $\mu_{UL}$), $\mu_{PDCCH}$ may mean a sub-carrier spacing used for PDCCH transmission, $\mu_{CSI-RS}$ may mean a subcarrier spacing used for CSI-RS transmission, and $\mu_{UL}$ may mean a subcarrier spacing of an uplink channel used for uplink control information (UCI) transmission for CSI reporting. As another example, may be promised to use the one that causes the largest value $T_{proc,CSI}$ of ($\mu_{PDCCH}$, $\mu_{UL}$). The definition of the $\mu_{PDCCH}$ and $\mu_{UL}$ is referred to the description above. For the convenience of future explanation, satisfying the above conditions is referred to as satisfying CSI reporting validity condition 1.

In addition, when a reference signal for measuring a channel for an aperiodic CSI report instructed to the terminal through DCI is an aperiodic reference signal, valid CSI report may be performed from the uplink symbol after the Z' symbol since the end of the last symbol containing the reference signal, and the above-mentioned Z' symbol may vary depending on numerology of the downlink bandwidth part corresponding to the PDCCH including the DCI indicating the CSI report, numerology of the bandwidth corresponding to the reference signal for channel measurement for the CSI report, numerology of the uplink bandwidth part corresponding to the PUSCH transmitting the CSI report, the type or characteristics (report quantity, frequency band granularity, reference signal port number, codebook type, etc.) of the channel information reported in the CSI report. In other words, in order to determine which CSI report is a valid CSI report (if the CSI report is a valid CSI report), the uplink transmission of the corresponding CSI report should not be performed before the Zref symbol including timing advance. At this time, the Zref symbol is an uplink symbol that starts a cyclic prefix (CP) after a time $T'_{proc,CSI}=(Z')$ $(2048+144)\cdot\kappa2-\mu\cdot T_C$ from the moment the last symbol of the aperiodic CSI-RS or the aperiodic CSI-IM triggered by the triggering PDCCH ends. Here, the detailed value of Z' follows the description below $T_c=1/(\Delta f_{max}\cdot N_f)$, $\Delta f_{max}=480\cdot 10^3$ Hz, $N_f=4096$, $\kappa=64$, and $\mu$ is numerology. At this time, $\mu$ may be promised to use the one that causes the largest value $T_{proc,CSI}$ among $(\mu_{PDCCH},\mu_{CSI-RS},\mu_{UL})$, $\mu_{PDCCH}$ may mean a sub-carrier spacing used for triggering PDCCH transmission, $\mu_{CSI-RS}$ may mean a subcarrier spacing used for CSI-RS transmission, and $\mu_{UL}$ may mean a subcarrier spacing of an uplink channel used for uplink control information (UCI) transmission for CSI reporting. As another example, $\mu$ may be promised to use the one that causes the largest value $T_{proc,CSI}$ among $(\mu_{PDCCH},\mu_{UL})$. At this time, the definition of $\mu_{PDCCH}$ and $\mu_{UL}$ refer to the above description. For the convenience of future explanation, satisfying the above conditions is referred to as satisfying CSI reporting validity condition 2.

If the base station instructs the terminal aperiodic CSI report for the aperiodic reference signal through the DCI, the terminal may perform a valid CSI report from the first uplink the symbol that satisfies both the time since the Z symbol since the last symbol included in the PDCCH including the DCI indicating the CSI report and the time after the Z' symbol after the last symbol containing the reference signal is over. That is, in the case of aperiodic CSI reporting based on the aperiodic reference signal, it is determined as a valid CSI report when both of the CSI reporting validity conditions 1 and 2 are satisfied.

If the CSI report time point indicated by the base station does not satisfy the CSI computation time requirement, the terminal may determine that the corresponding CSI report is invalid and may not consider updating the channel information state for the CSI report.

Z and Z' symbols for calculating the aforementioned CSI computation time follow [Table 21] and [Table 22] below. For example, when the channel information reported in the CSI report includes only wideband information, the number of reference signal ports is 4 or less, the reference signal resource is one, the codebook type is "type1-SinglePanel", or the type of channel information reported (report quantity) is "cri-RI-CQI", Z and Z' symbols follow the values $Z_1$, $Z_1'$ in [Table 22]. In the future, this will be referred to as delay requirement 2. In addition, when the PUSCH including the CSI report does not include TB or HARQ-ACK and the CPU occupation of the terminal is 0, the Z and Z' symbols follow the values $Z_1,Z_1'$ in [Table 21] and this is referred to as the delay requirement 1 (delay requirement 1). The above-described description of the CPU occupation has been described in detail below. In addition, when the report quantity is "cri-RSRP" or "ssb-Index-RSRP", the symbols Z and Z follow the values $Z_3,Z_3'$ in [Table 22]. X1, X2, X3, and X4 in Table 22 refer to the terminal capability for the beam reporting time, and KB1 and KB2 in Table 22 refer to the terminal capability for the beam change time. If it does not correspond to the type or characteristic of the channel information reported in the above-described CSI report, the Z and Z' symbols follow the values $Z_2,Z_2'$ in [Table 22].

TABLE 21

| | $Z_1$ [symbols] | |
| --- | --- | --- |
| μ | $Z_1$ | $Z_1'$ |
| 0 | 10 | 8 |
| 1 | 13 | 11 |
| 2 | 25 | 21 |
| 3 | 43 | 36 |

TABLE 22

| | $Z_1$ [symbols] | | $Z_2$ [symbols] | | $Z_3$ [symbols] | |
| --- | --- | --- | --- | --- | --- | --- |
| μ | $Z_1$ | $Z_1'$ | $Z_2$ | $Z_2'$ | $Z_3$ | $Z_3'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When the base station instructs the terminal to aperiodic/semi-persistent/periodic CSI report, the CSI reference resource (CSI reference resource) may be configured in slot units to determine a reference time for a reference signal for measuring channel information reported in the CSI report. For example, when instructing to transmit CSI report #X in uplink slot n', CSI reference resource of CSI report #X transmitted in uplink slot n' may be defined as downlink slot n-nCSL$_{-ref}$. The downlink slot n is calculated as $n=\lfloor n'\cdot 2^{\mu DL}/2^{\mu UL}\rfloor$ by taking into account the downlink and uplink pneumatic neurons μDL and μUL. The slot spacing between the downlink slot n and the CSI reference resource, nCSI$_{ref}$ follows $n_{CSI-ref}=4\cdot 2^{\mu DL}$ when CSI report #0 transmitted in uplink slot n' is a semi-persistent or periodic CSI report, and follows $n_{CSI-ref}=5\cdot 2^{\mu DL}$ when multiple CSI-RS resources are connected to the corresponding CSI report according to the number of CSI-RS resources for channel measurement. When the CSI report #0 transmitted in the uplink slot n' is an aperiodic CSI report, it is calculated as $n_{CSI-ref}=\lfloor Z'/N_{symb}^{slot}\rfloor$ in consideration of the CSI computation time Z' for channel measurement. The above $N_{symb}^{slot}$ is the number of symbols included in one slot, it is assumed as $N_{symb}^{slot}=14$ in the NR.

When the base station instructs the terminal to transmit a certain CSI report in uplink slot n' through higher layer signaling or DCI, the terminal may report CSI by performing channel measurement or interference measurement on CSI-RS resource or CSI-IM resource or SSB resources transmitted not later than the CSI reference resource slot of the CSI report transmitted in the uplink slot n' among the CSI-RS resource or CSI-IM or SSB resource associated with the corresponding CSI report. The CSI-RS resource, CSI-IM resource, SSB resource associated with the corresponding CSI report may mean a CSI-RS resource, a CSI-IM resource, an SSB resource included in a resource set configured in a resource setting referred to by a report setting for a CSI report of a terminal configured through higher layer signaling, the CSI-RS resource, the CSI-IM resource, the SSB resource referenced by a CSI report trigger state including parameters for a corresponding CSI report, CSI-RS resource, CSI-IM resource, or SSB resource indicated by the ID of the reference signal (RS) set.

The CSI-RS/CSI-IM/SSB occasion in embodiments refers to a transmission time point of CSI-RS/CSI-IM/SSB resource(s) determined by a combination of DCI triggering and a higher layer configuration or higher layer configuration. For example, a semi-persistent or periodic CSI-RS resource is determined according to a slot period and a slot offset configured as higher layer signaling, and the transmission symbol(s) in the slot is determined by referring to one of the resource mapping methods in the slot of [Table 19] according to the resource mapping information (resourceMapping). As another example, in the aperiodic CSI-RS resource, a slot to be transmitted is determined according to a slot offset with a PDCCH including a DCI indicating channel reporting configured as higher layer signaling, and the transmission symbol(s) in the slot is determined by referring to one of the resource mapping methods in the slot of [Table 19] according to the resource mapping information (resourceMapping).

The above-described CSI-RS occasion may be determined by independently considering transmission times of each CSI-RS resource or comprehensively considering transmission times of one or more CSI-RS resource(s) included in the resource set. Accordingly, the following two interpretations are possible for the CSI-RS occasion according to each resource set configuration.

- Interpretation 0-1-1: From the start time of the earliest symbol to which one specific resource is transmitted to the end time of the latest symbol among the one or more CSI-RS resources included in the resource set(s) configured in the resource setting referred to by the report setting configured for the CSI report.
- Interpretation 0-1-2: From the start point of the earliest symbol to which the CSI-RS resource transmitted at the earliest time is transmitted, to the end point of the latest symbol to which the CSI-RS resource transmitted at the earliest time is transmitted among all CSI-RS resources included in the resource set(s) configured in the resource setting referenced by the report setting configured for the CSI report.

Hereinafter, in the embodiments, it is possible to individually apply considering both interpretations of the CSI-RS occasion. In addition, it is possible to consider both interpretations of the CSI-IM occasion and the SSB occasion, such as the CSI-RS occasion, but the principle is similar to the above description, so that the repeated description will be omitted below.

In embodiments, "CSI-RS/CSI-IM/SSB occasion for CSI report #X transmitted from uplink slot n'" means a set of CSI-RS occasion, CSI-IM occasion, SSB occasion that are not later than the CSI reference resource of CSI report #X transmitted from the uplink slot n' among CSI-RS resource, CSI-IM resource, CSI-RS occasion of SSB resource, CSI-IM occasion, SSB occasion included in the resource set configured in the resource setting referred to by the report setting configured for CSI report #X.

In the embodiments, for "the latest CSI-RS/CSI-IM/SSB occasion for CSI report #X transmitted in uplink slot n'", the following two interpretations are possible.

- Interpretation 0-2-1: A set of the latest CSI-RS occasion for the CSI report #X transmitted in the uplink slot n' and the latest CSI-RS occasion, the latest CSI-IM occasion for the CSI report #X transmitted in the uplink slot n' and the latest CSI-IM occasion, and occasion including the latest SSB occasion among the SSB occasions for CSI report #0 transmitted in uplink slot n'
- Interpretation 0-2-2: CSI-RS occasion, CSI-IM occasion, SSB occasion for CSI report #X transmitted in uplink slot n'

Hereinafter, in the embodiments, it is possible to individually apply considering both interpretations of the latest CSI-RS/CSI-IM/SSB occasion for CSI report #X transmitted from uplink slot n', which is the latest CSI-RS/CSI-IM/SSB occasion. In addition, when considering the above two interpretations (interpretation 0-1-1, interpretation 0-1-2) for the CSI-RS occasion, CSI-IM occasion, and SSB occasion, in the embodiments, "the last CSI-RS/CSI-IM/SSB occasion of CSI-RS/CSI-IM/SSB occasion for CSI report #X transmitted in uplink slot n'" may be applied individually considering all four different interpretations (apply interpretation 0-1-1 and interpretation 0-2-1, apply interpretation 0-1-1 and interpretation 0-2-2, apply interpretation 0-1-2 and interpretation 0-2-1, and are applied interpretation 0-1-2 and interpretation 0-2-2).

The base station may instruct the CSI report in consideration of the amount of channel information that the terminal can simultaneously calculate for the CSI report, that is, the number of channel information calculation units (CSI) of the terminal. If the number of channel information calculation units that the terminal may simultaneously calculate is $N_{CPU}$, the terminal might not expect the CSI report indication of the base station that needs more channel information calculation than $N_{CPU}$ or might not consider updating channel information that requires more channel information calculation than $N_{CPU}$, $N_{CPU}$ may be reported by the terminal to the base station through higher layer signaling or may be configured by the base station through higher layer signaling.

It is assumed that the CSI report instructed by the base station to the terminal occupies part or all of the CPU for calculating the channel information among the total number $N_{CPU}$ of channel information that the terminal may simultaneously calculate. For each CSI report $n(n=0, 1, \ldots, N-1)$ for example, if the number of channel information calculation units required for a CSI report is $O_{CPU}^{(n)}$, the number of channel information calculation units required for a total of N CSI reports may be referred to as $\Sigma_{n=0}^{N-1} O_{CPU}^{(n)}$. The required channel information calculation unit for each reportQuantity configured in the CSI report may be configured as shown in [Table 23].

TABLE 23

$O_{CPU}^{(n)} = 0$: When reportQuantity set in CSI report is configured as 'none', and trs-Info is configured in the CSI-RS resource set associated with the CSI report.
$O_{CPU}^{(n)} = 1$: When the reportQuantity configured in the CSI report is configured as 'none', 'cri-RSRP', and 'ssb-Index-RSRP', and trs-Info is not configured in the CSI-RS resource set associated with the CSI report.
The reportQuantity configured in the CSI report is 'cri-RI-PMI-CQI', 'cri-RI-i 1', 'cri-RI-i1-CQI', 'cri-RI-CQI', or 'cri-RI-LI-PMI-CQI'
>> $O_{CPU}^{(n)} = N_{CPU}$: When the aperiodic CSI report is triggered and the corresponding CSI report is not multiplexed with one or both of TB/HARQ-ACK. The corresponding CSI report is a wideband CSI, corresponds to up to 4 CSI-RS ports, corresponds to a single resource without a CRI report, and the codebookType corresponds to 'typeI-SinglePanel' or reportQuantity corresponds to 'cri-RI-CQI'

TABLE 23-continued (In this case, it corresponds to the above-described delay requirement 1, and it can be regarded as a case where the terminal quickly calculates and reports the CSI using all available CPUs)
 >> $O_{CPU}^{(n)} = K_s$ :All other cases except the above. K_s indicates the number of CSI-RS resources in the CSI-RS resource set for channel measurement.

If the number of channel information calculations required by a terminal for a plurality of CSI reports at a certain time is greater than the number $N_{CPU}$ of channel information calculation units that the terminal may simultaneously calculate, the terminal might not consider updating channel information for some CSI reports. Among the multiple indicated CSI reports, a CSI report that does not consider updating of channel information is determined by considering at least the time when the calculation of channel information required for the CSI report occupies the CPU and the priority of the reporting channel information. For example, the calculation of the channel information required for the CSI report might not take into account the update of the channel information for the CSI report that starts when the time when the CPU takes the most time, updating channel information preferentially might not be considered for a CSI report having a low priority of channel information.

The priority of the channel information may be determined with reference to [Table 24] below.

Figure 9:
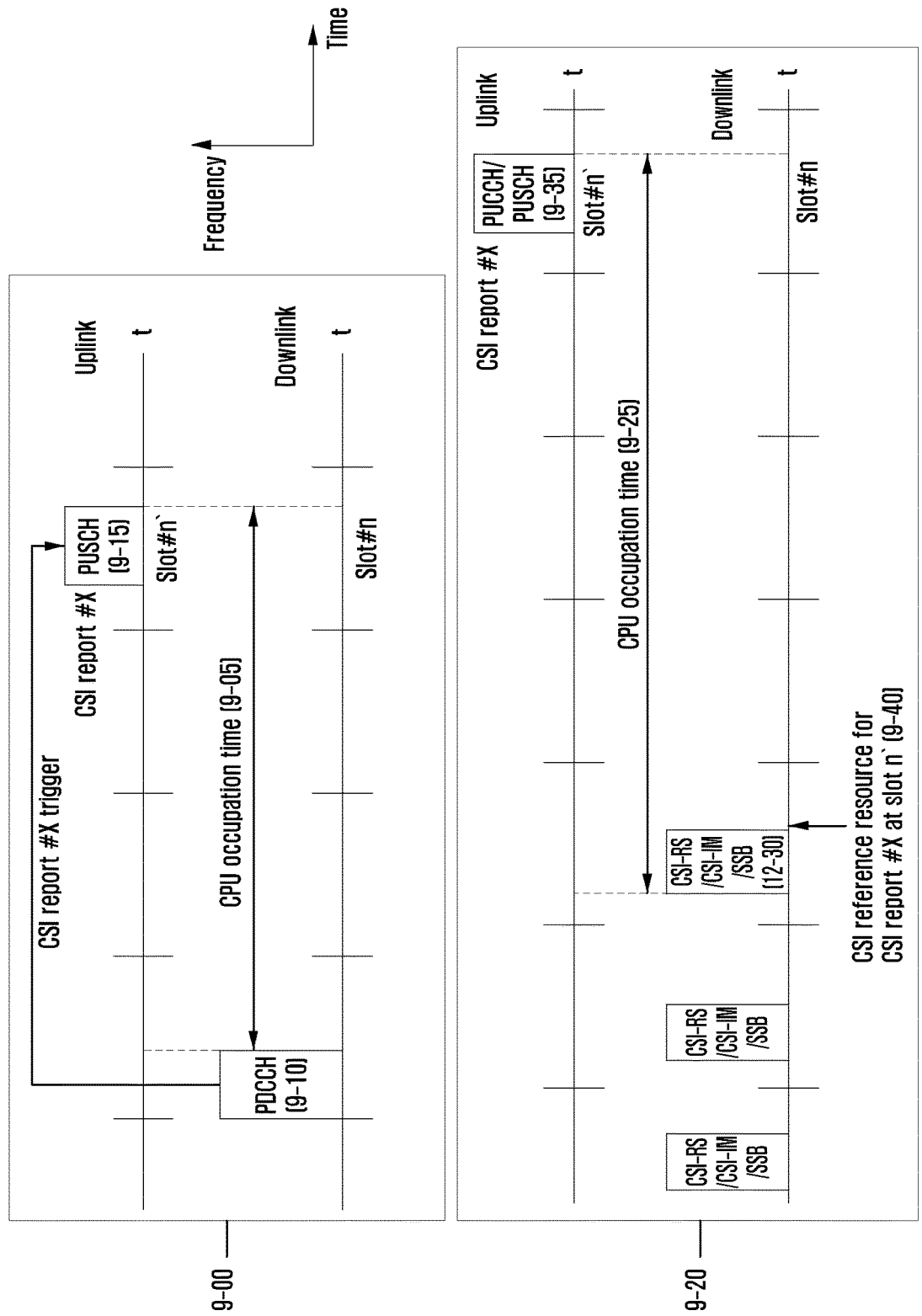
FIG. 9 illustrates a view of an example of a CPU occupation time for a CSI report in which the report quantity included in the CSI report is not configured to "none" according to some embodiments.

9-00 of FIG. 9 illustrates a diagram of CPU occupation time for an aperiodic CSI report in which the report quantity included in the CSI report according to some embodiments is not configured to "none". When the base station instructs to transmit aperiodic CSI report #X in uplink slot n' through DCI using DCI format 0_1, the CPU occupation time (9-05) for CSI report #X transmitted in the uplink slot n' may be defined from the next symbol of the last symbol occupied by the PDCCH (9-10) including the DCI indicating the aperiodic CSI report #X to the last symbol occupied by the PUSCH 9-15 including the CSI report #X transmitted in the link slot n'.

9-20 of FIG. 9 illustrates a view of CPU occupation time for a periodic or semi-persistent CSI report in which the report quantity included in the CSI report according to some embodiments is not configured to "none". When the base station instructs to transmit periodic or semi-persistent CSI report #X in uplink slot n' through DCI using DCI format 0_1 scrambled with higher layer signaling or SP-CSI-RNTI, the CPU occupation time (9-25) for CSI report #X trans-

TABLE 24

CSI priority value Pri_iCSI (y, k, c, s) = 2 · N_cells · M_s · y + N_cells · M_s · k + M_s · c + s,
 y = 0 aperiodic CSI report transmitted on PUSCH, y = 1 semi-persistent CSI report transmitted on PUSCH, y = 2 semi-persistent CSI report transmitted on PUCCH, y = 3 periodic CSI report transmitted on PUCCH;
 k = 0 the CSI report contains L1-RSRP, k = 1 the CSI report does not include L1-RSRP;
 c: Serving cell index, $N_{ce}n_s$ : The maximum number of serving cells set to higher layer signaling (maxNrofServingCells);
 s: CSI report configuration index (reportConfigID), $M_s$: The maximum number of CSI report configurations set as the higher layer signaling (maxNrofCSI-Reportconfigurations).

The CSI priority for the CSI report is determined through the priority values $Pri_{iCSI}$ (y, k, c, s) in [Table 24]. Referring to [Table 24], the CSI priority values is determined through the type of channel information included in the CSI report, the time axis reporting characteristic of the CSI report (aperiodic, semi-persistent, periodic), the channel through which the CSI report is transmitted (PUSCH, PUCCH), the serving cell index, and the CSI report setting index. The CSI priority for the CSI report is compared with the priority value $Pri_{iCSI}$ (y, k, c, s), and it is determined that the CSI priority for the CSI report with a low priority value is high.

If the time when the calculation of the channel information required for the CSI report that the base station instructs the terminal occupies the CPU is the CPU occupation time, CPU occupation time is determined by considering some or all of the type of channel information included in the CSI report, the time axis characteristics (aperiodic, semi-persistent, periodic) of the CSI report, the higher layer signaling indicating the CSI report or the slot or symbol occupied by DCI, and the slots or symbols occupied by the reference signal for measuring the channel condition.

FIG. 9 illustrates a view of an example of a CPU occupation time for a CSI report in which the report quantity included in the CSI report is not configured to "none", according to some embodiments.

mitted in uplink slot n' may be defined from the first symbol of the first transmitted CSI-RS/CSI-IM/SSB resource corresponding to the latest CSI-RS/CSI-IM/SSB occasion (9-30) among the CSI-RS/CSI-IM/SSB occasions for CSI report #X transmitted in uplink slot n' to the last symbol occupied by the containing PUCCH or PUSCH (9-35) including CSI report #X transmitted in uplink slot n'. The latest CSI-RS/CSI-IM/SSB occasion (9-30) might not be located after the CSI reference resource (9-40) for CSI report #X. Exceptionally, when the base station instructs the semi-persistent CSI report through DCI and the terminal performs the first CSI report of the semi-persistent CSI report #X, the CPU occupation time for the first CSI report may be defined from the next symbol of the last symbol occupied by the PDCCH containing the DCI indicating the semi-persistent CSI report #X to the last symbol occupied by the PUSCH including the first CSI report. Through this, it is possible to ensure a causality of operation on the time axis of the terminal in consideration of the time point at which the CSI report is indicated and the time point at which the CPU occupation time starts.

As an example, the rules shown in Table 25 below may be followed.

TABLE 25

For a CSI report with CSI-ReportConfig with higher layer parameter reportyQuantity not set to 'none', the CPU (s) are occupied for a number of OFDM symbols as follows:
   A periodic or seal-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
   An aperiodic CSI report occupies CPU(s) from the first symbol after the PDCCH triggering the CSI report until the last symbol of the PUSCH carrying the report.
   An initial semi-persistent CSI report on PUSCH after the PDCCH trigger occupies- CPU(s) from the first symbol after the PDCCH until the last symbol of the PUSCH carrying the report.

Figure 10:
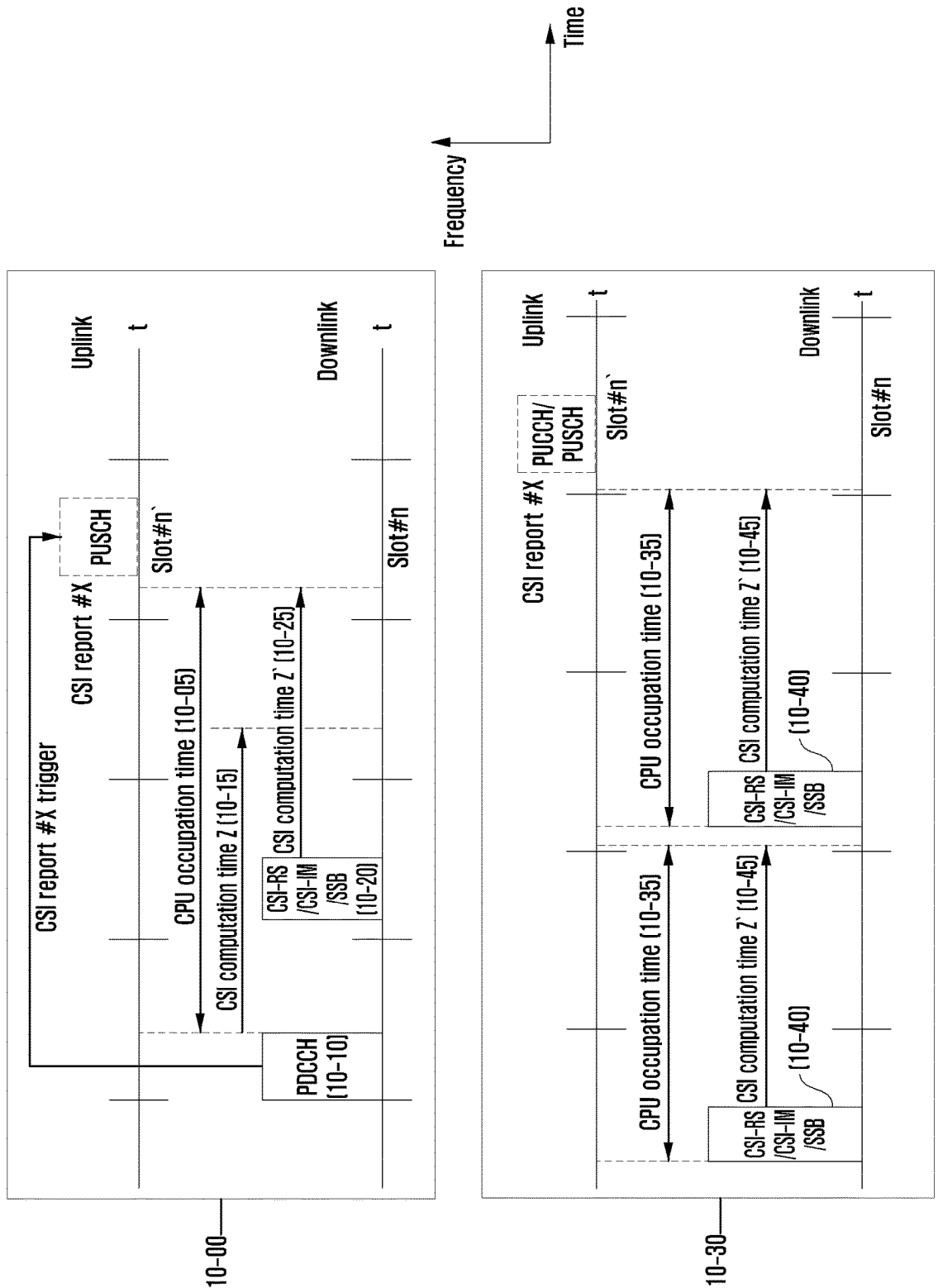
FIG. 10 illustrates a view of an example of a CPU occupation time for a CSI report in which a report quantity included in a CSI report is configured to "none" according to some embodiments.

FIG. 10 illustrates a view of an example of a CPU occupation time for a CSI report in which a report quantity included in a CSI report is configured to "none" according to some embodiments.

10-00 of FIG. 10 illustrates a view of CPU occupation time for an aperiodic CSI report in which a report quantity included in a CSI report is configured as "none", according to some embodiments. When the base station instructs to transmit aperiodic CSI report #X in uplink slot n' through DCI using DCI format 0_1, the CPU occupation time (10-05) for CSI report #X transmitted in the uplink slot n' may be defined from the next symbol of the last symbol occupied by the PDCCH (10-10) containing the DCI indicating the aperiodic CSI report #X to the symbol that completes the CSI computation. The above symbol that completes the CSI computation means the latest symbol among the symbol after CSI computation time Z (10-15) of the last symbol occupied by the PDCCH including the DCI indicating the CSI report #X and the symbols after CSI computation time Z'(10-25) of the last symbol of the most recent CSI-RS/CSI-IM/SSB occasion (10-20) for CSI report #X transmitted in the uplink slot n'.

10-30 of FIG. 10 illustrates a view of CPU occupation time for a periodic or semi-persistent CSI report in which the report quantity included in the CSI report is configured as "none", according to some embodiments. When the base station instructs to transmit periodic or semi-persistent CSI report #X in uplink slot n' through DCI using DCI format 0_1 scrambled with higher layer signaling or SP-CSI-RNTI, the CPU occupation time (13-35) for CSI report #X transmitted in uplink slot n' may be defined from the first symbol of the first transmitted CSI-RS/CSI-IM/SSB resource corresponding to each CSI-RS/CSI-IM/SSB occasion (10-40) for CSI report #X transmitted in uplink slot n' to the symbol after CSI computation time Z' (10-45) of the last symbol of the last transmitted CSI-RS/CSI-IM/SSB resource.

As an example, the rules shown in Table 26 below may be followed.

TABLE 26

For a CSI-ReportConfig with higher layer parameter reportQuantity set to 'none' and CSI-RS-ResourceSet with higher layer parameter trs-Info is not configured, the CPU(s) are occupied for a number of OFDM symbols as follows:
   A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z_3$ symbols after the last symbol of the latest one of the CSI-RS/SSB resource for channel measurement for L1-RSRP computation in each transmission occasion.
   An aperiodic CSI report occupies CPU(s) from the first symbol after the PDCCH triggering the CSI report until the last symbol between $Z_3$ symbols after the first symbol after the PDCCH triggering the CSI report and $Z_3$ symbols after the last symbol of the latest one of each CSI-RS/SSB resource for channel measurement for L1-RSRP computation.

Figure 11:
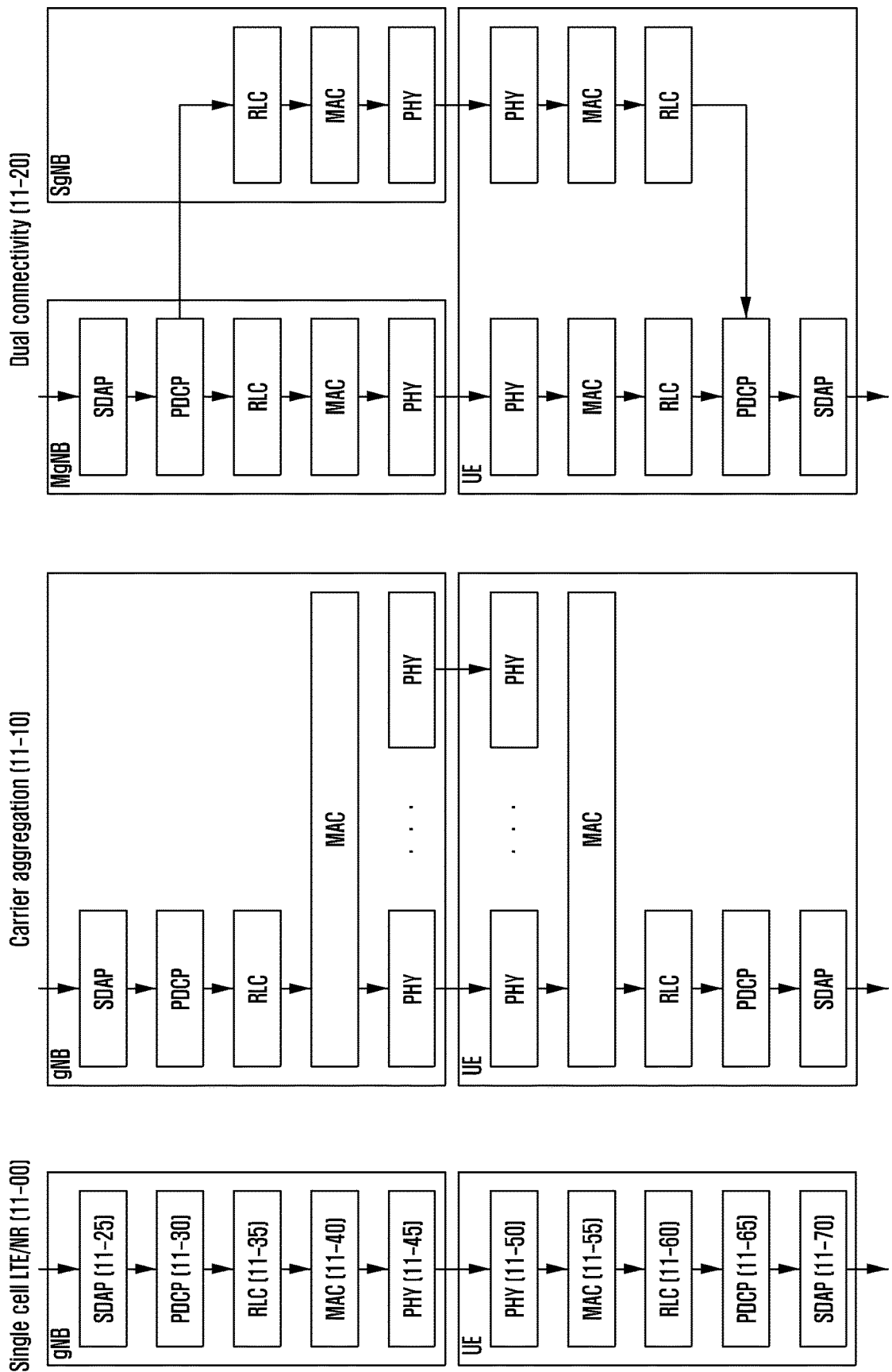
FIG. 11 illustrates a view of base station and terminal protocol stacks when performing single cell, carrier aggregation, and dual connectivity according to some embodiments.

FIG. 11 illustrates a view of radio protocol structures of base stations and terminals when performing single cell, carrier aggregation, and dual connectivity according to some embodiments.

Referring to FIG. 11, the radio protocols of a next-generation mobile communication system include NR service data adaptation protocol (NR SDAP) 11-25 and 11-70, NR packet data convergence protocol (NR PDCP) 11-30 and 11-65, NR radio link control (NR RLC) 11-35 and 11-60, and NR medium access control (NR MAC) 11-40 and 11-55 at terminals and NR base stations, respectively.

The main functions of the NR SDAPs 11-25 and 11-70 may include some of the following functions.

Transfer of user plane data
   Mapping function between QoS flow and data bearer for uplink and downlink (mapping between a QoS flow and a DRB for both DL and UL)
   Marking QoS flow ID in both DL and UL packets for uplink and downlink
   Reflective QoS flow to DRB mapping for the UL SDAP PDUs for uplink SDAP PDUs.

For the SDAP layer device, the terminal may be configured whether to use the header of the SDAP layer device or to use the function of the SDAP layer device for each PDCP layer device, for each bearer, or for each logical channel as an RRC message, and when the SDAP header is configured, the terminal may be instructed to update or reconfigure the mapping information for the QoS flow and data bearer of the uplink and downlink by using the 1-bit indicator (NAS reflective QoS) of the NAS QoS reflection configuration and the 1-bit indicator (AS reflective QoS) of the AS QoS reflection configuration of the SDAP header. The SDAP header may include QoS flow ID information indicating QoS. The QoS information may be used as data processing priority and scheduling information to support a smooth service.

The main functions of NR PDCP 11-30 and 11-65 may include some of the following functions.

- Header compression and decompression (ROHC only)
- Transfer of user data
- In-sequence delivery of upper layer PDUs
- Out-of-sequence delivery of upper layer PDUs
- Reordering function (PDCP PDU reordering for reception)
- Duplicate detection of lower layer SDUs
- Retransmission of PDCP SDUs
- Encryption and decryption function (Ciphering and deciphering)
- Timer-based SDU discard function (Timer-based SDU discard in uplink.)

In the above, the reordering function of the NR PDCP device may mean a function of reordering PDCP PDUs received from a lower layer in order based on a PDCP sequence number (SN), may include a function of delivering data to an upper layer in a reordered order, may include a function of directly transmitting data without considering the order, may include a function of reordering to record the lost PDCP PDUs, may include a function of reporting the status of the lost PDCP PDUs to the transmitting side, and may include a function of requesting retransmission of the lost PDCP PDUs.

The main functions of NR RLC 11-35 and 11-60 may include some of the following functions.

- Data transfer function (Transfer of upper layer PDUs)
- In-sequence delivery of upper layer PDUs
- Out-of-sequence delivery of upper layer PDUs
- ARQ function (Error Correction through ARQ)
- Concatenation, segmentation and reassembly of RLC SDUs
- Re-segmentation of RLC data PDUs
- Reordering of RLC data PDUs
- Duplicate detection function
- Protocol error detection
- RLC SDU deletion function (RLC SDU discard)
- RLC re-establishment In the above, the NR RLC device in-sequence delivery may mean a function of sequentially transmitting RLC SDUs received from a lower layer to an upper layer, and when one RLC SDU was originally divided into multiple RLC SDUs and received, may include a function of reassembling and deliver it, and may include a function of rearranging the received RLC PDUs, based on an RLC sequence number (SN) or a sequence number (PDCP SN), may include a function of recording the lost RLC PDUs by rearranging the order, may include a function of recording PDUs, may include a function of reporting a status of lost RLC PDUs to a transmitting side, and may include a function of requesting retransmission of lost RLC PDUs, when there is a lost RLC SDU, may include a function of forwarding only RLC SDUs up to and before the lost RLC SDU in order, or if a predetermined timer expires even if there is a lost RLC SDU, it may include a function of forwarding all RLC SDUs received before the timer starts in order to the upper layer, or if a predetermined timer expires even if there is a lost RLC SDU, it may include a function of delivering all previously received RLC SDUs in order to a higher layer, or if a predetermined timer expires even if there is a lost RLC SDU, it may include a function of delivering all RLC SDUs received so far to the upper layer in order. In addition, the RLC PDUs may be processed in the order of receiving the RLC PDUs (regardless of the sequence number and sequence number, in order of arrival), and then delivered to the PDCP device in any order (out of sequence delivery), and in the case of a segment, segments that are stored in a buffer or to be received at a later time may be received, reconstructed into a single RLC PDU, processed, and then transmitted to a PDCP device. The NR RLC layer may not include a concatenation function, and the function may be performed in the NR MAC layer or replaced by a multiplexing function of the NR MAC layer.

In the above, the non-sequential delivery function of the NR RLC device refers to a function of directly transmitting RLC SDUs received from a lower layer to an upper layer regardless of order. When one RLC SDU is received by being divided into several RLC SDUs, it may include a function of reassembling it and transmitting it, and may include a function of storing the RLC SN or PDCP SN of the received RLC PDUs and sorting the order to record the lost RLC PDUs.

NR MAC (11-40, 11-55) may be connected to several NR RLC layer devices configured in one terminal, the main function of the NR MAC may include some of the following functions.

- Mapping function (Mapping between logical channels and transport channels)
- Multiplexing/demultiplexing of MAC SDUs
- Scheduling information reporting function
- HARQ function (Error correction through HARQ)
- Priority handling between logical channels (Priority handling between logical channels of one UE)
- Priority handling between UEs (Priority handling between UEs by means of dynamic scheduling)
- MBMS service identification function
- Transport format selection function
- Padding function The NR PHY layers 11-45 and 11-50 may perform channel coding and modulating upper layer data, making OFDM symbols and transmitting them on a radio channel, or demodulating and channel decoding OFDM symbols received over a radio channel to the upper layer.

The detailed structure of the radio protocol structure may vary variously according to a carrier (or cell) operation method. For example, when a base station transmits data to a terminal based on a single carrier (or cell), the base station and the terminal use a protocol structure having a single structure for each layer as shown in 11-00. On the other hand, when a base station transmits data to a terminal based on carrier aggregation (CA) using multiple carriers in a single TRP (Tx/Rx point), the base station and the terminal have a single structure up to RLC as in 11-10, but use a protocol structure for multiplexing the PHY layer through the MAC layer. As another example, when a base station transmits data to a terminal based on dual connectivity (DC) using multiple carriers in multiple TRP, the base station and the terminal have a single structure until RLC as in 11-20, but use a protocol structure for multiplexing the PHY layer through the MAC layer.

Referring to the above-described CSI framework and CPU-related descriptions, in the current NR, it is configured that when $K_S$ resources are configured in the resource setting for channel measurement connected to a certain CSI report or report setting, one of the CSI-RS resources is selected as a CRI and the relevant CSI is report. This may be understood as reporting channel information for a cell/transmission point/panel/beam (hereinafter referred to as a transmission reception point (TRP)) through which the CSI-RS selected by the CRI is transmitted. Meanwhile, NR release 16 supports non-coherent transmission for each TRP, that is, non-coherent joint transmission (NC-JT), where data transmission of each TRP participating in NC-JT acts as an interference to each other. The terminal may improve the transmission efficiency of the NC-JT by measuring and reporting the CSI considering the above-described NC-JT interference. The CSI measurement and reporting method suitable for the NC-JT may be different from the above-described NR CSI measurement and reporting method. In addition, the number of CPUs for these CSIs for NC-JT may also be different from the number of CPUs defined in the current NR. Accordingly, in the disclosure, a reasonable CPU number calculation method is provided for CSI measurement and reporting suitable for NC-JT, thereby improving channel state information reporting efficiency and NC-JT transmission reliability with proper terminal complexity.

Hereinafter, the exemplary embodiments of the disclosure will be described in detail with reference to the accompanying drawings. In addition, in describing the disclosure, when it is determined that a detailed description of related functions or configurations may unnecessarily obscure the subject matter of the disclosure, the detailed description will be omitted. In addition, terms to be described later are terms defined in consideration of functions in the disclosure, which may vary according to a user's or operator's intention or practice. Therefore, the definition should be made based on the contents throughout this specification.

Hereinafter, the base station is a subject that performs resource allocation of a terminal, and may be at least one of a gNode B (gNB), an eNode B (eNB), a Node B, a base station (BS), a radio access unit, a base station controller, or a node on a network. The terminal may include a user equipment (UE), a mobile station (MS), a cellular phone, a smart phone, a computer, or a multimedia system capable of performing communication functions. Hereinafter, the NR or LTE/LTE-A system will be described as an example in the disclosure, but is not limited thereto, and embodiments may be applied to various communication systems having similar technical backgrounds or channel types. In addition, the embodiments of the disclosure may be applied to other communication systems via some modifications within a range that does not significantly depart from the scope of the disclosure by the judgment of a person having skilled technical knowledge.

The content of the disclosure is applicable to frequency division duplexing (FDD) and time division duplexing (TDD) systems.

Hereinafter, in the disclosure, high-level signaling is a signal transmission method that is transmitted from a base station to a terminal using a downlink data channel of a physical layer or from a terminal to a base station using an uplink data channel of a physical layer, and may be referred to as RRC signaling, or PDCP signaling, or medium access control (MAC) control element (MAC CE).

Hereinafter, in the disclosure, in determining whether to apply cooperative communication, terminal may use various methods such as the PDCCH(s) allocating PDSCH to which the cooperative communication is applied has a specific format, or the PDCCH(s) allocating the PDSCH to which the cooperative communication is applied includes a specific indicator indicating whether the cooperative communication is applied, the PDCCH(s) allocating the PDSCH to which the cooperative communication is applied is scrambled with a specific RNTI, or assuming the application of cooperative communication in a specific section indicated by the upper layer, and so on. Hereinafter, for convenience of description, a case in which the terminal receives the PDSCH to which the cooperative communication is applied based on conditions similar to the above will be referred to as an NC-JT case.

Hereinafter, in the disclosure, determining the priority between A and B may be mentioned in various ways, such as selecting one having a higher priority according to a predetermined priority rule to perform an operation corresponding thereto, or omitting or dropping an operation having a lower priority.

Hereinafter, in the disclosure, the above examples will be described through a number of embodiments, but these are not independent ones, and it is possible that one or more embodiments are applied simultaneously or in combination.

First Embodiment: DCI Reception for NC-JT

The 5G wireless communication system may support not only services requiring a high transmission speed, but also services having a very short transmission delay and services requiring a high connection density. In a wireless communication network including a plurality of cells, transmission and reception points (TRP), or beams, the coordinated transmission between each cell, TRP, and/or beam is one of the element technologies that can satisfy various service requirements by increasing the strength of signals received by the terminal or efficiently performing interference control between cells, TRPs or/and beams.

Joint transmission (JT) is a representative transmission technique for cooperative communication described above, and supports one terminal through different cells, TRP, and/or beams through the joint transmission technique to increase the strength of the signal received by the terminal. Meanwhile, since channels each cell, TRP or/and beam and a terminal may be significantly different characteristics, different precoding, modulation and coding scheme (MCS), resource assignment need to be applied to links between each cell, TRP or/and beam and the terminal. In particular, in the case of non-coherent joint transmission ((NC-JT) supporting non-coherent precoding between each cell, it is important to configure individual DL (down link) transmission information for each cell, TRP or/and beams. Meanwhile, individual DL transmission information setting for each cell, TRP, and/or beam is a major factor in increasing the payload required for DL DCI transmission, which may adversely affect the reception performance of a physical downlink control channel (PDCCH) transmitting DCI. Therefore, it is necessary to carefully design a tradeoff between DCI information amount and PDCCH reception performance for JT support.

Figure 12:
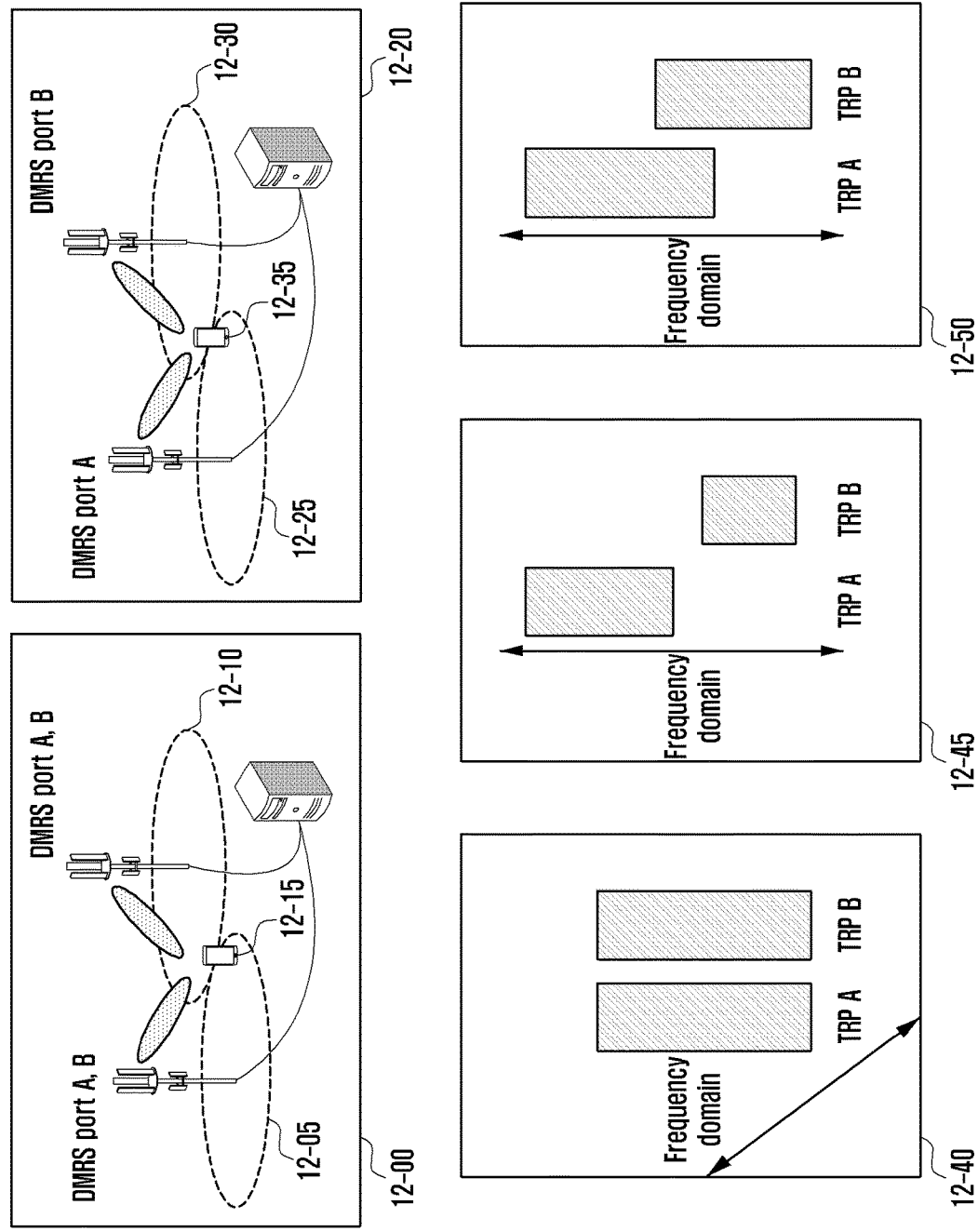
FIG. 12 illustrates a view of an example of antenna port configuration and resource allocation for cooperative communication according to some embodiments in a wireless communication system according to an embodiment.

FIG. 12 illustrates a view of an example of antenna port configuration and resource allocation for cooperative communication according to some embodiments in a wireless communication system according to an embodiment.

Referring to FIG. 12, examples of joint resource allocation according to TRP according to a joint transmission (JT) technique and situation are illustrated. In FIG. 12, 12-00 is an example of coherent joint transmission (C-JT) supporting coherent precoding between each cell, TRP or/and beam. In C-JT, a single data (PDSCH) is transmitted from the TRP A (12-05) and the TRP B (12-10) to the terminal 12-15, and joint precoding may be performed in multiple TRPs. This may mean that TRP A (12-05) and TRP B (12-10) transmit the same DMRS ports for receiving the same PDSCH (e.g., DMRS ports A and B in both TRPs). In this case, the terminal may receive one DCI information for receiving one PDSCH demodulated by DMRS ports A and B.

In FIG. 12, 12-20 is an example of non-coherent joint transmission (NC-JT) supporting non-coherent precoding between each cell, TRP or/and beam. In the case of NC-JT, PDSCH is transmitted to the terminal 12-35 for each cell, TRP or/and beam, and individual precoding may be applied to each PDSCH. Each cell, TRP or/and beam transmits different PDSCHs to improve throughput compared to a single cell, TRP or/and beam transmission, or each cell, TRP or/and beam may repeatedly transmit the same PDSCH, thereby improving reliability compared to a single cell, TRP or/and beam transmission.

Various radio resource allocations may be considered, such as when the frequency and time resources used by multiple TRPs for transmitting PDSCH are all the same (12-40), when the frequency and time resources used by multiple TRPs do not overlap at all (12-45), or when some of the frequency and time resources used by multiple TRPs overlap (12-50). When multiple TRPs repeatedly transmit the same PDSCH to improve reliability in each case for the above-mentioned radio resource allocation, if the receiving terminal does not know whether the corresponding PDSCH is repeatedly transmitted, the corresponding terminal may have limitations in improving reliability because it cannot perform combining in the physical layer for the corresponding PDSCH. Therefore, the disclosure provides a repeat transmission instruction and configuration method for improving NC-JT transmission reliability.

For NC-JT support, DCIs of various forms, structures, and relationships may be considered to simultaneously allocate multiple PDSCHs to one UE.

Figure 13:
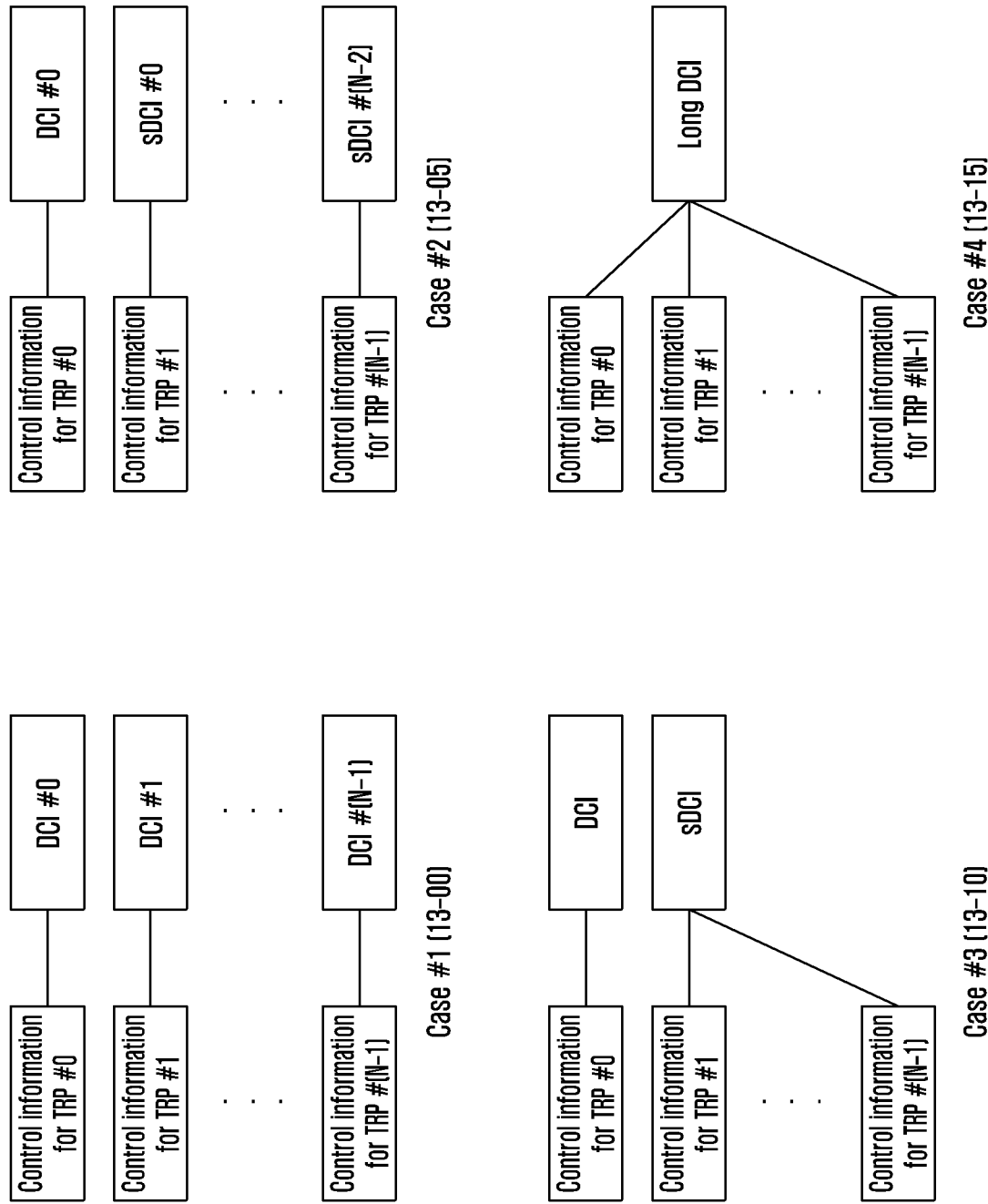
FIG. 13 illustrates a view of an example of downlink control information (DCI) configuration for cooperative communication in a wireless communication system according to an embodiment.

FIG. 13 illustrates a view of an example of downlink control information (DCI) configuration for cooperative communication in a wireless communication system according to an embodiment. Referring to FIG. 13, four examples of DCI design for NC-JT support are illustrated.

In FIG. 13, case #1 (13-00) is an example in which the control information for PDSCH transmitted in (N−1) additional TRP is transmitted in the same form (same DCI format) as the control information for PDSCH transmitted in serving TRP, in a situation in which different (N−1) PDSCHs are transmitted from (N−1) additional TRPs (TRP#1 to TRP#(N−1)) in addition to serving TRP (TRP#0) used when transmitting a single PDSCH. That is, the terminals may obtain control information for PDSCHs transmitted from different TRPs (DCI#0 to DCI#(N−1)) through DCIs having the same DCI format and the same payload (TRP#0 to TRP#(N−1)). In case #1 described above, the degree of freedom for each PDSCH control (assignment) may be completely guaranteed, but when each DCI is transmitted in different TRPs, a coverage difference for each DCI may occur and reception performance may be deteriorated.

In FIG. 13, case #2 (13-05) is an example in which the control information for PDSCH transmitted from (N−1) additional TRPs is transmitted in a different form (different DCI format or different DCI payload) from the control information for PDSCH transmitted from serving TRP, in a situation in which different (N−1) PDSCHs are transmitted in (N−1) additional TRPs (TRP#1 to TRP#(N−1)) in addition to the serving TRP (TRP#0) used when transmitting a single PDSCH. For example, in the case of DCI#0 that transmits control information for PDSCH transmitted in serving TRP (TRP#0), all information elements of DCI format 1_0 to DCI format 1_1 are included, but in the case of 'shortened' DCIs (sDCI#0 to sDCI#(N−2)) transmitting control information for PDSCHs transmitted from the cooperative TRP (TRP#1 to TRP#(N−1)), some of the information elements of DCI format 1_0 to DCI format 1_1 may be included. In the case of 'shortened' DCIs (sDCI#0 to sDCI#(N−2)) transmitting control information for PDSCHs transmitted from the cooperative TRP (TRP#1 to TRP#(N−1)), only some of the information elements of DCI format 1_0 to DCI format 1_1 may be included. Therefore, in the case of sDCI that transmits control information for PDSCHs transmitted in the cooperative TRP, it is possible that the payload is small compared to the normal DCI (nDCI) transmitting PDSCH-related control information transmitted from the serving TRP, or it is possible to include reserved bits as many as the number of bits less than the nDCI. In case #2 described above, the degree of freedom of each PDSCH control (assignment) may be limited according to the contents of the information elements included in the sDCI, but since the reception performance of sDCI is superior to that of nDCI, the probability of occurrence of a coverage difference for each DCI may be lowered.

In FIG. 13, case #3 (13-10) is an example in which the control information for PDSCHs transmitted from (N−1) additional TRPs is transmitted in a different format (different DCI format or different DCI payload) from control information for PDSCHs transmitted from serving TRP, in a situation in which (N−1) PDSCHs are transmitted from (N−1) additional TRPs (TRP#1 to TRP#(N−1)) other than serving TRP (TRP#0) used when transmitting a single PDSCH. For example, in the case of DCI#0 transmitting control information for PDSCH transmitted in serving TRP (TRP#0), all information elements of DCI format 1_0 to DCI format 1_1 are included, and in the case of control information for PDSCHs transmitted from a cooperative TRP (TRP#1 to TRP#(N−1)), only some of the information elements of DCI format 1_0 to DCI format 1_1 may be collected and transmitted in one 'secondary' DCI (sDCI). For example, the sDCI may have at least one of HARQ-related information, such as frequency domain resource assignment, time domain resource assignment, and MCS of cooperative TRPs. In addition, for information not included in sDCI, such as a bandwidth part (BWP) indicator or a carrier indicator, the information may follow the DCI (DCI#0, normal DCI, nDCI) of serving TRP. In case #3, the degree of freedom of each PDSCH control (assignment) may be limited according to contents of information elements included in sDCI, but the reception performance of sDCI can be adjusted and compared to case #1 or case #2, and the complexity of DCI blind decoding can be reduced.

In FIG. 13, case #4 (13-15) is an example of transmitting control information for PDSCHs transmitted from (N−1) additional TRPs in DCI (long DCI, lDCI) as control information for PDSCHs transmitted from serving TRP, in a situation in which (N−1) PDSCHs are transmitted from (N−1) additional TRPs (TRP#1 to TRP#(N−1)) other than serving TRP (TRP#0) used when transmitting a single PDSCH. That is, the terminal may acquire control information for PDSCHs transmitted from different TRPs (TRP#0 to TRP#(N−1)) through a single DCI. In case #4, the complexity of DCI blind decoding of the terminal may not increase, but the PDSCH control (assignment) degree of freedom may be low, such as a limited number of cooperative TRPs due to long DCI payload limitation.

In the following description and embodiments, sDCI may refer to various auxiliary DCIs, such as shortened DCI, secondary DCI, or normal DCI (PDI format 1_0 to 1_1 described above) including PDSCH control information transmitted from a cooperative TRP. If no special restrictions are specified, the description is similarly applicable to the various auxiliary DCIs.

In the following descriptions and embodiments, the above-described case #1, case #2, and case #3 in which one or more DCIs (PDCCH) is used for NC-JT support is divided into multiple PDCCH-based NC-JTs, and a single DCI (for NC-JT support) PDCCH may be classified as a single PDCCH based NC-JT in case of the above-described case #4.

In embodiments of the disclosure, "cooperative TRP" may be replaced with various terms such as "cooperative panel" or "cooperative beam" when actually applied.

In embodiments of the disclosure, the term "when NC-JT is applied" may be interpreted in various ways according to the situation, such as "when a terminal receives one or more PDSCHs simultaneously from one BWP", "when a terminal receives two or more PDSCHs simultaneously from one BWP, based on transmission configuration indicator (TCI) indication", "the terminal receives PDSCH is associated with one or more DMRS port group (port group)", etc., but it is used as one expression for convenience of explanation.

In the disclosure, the radio protocol structure for NC-JT may be used in various ways depending on the TRP deployment scenario. For example, if there is no or little backhaul delay between cooperative TRPs, it is possible to use a structure, based on MAC layer multiplexing similar to FIG. 11 (11-10) (CA-like method). On the other hand, when the backhaul delay between cooperative TRPs is large enough to be negligible (e.g., when a time of 2 ms or more is required for CSI exchange or scheduling information exchange between cooperative TRPs), it is possible to secure a robust characteristic in delay using an independent structure for each TRP from the RLC layer (DC-like method), similar to (11-20) of FIG. 11.

Second Embodiment: Method of Delivering Whether the Terminal May Report NC-JT CSI The above-mentioned NR CSI report is configured to select one CSI-RS resource as a CRI and report related CSI when $K_s$ CSI-RS resources are configured in a resource setting for channel measurement linked to a CSI report or CSI report setting. This may be understood as reporting channel information on the TRP through which the CSI-RS selected as the CRI is transmitted. On the other hand, because NC-JT transmits data from multiple transmission points at the same time, each data transmission acts as an interference to each other. This may mean that NC-JT transmission efficiency can be improved through CSI reporting in consideration of interference caused by the NC-JT transmission. Meanwhile, since the above operation requires additional complexity compared to the conventional NR CSI reporting, NC-JT CSI reporting may be a function that supports only a specific terminal, and the terminal may use at least one of the following methods to inform the base station whether or not it supports NC-JT CSI.

The terminal may report whether the NC-JT CSI report is supported to the base station through the terminal capability report. At this time, whether to support NC-JT CSI reporting may depend on whether to support NC-JT. For example, NC-JT CSI reporting may be reported only for NC-JT-supported terminals, and even NC-JT-supported terminals may not support NC-JT CSI reporting. It may be assumed that the NC-JT support terminal implicitly supports NC-JT CSI reporting. Whether to support NC-JT may be notified to the base station through terminal capability reporting.

It may be assumed that a terminal supporting a specific release of NR implicitly supports NC-JT CSI reporting. For example, when the terminal notifies the base station that it is an NR Rel-17 or Rel-16 terminal, it may be assumed that the terminal supports NC-JT CSI reporting.

The terminal capability report related to the NC-JT CSI report may have different values for each frequency range such as BWP, cell, band, FR1/FR2.

Third Embodiment: Configuration Method for NC-JT CSI Reporting

The following embodiment provides a specific method for setting the base station to perform the NC-JT CSI report. At least one of the following methods may be applied to the terminal to perform NC-JT CSI reporting.

[Method 3-1] Explicit Instruction

The base station may explicitly indicate whether the terminal performs NC-JT CSI reporting. The corresponding indication may be indicated through an upper layer such as RRC or MAC-CE, L1 signaling. The indicator may be applied for each CSI report, or for the entire CSI report for each BWP or CC, or for the entire CSI report for all CCs. When the indicator is applied for each CSI report, it may be configured in a CSI report setting on the CSI framework, or may be configured in a CSI resource setting/resource setting/CSI-RS. Alternatively, it may be configured in configuration information that triggers CSI reporting aperiodically. As an example, when the configuration whether to perform the NC-JT CSI report is configured in connection with the aperiodic CSI report, this may be interpreted to mean that NC-JT CSI reporting is not performed for periodic CSI reporting or semi-persistent CSI reporting. Similar interpretation is possible even when configured in conjunction with Periodic CSI reporting or semi-persistent CSI reporting, but detailed descriptions are omitted so as not to obscure the subject matter of the disclosure.

Whether to perform the NC-JT CSI report may be dependent on the terminal capability described in the second embodiment. For example, if the terminal reports that it does not support the NC-JT CSI, the terminal may not expect the base station to configure the indicator to report the NC-JT CSI or ignore the indicator and report the NR CSI.

[Method 3-2] Implicit Instruction

Whether the terminal performs NC-JT CSI reporting may be implicitly indicated through a relationship between parameters. For example, when reporting that the terminal supports NC-JT CSI when reporting the terminal capability described in the second embodiment, if the base station configures the CSI framework in a specific manner, it may be understood that the terminal reports that the base station performed NC-JT CSI reporting. For configuring the CSI framework, at least one of the following methods may be applied.

[Method 3-2-1] Instruction Through the Number of CSI-RS in the CSI Resource Set

For NC-JT CSI measurement, each TRP participating in the NC-JT transmission may be configured to transmit an independent CSI-RS. At this time, all of the CSI-RSs may belong to one CSI-RS resource set, and the CSI-RS resource set may belong to a CSI resource setting for channel measurement. The inclusion relationship between the CSI-RS resource set and the CSI resource setting may be as described in [Table 16]. Therefore, the terminal may implicitly determine whether to perform NC-JT CSI reporting according to the number of CSI-RSs $K_s$ in the CSI-RS resource set connected to the report setting. For example, if the number of CSI-RSs in the CSI-RS resource set is $K_s=1$, the terminal might not perform NC-JT CSI reporting. Meanwhile, when the number of CSI-RSs in the CSI-RS resource set is $K_s \geq 2$, the terminal may perform NC-JT CSI reporting, and the corresponding NC-JT CSI report measures CSI-RSs for two or more TRPs together. Therefore, it may be a CSI report considering mutual interference.

When reporting NC-JT CSI, NC-JT CSI may be measured for all CSI-RS in the CSI-RS resource set, and it is also possible to select a specific set of CSI-RSs in the CSI-RS resource set and measure NC-JT CSI for TRPs corresponding to the set. At this time, the number of elements in the set may be 2 or more, and the set may be composed of two or more. At this time, elements between sets may overlap each other. The set may be referred to as NC-JT cooperation set or CoMP cooperation set. When two or more sets of CSI-RSs for measuring NC-JT CSI are configured, that is, when measuring CSI for two or more CoMP cooperation sets, the terminal may derive the optimal NC-JT CSI by measuring and comparing the NC-JT CSI corresponding to each set. The terminal may include information on which CSI-RS or TRP set the derived NC-JT CSI is in the CSI report, and the information may be information included in an NR CSI report such as CRI or a new indicator.

Corresponding NC-JT CSI reporting may be optional. For example, the terminal may calculate the CRI-based CSI for multiple CSI-RSs in the same way as the existing operation, and also calculate the above-described NC-JT CSI together and compares the two CSIs to optimize the CSI, that is, may report one of the calculated CSI and NC-JT CSI according to the existing operation. At this time, the report may include information that enables the base station to know whether the NC-JT CSI is selected. The information may be information included in an NR CSI report such as a CRI or a new indicator.

[Method 3-2-2] Instruction by Configuring Multiple CSI-RS Resource Sets or Resource Settings For NC-JT CSI measurement, one CSI report setting and two or more CSI resource settings for channel measurement may be connected, and each of the resource settings may include CSI-RS transmitted from each TRP participating in NC-JT transmission. This is different from the conventional NR CSI framework in which one CSI report setting and one CSI resource setting for channel measurement are connected. Alternatively, one resource setting for channel measurement may include two or more CSI-RS resource sets, and each of the CSI-RS resource sets may include CSI-RS transmitted by each TRP participating in NC-JT transmission. The connection relationship between the CSI report setting and the CSI resource setting for channel measurement may be similar to that described in [Table 20]. In addition, the inclusion relationship between the CSI-RS resource set and the CSI resource setting may be as described in [Table 16]. The CSI-RSs belonging to a plurality of resource sets in the plurality of CSI resource settings for channel measurement or a single CSI resource setting for channel measurement may be measured together for NC-JT CSI calculation. This is only a single resource set within a single CSI resource setting for channel measurement or only a single resource set is selected by aperiodic CSI triggering, etc., and may be differentiated from the NR CSI framework that performs CSI measurement only for CSI-RS in this resource set.

Figure 14:
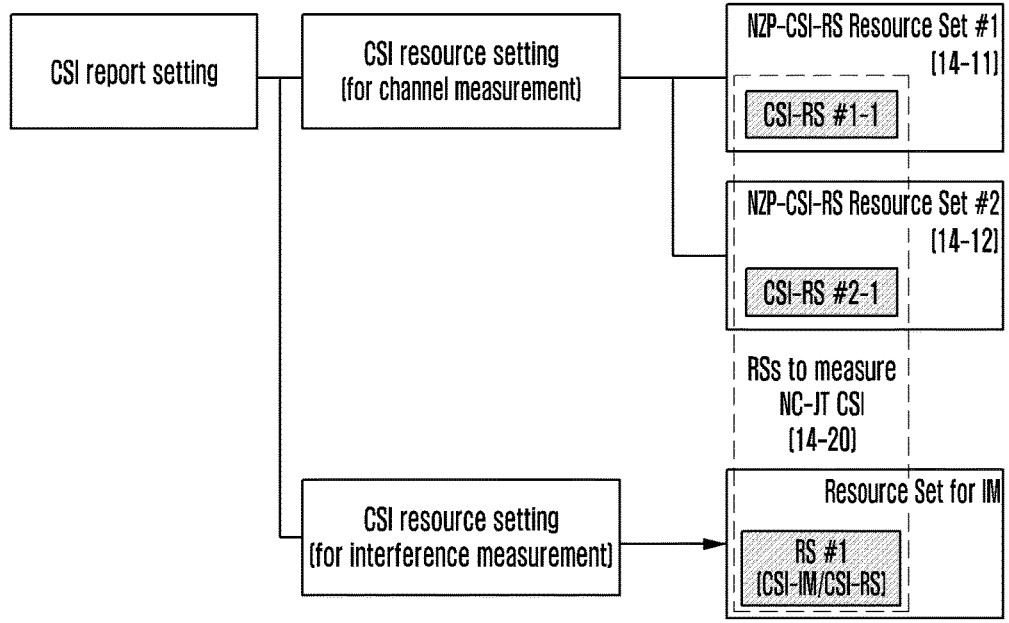
FIG. 14 illustrates a view of a configuration example of a CSI framework for non-coherent joint transmission (NC-JT) CSI reporting according to an embodiment.
Figure 14:
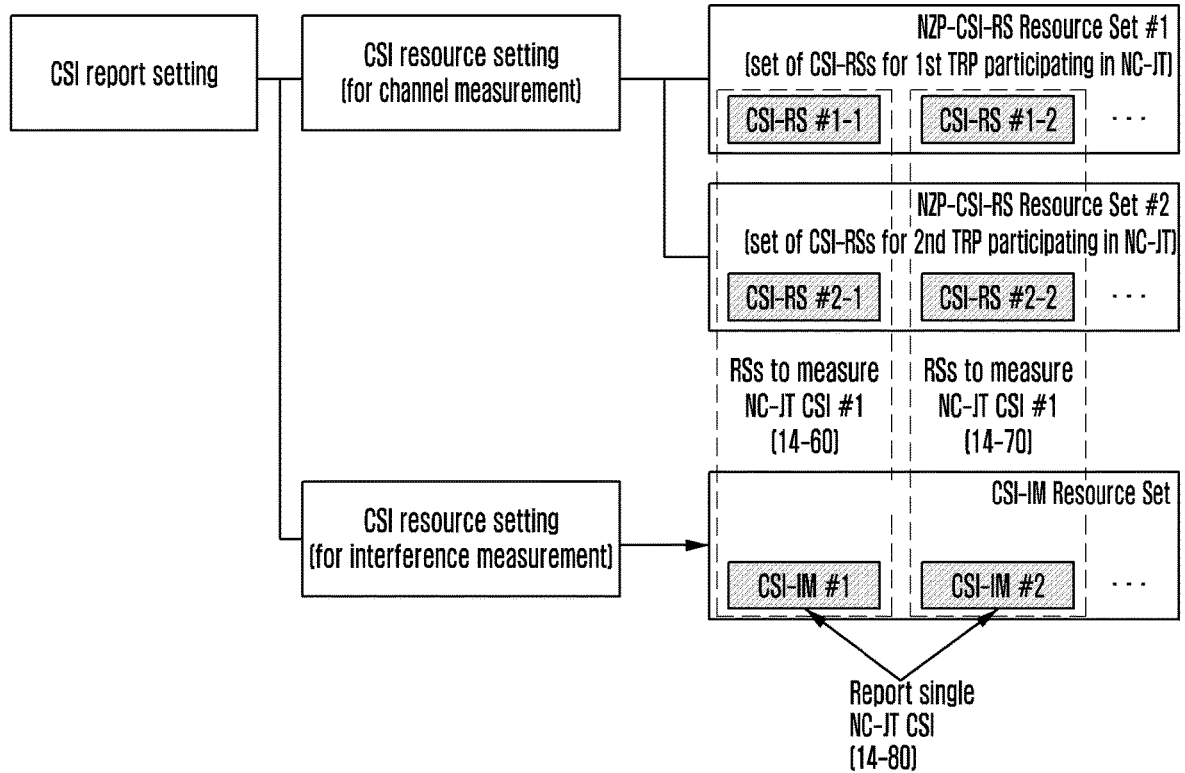

FIG. 14 shows an example of CSI framework structure and CSI-RS configuration for NC-JT CSI measurement when two CSI-RS resource sets are configured in a CSI resource setting. Depending on the number of CSI-RSs in the CSI-RS resource set, it may be considered for a case where the number of CSI-RSs is one (case A) and two or more cases (case B).

In case A (14-01), the first resource set (14-11) of the CSI-RS resource sets (14-10) corresponds to the first TRP participating in NC-JT transmission, and the second resource set Silver (14-12) corresponds to the second TRP. This may be a configuration for measuring CSI for one CoMP cooperation set. The terminal may calculate the NC-JT CSI by measuring the CSI-RSs (14-20) in the CSI-RS resource set for RS and channel measurement set for interference measurement from outside the NC-JT.

In case B (14-51), the terminal may measure NC-JT CSI for a number of CoMP cooperation sets and perform a report on one CSI of them. As an example, NC-JT CSI #1 may be measured by measuring the first CSI-RSs for CSI-RS resource sets and the first CSI-IM resource in the CSI-IM resource set (14-60). That is, NC-JT CSI #1 for the first CoMP cooperation set may be measured. In addition, NC-JT CSI #2 may be measured by measuring the second CSI-RSs for the CSI-RS resource sets and the second CSI-IM resource in the CSI-IM resource set (14-70). That is, NC-JT CSI #1 for the second COMP cooperation set may be measured. It is possible to select and report an optimal NC-JT CSI among a plurality of NC-JT CSIs measured similarly to the above (14-80). At this time, information on which NC-JT CSI was selected may also be reported, and the information may be CRI-based information.

The above examples of FIG. 14 deal with the case where a plurality of CSI-RS resource sets are configured in a single CSI resource setting for NC-JT CSI reporting, and may be similarly applied when a plurality of CSI resource settings for channel measurement are configured, but detailed description is omitted so as not to obscure the gist of the explanation.

The reporting of NC-JT CSI by [Method 3-2] may be performed only under specific conditions. Here, the specific condition may be at least one of the following conditions.

As one condition, whether to perform the NC-JT CSI report may be dependent on the terminal capability described in the second embodiment. If the terminal reports that it does not support the NC-JT CSI, the terminal may report the NR CSI. At this time, the NR CSI may mean an CRI-based CSI in the case of [Method 3-2-1], and in the case of [Method 3-2-2], it may mean the CSI measured for the first or specific order among multiple CSI resource setting for channel measurement. Alternatively, it may mean a CSI measured for a CSI-RS resource set corresponding to the first or specific order in a single CSI resource setting for channel measurement.

As another condition, NC-JT CSI reporting may be performed only when the explicit indicator for NC-JT CSI reporting is operated in combination with [Method 3-2] and the explicit indicator is set. For that reason, for example, if [Method 3-2-1] is followed, the terminal cannot distinguish between the NC-JT CSI reporting configuration and the CRI-based reporting configuration. Therefore, there may be a problem that the complexity of the terminal increases unnecessarily by always reporting the NC-JT CSI, and the understanding between the base station and the terminal does not match, that is, the base station predicts the CRI-based report, but the CSI mismatch is caused by the terminal reporting the NC-JT CSI. This problem can be solved by using the above explicit indicators together. Similar explanation is possible when multiple CSI-RS resource sets are configured in a single CSI resource setting for channel measurement according to [Method 3-2-2].

As another condition, NC-JT CSI reporting may be limited to specific time domain behavior. For example, if NC-JT CSI reporting is allowed for all time domain behavior, the computational complexity of the terminal may be very large, so NC-JT CSI is measured and reported only in the case of aperiodic reporting, and in the case of semi-persistent or periodic reporting, the CSI may be measured and reported. Conditions for measuring and reporting NC-JT CSI may be changed. For example, it is possible to change to aperiodic and semi-persistent reporting conditions or aperiodic CSI-RS trigger and aperiodic CSI reporting conditions. Alternatively, since the payload required for NC-JT CSI reporting may be larger than the CSI payload, the above condition may be changed to a condition limited to aperiodic and/or semi-persistent reporting reported in PUSCH.

As another condition, the number of CSI-RSs for NC-JT CSI reporting may be limited. For example, when [Method 3-2-1] is applied, NC-JT CSI reporting is performed only for $1<K_s \leq N$, the number of CSI-RSs in the CSI-RS resource set, and in other cases, CRI-based NR CSI reporting may be performed. In order to reduce the terminal complexity required for CSI calculation, the value of N may be 2.

As another condition, whether to report the NC-JT CSI may be determined according to the total CPU capability of the terminal and the number of CPUs the terminal is already calculating. If the total CPU capability of the terminal is referred to as $N_{CPU}$, the number of CPUs that the terminal is already using for calculating the CSI is referred to as $O_{CPU}$ and the number of CPUs required for the calculation of the NC-JT CSI is referred to as X, the terminal may perform NC-JT reporting only when the following equation is satisfied.

$$N_{CPU} - O_{CPU} \geq X \quad \text{[Equation 2]}$$

On the other hand, if the above [Equation 2] is not satisfied and the following [Equation 3] is satisfied, the terminal may perform an NR CSI report.

$$Y \leq N_{CPU} - O_{CPU} < X \quad \text{[Equation 3]}$$

In [Equation 3], Y is the number of CPUs required to perform the NR CSI report, and may be $Y=K_S$ if CSI-RS resources for $K_s$ measuring channels are connected to the corresponding CSI report config. The values X of [Equation 2] and [Equation 3] may be values obtained through the following fourth embodiment or another method.

Fourth Embodiment: Number of CPUs for NC-JT CSI Reporting

When the terminal measures and reports the NC-JT CSI, it may be assumed that the CPU calculation for NC-JT CSI reporting is different from the CPU calculation for reporting the NR CSI because the interference due to JC-JT transmission needs to be considered unlike the conventional NR CSI reporting. In this embodiment, a detailed method of determining the number of CPUs for measurement and reporting of NC-JT CSI is described. At this time, the terminal configured to report the NC-JT CSI may be guaranteed that the number $K_s \leq N$ of CSI-RSs connected to the corresponding CSI report setting is satisfied only for the NC-JT CSI report. The value of N may be 2.

[Method 4-1] Method of Calculating the Number of CPUs in Case of N=2

This method may be applied when CSI-RS for channel measurement is configured as $K_s=2$ for NC-JT CSI measurement and reporting. The configuration may be made by configuring two CSI-RS settings in the CSI-RS resource set mentioned in [Method 3-2-1], connecting a single CSI report setting and two CSI resource settings for channel measurement in [Method 3-2-2], configuring a single CSI resource setting for channel measurement by two CSI-RS resource set, or other methods. The connection relationship between the CSI report setting and the CSI resource setting for channel measurement may be similar to that described in [Table 20]. In addition, the inclusion relationship between the CSI-RS resource set and the CSI resource setting may be as described in [Table 16].

As described above, the terminal computational complexity required to measure and report the NC-JT CSI may be different from the computational complexity required to measure and report the NR CSI. If the number of CPUs required to measure and report the NC-JT CSI is named $X_1$, it may be larger than the number $X_2$ of CPUs for the NR CSI. The $X_1$ may be defined in various ways. For example, $X_1$ may be a value that takes into account the number of additional CPUs for additional CSI calculation, in addition to the number of CPUs for $X_2$. As another example, $X_1$ may be a value that is independently determined in consideration of terminal complexity for calculating NC-JT CSI, independent of the number of CPUs for $X_2$.

If $X_1$ is defined as "a value that takes into account the number of additional CPUs for additional CSI calculation, in addition to the number of CPUs for $X_2$", it is possible to apply at least one of the following interpretations to the additional number of CPUs $X=X_1-X_2$.

Interpretation 4-1-1. X=Value Equal to or Proportional to the Number of CSI-RSs

Since the additional calculation may be interpreted to be performed in consideration of NC-JT interference for each CSI-RS for channel measurement, that is, TRP, $X=\alpha K_s$, where $\alpha$ is a constant having 1 or other positive value, $K_s$ is channel CSI-RS number for measurement.

Interpretation 4-1-2. $X=\beta$ (Constant)

Since the additional calculation may be interpreted to update by reflecting NC-JT interference simultaneously to the entire CSI for each TRP that has been measured, $X=\beta$ may be set, and $\beta$ may be a value independent of the number of CSI-RS for channel measurement for NC-JT CSI measurement. $\beta$ is a constant having 1 or other positive value.

If $X_1$ is defined as "a value independently determined considering the terminal complexity for calculating NC-JT CSI, independent of the number of CPUs for $X_2$", it is possible to apply at least one of the following interpretations to $X_1$.

Interpretation 4-2-1. $X_1$=Value Equal to or Proportional to the Number of CSI-RSs The calculation may be interpreted to be proportional to CSI-RS for channel measurement, that is, TRP, $X_1=\beta K_s$, where is a constant having 2 or other positive value.

Interpretation 4-2-2. $X_1 N_{CPU}$ ($N_{CPU}$=Total CPU Capability of the Terminal)

The calculation process may vary depending on the terminal implementation, and the terminal may be assumed that it always uses its total CPU capability $N_{CPU}$ from a conservative point of view for NC-JT CSI measurement and reporting. In this case, $N_{CPU}$ may be a value reported by the terminal to the base station through the above-described terminal capability report. Alternatively, when the terminal measures and reports the NC-JT CSI, similar to the case of reporting according to the delay requirement 1 of the NR CSI, the terminal uses its total CPU capability, limited to when there is no CSI already being calculated. By calculating the NC-JT CSI, the NC-JT CSI may be seen as $X_1=N_{CPU}$. The above "limited to when there is no CSI already being calculated" may be interpreted by substituting "stop all calculations if there is a CSI already being calculated".

Meanwhile, the above interpretation may be applied differently depending on conditions. For example, in the case of an aperiodic CSI report, interpretation 4-2-2 may be applied, and in other words, in the case of a periodic or semi-persistent CSI report, the remaining analyses may be applied. This may be interpreted that aperiodic CSI reporting requires urgent NC-JT CSI calculation and reporting, and periodic or semi-persistent CSI reporting is relatively non-urgent NC-JT CSI calculation and reporting. Alternatively, for NC-JT CSI reporting, analysis 4-2-2 may be applied when all the conditions other than the number of CSI-RSs in the delay requirement 1 are satisfied, and the rest of the above analyses may be applied. In the Aperiodic CSI report, if analysis 4-2-2 is applied depending on the conditions, it may be regarded as having a stricter delay requirement than when analysis 4-2-2 is not applied, and the delay requirement may refer to [Table 21], [Table 22] above, or a new requirement.

[Method 4-2] Method of Calculating the Number of CPUs in Case of N>2

This method is applicable to cases where the number of CoMP cooperation sets under consideration is two or more, or the size of the CoMP cooperation set is greater than two. The cases may be interpreted as a case, for example, where the number of CSI-RSs is $K_s$>2 in [Method 3-2-1], and a case where two or more CSI-RSs are configured in each of CSI-RS resource set or CSI resource settings in [Method 3-2-2]. In this case, different CPU counts may be considered for the following two cases.

Case i) Consider only some of the possible CoMP cooperation sets; e.g., when considering only the case where the CoMP cooperation set size is a certain constant K Case ii) All possible CoMP cooperation sets are considered; When considering all $$\sum_{i=2}^{K_i} \binom{K_s}{i}$$

CoMP cooperation sets configurable for e.g., CSI-RS number or TRP number $K_s$

The number of CPUs for case i: The following two interpretations are possible.

Interpretation 4-3-1: It may be interpreted that each CoMP cooperation set considered in calculating the NC-JT CSI occupies an independent CPU. The number of CPUs occupied by each CoMP cooperation set may vary depending on the size of the set, and in this case, the total number of CPUs may be M*X because all CoMP cooperation sets have the same size. M may indicate the number of COMP cooperation sets. X is the number of CPUs required for each CoMP cooperation set, and may be a value obtained according to the analysis 4-1-1, 4-1-2, or 4-2-1.

Interpretation 4-3-2: Alternatively, in the above case, a specific TRP may be included in a plurality of CoMP cooperation sets, and the CPU for calculating CSI of each CoMP cooperation set may not be considered independently. At this time, since there are various methods for calculating the exact number of CPUs and may vary depending on the implementation of the terminal, it may be simply assumed that the total number of CPUs is $N_{CPU}$. $N_{CPU}$ may be a value reported by the terminal to the base station through the above-described terminal capability report.

The number of CPUs for case ii: The following two interpretations are possible.

Interpretation 4-4-1: It may be interpreted that each CoMP cooperation set considered in calculating the NC-JT CSI occupies an independent CPU. The number of CPUs occupied by each CoMP cooperation set may vary depending on the size of the set, and the number of CPUs may be referred to as $X_i$. In this case, $X_i$ may be a value obtained according to the analysis 4-1-1, 4-1-2, or 4-2-1. Eventually, the total number of CPUs may follow the following equation.

$$\sum_{i=2}^{K_i} \binom{K_s}{i} X_i \qquad \text{[Equation 4]}$$

Interpretation 4-2: In the above case, a specific TRP may be included in a plurality of CoMP cooperation sets, and the CPU for calculating CSI of each CoMP cooperation set might not be considered independently. At this time, there are various methods to calculate the exact number of CPUs, and the method may be different depending on the implementation of the terminal, so it may be simply assumed that the total number of CPUs is $N_{CPU}$. $N_{CPU}$ may be a value reported by the terminal to the base station through the above-described terminal capability report.

Different interpretations for the number of CPUs may be applied to the above [Method 4-1] and [Method 4-2]. For example, analysis 4-1-1 may be applied to [method 4-1], while analysis 4-3-2 may be applied to case i of [method 4-2]. There may be various application methods other than the above-described method, but not all possibilities are listed in order not to obscure the subject matter of the description.

Figure 15:
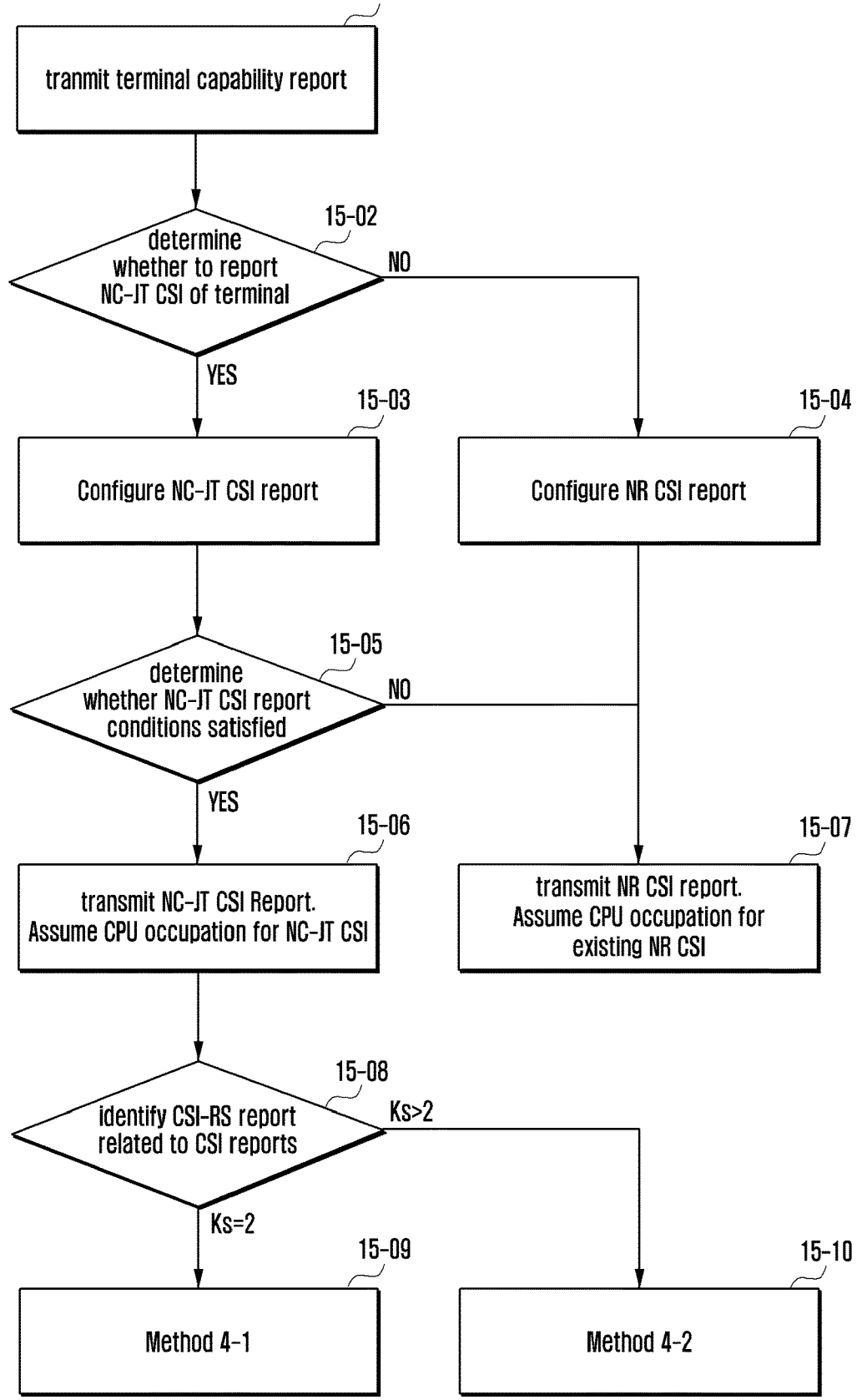
FIG. 15 illustrates a flowchart of an NC-JT CSI reporting process according to an embodiment.

FIG. 15 illustrates a flowchart of an NC-JT CSI reporting process according to an embodiment. The process of configuring the NC-JT CSI report according to an embodiment, the terminal reporting the NC-JT CSI according to the setting, and assuming the number of CPUs for the report may be represented as the flowchart of FIG. 15.

The terminal may report capability supported by the terminal to the corresponding base station while connected to the serving base station (15-01). The report may be reported based on the terminal capability enquiry message transmitted from the base station. The base station may determine whether the terminal may report NC-JT CSI, based on the capability supported by the terminal (15-02). As a result of the determination, if the terminal is capable of reporting the NC-JT CSI, the base station may request the terminal to report the NC-JT CSI to instruct the setting of the NC-JT CSI report (15-03). As a result of the determination, if the terminal is unable to report the NC-JT CSI, the base station may request the terminal to report a CSI indicating an NR CSI report setting (15-04).

When the terminal receives the request for the NC-JT CSI report, the terminal may determine whether the NC-JT CSI report condition is satisfied, based on the request for the NC-JT CSI report (15-05). When the NC-JT CSI reporting condition is satisfied, the terminal may transmit an NC-JT CSI report to the base station (15-06). At this time, NC-JT CSI may be measured, and the number of CPUs for reporting the NC-JT CSI may be determined. However, if the NC-JT CSI reporting condition is not satisfied, the NR CSI report may be transmitted and the NR CSI CPU occupation may be determined (15-07).

After the terminal transmits the NC-JT CSI report to the base station, the terminal may determine the number of CSI-RS related to the CSI report (15-08). As a result of the determination, when the number of CSI-RSs is equal to a predetermined threshold, a CPU number calculation method may be performed through [Method 4-1] (15-9). When the number of CSI-RSs is greater than a predetermined threshold, a CPU number calculation method may be performed through [Method 4-2] (15-10).

Fifth Embodiment: CSI Configuration According to NC-JT Transmission Type

The above-described NC-JT transmission may be divided into a method in which TRPs in the CoMP cooperating set transmit different data to improve downlink transmission efficiency, and a method in which TRPs in the CoMP cooperating set transmit the same data to improve downlink transmission reliability. In the method in which TRPs transmit different data, time-frequency resources allocated for each TRP may overlap each other, and interference between TRP transmission signals may occur in the overlapped time-frequency resources. In the method in which TRPs transmit the same data, there may be no interference between TRP transmission signals because time-frequency resources allocated for each TRP do not overlap with each other (orthogonal).

The following may be considered as a method of allocating TRP resources so as not to overlap when TRPs transmit the same data.

[Method 5-1] a Method of Allocating Time Resources to all TRPs and Allocating Frequency Resources that do not Overlap with Each Other.

This method may be used to reduce data transmission delay time when there are many available frequency resources in the network, and the terminal has the capability to simultaneously receive multiple TRP transmission signals. As an example of a method of allocating frequency resources that do not overlap for each TRP, for both TRP transmissions, an even numbered precoding group (PRG) in the frequency axis resource allocation indicated in the PDSCH scheduling DCI may be allocated to the first TRP and an odd numbered PRG may be allocated to the second TRP. If the size of the PRG is configured as wideband, if the number of RBs allocated by the frequency axis resource allocation indicated by the PDSCH scheduling DCI is N_RB, the first RB of [N_RB/2] may be allocated to the first TRP, and the remaining RBs of [N_RB/2] may be allocated to the second TRP. Meanwhile, one codeword may be transmitted over all resources allocated to all TRPs, or each TRP may individually transmit codewords from resources allocated to it. For example, both the first TRP and the second TRP may transmit codeword#1 from all allocated resources, or the first TRP may transmit codeword#A from the resource allocated to it, and the second TRP may transmit codeword#B from the resource allocated to it. At this time, codeword#A and codeword#B indicate codewords encoding the same data. The terminal may report whether it is possible to receive NC-JT transmission according to the resource allocation and each codeword transmission method through the terminal capability report.

[Method 5-2] a Method of Allocating Time Resources that do not Overlap with Each Other by TRP and Allocating the Same Frequency Resource to all TRPs.

This method may be used when there are few available frequency resources in the network or the terminal does not have the capability to simultaneously receive transmission signals of multiple TRPs. As an example of a method of allocating time resources that do not overlap for each TRP, for two TRP transmissions, specific OFDM symbols in one transmission slot may be allocated to the first TRP and other specific OFDM symbols may be allocated to the second TRP. The number of the OFDM symbols allocated to the TRPs may be the same. As another example, different transmission slots may be allocated for each TRP. For example, the first transmission slot may be allocated to the first TRP, and the second transmission slot may be allocated to the second TRP. The number of the OFDM symbols and symbol positions indicated for data transmission in each of the aforementioned transmission slots may be the same. The number of transmission slots allocated for each TRP may be two or more. The terminal may report whether it is possible to receive each of the above method, that is, a method in which multiple TRPs perform NC-JT transmission in different time resource allocations in one slot, or a method in which multiple TRPs perform NC-JT transmissions in multiple slots, through the terminal capability report.

The base station may dynamically change the above-described NC-JT transmission method. As an example, the base station may indicate which of the NC-JT transmission method in which each TRP in the CoMP cooperating set transmits different data or the NC-JT transmission method in which each TRP transmits the same data through the L1 signaling, such as DCI. In order to properly select the NC-JT transmission method, the base station can individually configure CSI reporting according to each transmission method of NC-JT. For example, as described in [Method 3-1], if whether the NC-JT CSI reporting is performed is explicitly configured, the NC-JT transmission method for the NC-JT-CSI to be reported may be configured together. As another example, as described in [Method 3-2], if whether the NC-JT CSI reporting is performed is implicitly configured, the NC-JT transmission method for the NC-JT CSI to be reported may be configured together.

The above-described configuration method for the NC-JT transmission method may be explicitly configured similar to the configuration method for performing NC-JT reporting described in [Method 3-1]. Alternatively, the NC-JT transmission method can be configured implicitly as described in [Method 3-2]. In the case of the above-mentioned explicit or implicit configuration, CSI measurement and/or reporting for one NC-JT transmission method may be configured, or CSI measurement and/or reporting for multiple NC-JT transmission schemes may be simultaneously configured. That is, it may be configured to measure and/or report both CSIs for each TRP transmitting different data and all TRP transmitting same data. For example, in the case of an implicit configuration, the terminal may measure both the existing NR CSI, the CSI for the NC-JT transmission method for transmitting different data for each TRP, and the CSI for the NC-JT transmission method for configuring the same data for each TRP, and select one of these measured CSI to report. At this time, information on the CSI selected for the report may be included in the CSI report as a CRI or a new indicator. Meanwhile, in the above embodiment, the CSI report for the NC-JT transmission method that is not supported as UE capability might not be configured by the base station or the UE might not expect the corresponding configuration.

With respect to the method in which all TRPs transmit the same data among the above-described NC-JT transmission methods, a corresponding NC-JT CSI measurement method may be changed according to resource allocation methods for each TRP. Therefore, when configuring NC-JT CSI measurement and/or reporting, a resource allocation method for each TRP may be configured together in addition to the NC-JT transmission method, and this configuration method may be similar to the explicit or implicit configuration method of the JT transmission method for NC-JT CSI measurement and/or reporting described above.

Whether the above-described NC-JT transmission is performed and method and the measurement method of NC-JT CSI according to resource allocation method for each TRP may be defined through the above-described CSI reference signal. In other words, Case 1) A case of following the NC-JT transmission method in which each TRP transmits data.

Case 2-1) A case of following the NC-JT transmission method in which all TRPs transmit the same data, and a method in which all TRPs in [Method 5-1] transmit one codeword by resource allocation by TRP.

Case 2-2) A case of following the NC-JT transmission method in which all TRPs transmit the same data, and a method in which each TRP in [Method 5-1] individually transmits one codeword by resource allocation for each TRP.

Case 3-1) A case of following the NC-JT transmission method in which all TRPs transmit the same data and resource allocation by TRP in the same slot in [Method 5-2] by resource allocation by TRP.

Case 3-2) A case of following the NC-JT transmission method and the resource allocation for each TRP, in which resource allocation by TRP between different slots in [Method 5-2].

The CSI reference signals of the five cases may be respectively defined. The terminal may be instructed by the base station through the above-described configuration methods to determine the CSI according to which reference signal definition.

Next, the number of CPUs for NC-JT CSI reporting may vary according to the NC-JT transmission method configured for the CSI reporting and resource allocation method for each TRP. For example, in case 1), the required number of CPUs may be the $X_1$ described in Example 3, while in case 2-1) to Case 3-2), the number of required CPUs may be a new value, such as X3. In case 2-1) to Case 3-2), since different time-frequency resources are used between TRPs, interference between TRPs might not need to be considered. Accordingly, X3 may be a value equal to $X_1$ or less than $X_1$. The above-described [Method 4-1] to [Method 4-2] may be applied to X3, and a parameter different from $X_1$ may be configured. For example, when the above-described analysis 4-2-1 is applied, $X_3=\beta\_3 K\_s$ may be defined, and $\beta\_3$ may be a constant having a positive value less than 2 or 2. For example, $\beta\_3=1$. In addition to this, various embodiments are possible, but not all possibilities are listed in order not to obscure the subject matter of the description.

Figure 16:
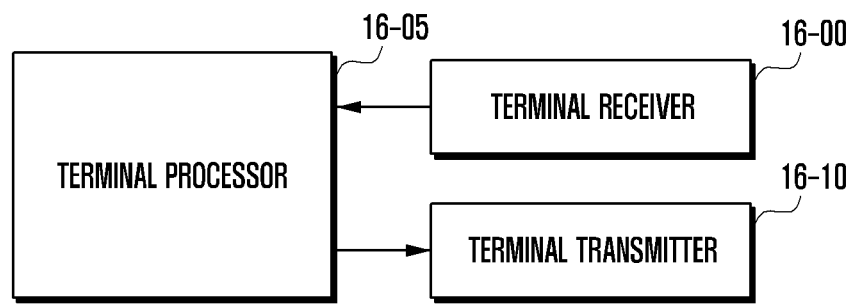
FIG. 16 illustrates a view of a terminal structure in a wireless communication system according to an embodiment.

FIG. 16 illustrates a view of a terminal structure in a wireless communication system according to an embodiment.

Referring to FIG. 16, the terminal may include a transceiver 16-00, a memory 16-05, and a processor 16-10. According to the communication method of the above-described terminal, the transceiver 16-00 and the processor 16-10 of the terminal may operate. However, the components of the terminal are not limited to the above-described examples. For example, the terminal may include more components or fewer components than the aforementioned components. In addition, the transceiver 16-00, the memory 16-05, and the processor 16-10 may be implemented in the form of single chip.

The transceiver 16-00 may transmit and receive a signal to and from a base station. Here, the signal may include control information and data. To this end, the transceiver 16-00 may include an RF transmitter that up-converts and amplifies the frequency of the transmitted signal, an RF receiver that amplifies the received signal with low noise and down-converts the frequency. However, this is only an embodiment of the transceiver 16-00, and the components of the transceiver 16-00 are not limited to the RF transmitter and the RF receiver.

The transceiver 16-00 may receive a signal through a wireless channel, output the signal to the processor 16-10, and transmit a signal output from the processor 16-10 through the wireless channel.

The memory 16-05 may store programs and data necessary for the operation of the terminal. In addition, the memory 16-05 may store control information or data included in signals transmitted and received by the terminal. The memory 16-05 may include a storage medium such as a ROM, a RAM, a hard disk, a CD-ROM and a DVD, or a combination of storage media. In addition, a plurality of memories 16-05 may be provided.

In addition, the processor 16-10 may control a series of processes so that the terminal operates according to the above-described embodiment. For example, the processor 16-10 may control a component of the terminal to receive a plurality of PDSCH at the same time by receiving a DCI composed of two layers. There may be a plurality of processors 16-10, and the processors 16-10 may perform component control operations of the terminal by executing a program stored in the memory 16-05.

Figure 17:
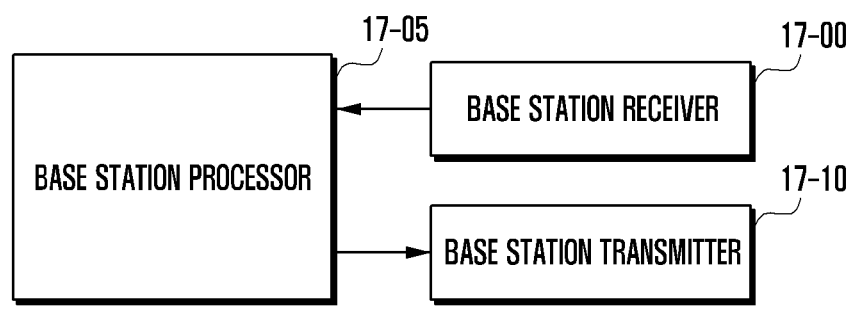
FIG. 17 illustrates a view of a structure of a base station in a wireless communication system according to an embodiment.

FIG. 17 illustrates a view of a structure of a base station in a wireless communication system according to an embodiment.

Referring to FIG. 17, the base station may include a transceiver 17-00, a memory 17-05, and a processor 17-10. Depending on the communication method of the base station, the transceiver 17-00 and the processor 17-10 of the base station may operate. However, the components of the base station are not limited to the examples described above. For example, the base station may include more or less components than the above-described components. In addition, the transceiver 17-00, the memory 17-05, and the processor 17-10 may be implemented in the form of single chip.

The transceiver 17-00 may transmit and receive signals to and from the terminal. Here, the signal may include control information and data. To this end, the transceiver 17-00 may be configured with an RF transmitter that up-converts and amplifies the frequency of the transmitted signal, and an RF receiver that amplifies the received signal with low noise and down-converts the frequency. However, this is only an embodiment of the transceiver 17-00, and the components of the transceiver 17-00 are not limited to RF transmitters and RF receivers.

The transceiver 17-00 may receive a signal through a wireless channel, output the signal to the processor 17-10, and transmit the signal output from the processor 17-10 through the wireless channel.

The memory 17-05 may store programs and data necessary for the operation of the base station. Further, the memory 17-05 may store control information or data included in signals transmitted and received by the base station. The memory 17-05 may include a storage medium such as a ROM, a RAM, a hard disk, a CD-ROM and a DVD, or a combination of storage media. In addition, a plurality of memories 17-05 may be provided.

The processor 17-10 may control a series of processes so that the base station may operate according to the above-described embodiments. For example, the processor 17-10 may configure two layers of DCIs including allocation information for multiple PDSCHs and control each component of the base station to transmit them. There may be a plurality of processors 17-10, and the processors 17-10 may perform component control operations of the base station by executing a program stored in the memory 17-05.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, embodiments 1 and 2 of the disclosure may be partially combined to operate a base station and a terminal. Further, although the above embodiments have been described by way of the FDD LTE system, other variants based on the technical idea of the embodiments may be implemented in other systems such as TDD LTE, 5G, and NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, resource configuration information for channel state information (CSI), wherein a channel state information-reference signal (CSI-RS) resource set including a plurality of CSI-RS resources for a channel measurement is configured based on the resource configuration information, and 2 sets of non-zero power (NZP) CSI-RS resources for non-coherent joint transmission (NC-JT) CSI measurement are configured within the CSI-RS resource set;
   measuring NC-JT CSI for multiple transmission and reception points (TRPs) based on the at least one of the 2 sets within the CSI-RS resource set; and
   transmitting, to the base station, a CSI report based on the measured NC-JT CSI,
   wherein each of the 2 sets comprises at least two NZP CSI-RS resources, among the plurality of CSI-RS resources within the CSI-RS resource set, and
   wherein a same NZP CSI-RS resource is associated with the 2 sets.

2. The method of claim 1, further comprising:
   measuring CSI for a single TRP,
   wherein the CSI report comprises CSI selected among the CSI for the single TRP and the NC-JT CSI for the multiple TRPs.

3. The method of claim 1, further comprising:
   identifying a number of CSI processing units (CPUs) for calculation of the NC-JT CSI measured based on the at least one of the 2 sets,
   wherein the number of CPUs for calculation of the NC-JT CSI is proportional to a number of NZP CSI-RS resources included in each of the 2 sets, and
   wherein the number of CPUs for the NC-JT CSI is occupied for calculation of the NC-JT CSI.

4. The method of claim 1, further comprising:
   transmitting, to the base station, capability information of the terminal including information indicating whether the NC-JT CSI is supported by the terminal.

5. A method performed by a base station in a wireless communication system, the method comprising:
   transmitting, to a terminal, resource configuration information for channel state information (CSI); and
   receiving, from the terminal, a CSI report based on non-coherent joint transmission (NC-JT) CSI for multiple transmission and reception points (TRPs),
   wherein a channel state information-reference signal (CSI-RS) resource set including a plurality of CSI-RS resources for a channel measurement is configured based on the resource configuration information,
   wherein 2 sets of non-zero power (NZP) CSI-RS resources for NC-JT CSI measurement are configured within the CSI-RS resource set,
   wherein each of 2 sets comprises at least two NZP CSI-RS resources, among the plurality of CSI-RS resources within the CSI-RS resource set, wherein the NC-JT CSI for the multiple TRPs is derived based on the at least one of the 2 sets within the CSI-RS resource set, and wherein a same NZP CSI-RS resource is associated with the 2 sets.

6. The method of claim 5, further comprising:

selecting one among CSI associated with a single TRP and the NC-JT CSI for the multiple TRPs.

7. The method of claim 5, wherein a number of CSI processing units (CPUs) associated with the NC-JT CSI based on the at least one of 2 sets is proportional to a number of NZP CSI-RS resources included in each of the 2 sets.

8. The method of claim 5, further comprising:

receiving, from the terminal, capability information of the terminal including information indicating whether the NC-JT CSI is supported by the terminal.

9. A terminal comprising:

a transceiver configured to transmit and receive at least one signal; and a controller coupled with the transceiver, the controller configured to:

receive, from a base station, resource configuration information for channel state information (CSI), wherein a channel state information-reference signal (CSI-RS) resource set including a plurality of CSI-RS resources for a channel measurement is configured based on the resource configuration information, and 2 sets of non-zero power (NZP) CSI-RS resources for non-coherent joint transmission (NC-JT) CSI measurement are configured within the CSI-RS resource set;

measure NC-JT CSI for multiple transmission and reception points (TRPs) based on the at least one of the 2 sets within the CSI-RS resource set; and transmit, to the base station, a CSI report based on the measured NC-JT CSI, wherein each of the 2 sets comprises at least two NZP CSI-RS resources, among the plurality of CSI-RS resources within the CSI-RS resource set, and wherein a same NZP CSI-RS resource is associated with the 2 sets.

10. The terminal of claim 9, wherein the controller is further configured to:

measure CSI for a single TRP, wherein the CSI report comprises CSI selected among the CSI for the single TRP and the NC-JT CSI for the multiple TRPs.

11. The terminal of claim 9, wherein the controller is further configured to:

identify a number of CSI processing units (CPUs) for calculation of the NC-JT CSI measured based on the at least one of the 2 sets, wherein the number of CPUs for calculation of the NC-JT CSI is proportional to a number of NZP CSI-RS resources included in each of the 2 sets, and wherein the number of CPUs for the NC-JT CSI is occupied for calculation of the NC-JT CSI.

12. The terminal of claim 9, wherein the controller is further configured to:

transmit, to the base station, capability information of the terminal including information indicating whether the NC-JT CSI is supported by the terminal.

13. A base station comprising:

a transceiver configured to transmit and receive at least one signal; and a controller coupled with the transceiver, the controller configured to:

transmit, to a terminal, resource configuration information for channel state information (CSI); and receive, from the terminal, a CSI report based on non-coherent joint transmission (NC-JT) CSI for multiple transmission and reception points (TRPs), wherein a channel state information-reference signal (CSI-RS) resource set including a plurality of CSI-RS resources for a channel measurement is configured based on the resource configuration information, wherein 2 sets of non-zero power (NZP) CSI-RS resources for NC-JT CSI measurement are configured within the CSI-RS resource set, wherein each of the 2 sets comprises at least two NZP CSI-RS resources, among the plurality of CSI-RS resources within the CSI-RS resource set, wherein the NC-JT CSI for the multiple TRPs is derived based on the at least one of the 2 sets within the CSI-RS resource set, and wherein a same NZP CSI-RS resource is associated with the 2 sets.

14. The base station of claim 13, wherein the controller is further configured to:

select one among CSI associated with a single TRP and the NC-JT CSI for the multiple TRPs.

15. The base station of claim 13, wherein a number of CSI processing units (CPUs) associated with the NC-JT CSI based on the at least one of the 2 sets is proportional to a number of NZP CSI-RS resources included in each of the 2 sets.

16. The base station of claim 13, wherein the controller is further configured to:

receive, from the terminal, capability information of the terminal including information indicating whether the NC-JT CSI is supported by the terminal.

* * * * *